United States Patent
Mendiratta et al.

(10) Patent No.: US 12,516,121 B2
(45) Date of Patent: Jan. 6, 2026

(54) ANTIBODIES TO HUMAN PROGRAMMED DEATH RECEPTOR PD-1

(71) Applicant: ZYDUS LIFESCIENCES LIMITED, Gujarat (IN)

(72) Inventors: Sanjeev Kumar Mendiratta, Gujarat (IN); Kaushik Banerjee, Gujarat (IN); Dipti Mehta, Gujarat (IN); Ramkrashan Kasera, Gujarat (IN); Arun Singh, Gujarat (IN); Aashini Parikh, Gujarat (IN); Pankaj Kalita, Gujarat (IN); Rutu Paraschandra Dave, Gujarat (IN); Vibhuti Sharma, Gujarat (IN); Hardik Pandya, Gujarat (IN)

(73) Assignee: ZYDUS LIFESCIENCES LIMITED, Gujarat (IN)

( * ) Notice: Subject to any disclaimer, the term of this patent is extended or adjusted under 35 U.S.C. 154(b) by 883 days.

(21) Appl. No.: 17/625,551

(22) PCT Filed: Jul. 9, 2020

(86) PCT No.: PCT/IB2020/056458
§ 371 (c)(1),
(2) Date: Jan. 7, 2022

(87) PCT Pub. No.: WO2021/005546
PCT Pub. Date: Jan. 14, 2021

(65) Prior Publication Data
US 2022/0289846 A1    Sep. 15, 2022

(30) Foreign Application Priority Data
Jul. 9, 2019   (IN) .............................. 201921027443

(51) Int. Cl.
| | | |
|---|---|---|
| *C07K 16/28* | (2006.01) | |
| *A61K 47/68* | (2017.01) | |
| *A61K 51/10* | (2006.01) | |
| *C07K 16/32* | (2006.01) | |

(52) U.S. Cl.
CPC ...... *C07K 16/2818* (2013.01); *A61K 47/6849* (2017.08); *A61K 51/1027* (2013.01); *C07K 16/2803* (2013.01); *C07K 16/2827* (2013.01); *C07K 16/32* (2013.01); *C07K 2317/24* (2013.01); *C07K 2317/31* (2013.01)

(58) Field of Classification Search
CPC .... A61K 47/00; A61K 47/6849; A61K 51/00; A61K 51/1027; C07K 16/2818; C07K 16/2803; C07K 16/2827; C07K 16/32; C07K 2317/24; C07K 2317/31; C07K 2317/56; C07K 2317/76; C07K 2317/92
See application file for complete search history.

(56) References Cited

U.S. PATENT DOCUMENTS

| | | |
|---|---|---|
| 9,492,539 B2 | 11/2016 | Korman et al. |
| 2016/0159905 A1 | 6/2016 | Abdiche et al. |
| 2017/0247454 A1 | 8/2017 | Benz et al. |
| 2017/0334995 A1 | 11/2017 | Zettl et al. |
| 2018/0222965 A1 | 8/2018 | Lazar |
| 2019/0127467 A1 | 5/2019 | Shah et al. |

FOREIGN PATENT DOCUMENTS

| | | |
|---|---|---|
| EP | 3176180 A1 | 6/2017 |
| WO | 2016015685 A1 | 2/2016 |
| WO | 2017011580 A2 | 1/2017 |
| WO | 2017207628 A1 | 12/2017 |
| WO | 2018071792 A1 | 4/2018 |
| WO | 2018087143 A2 | 5/2018 |

OTHER PUBLICATIONS

International Search Report; International Application No. PCT/IB2020/056458; International Filing Date—Jul. 9, 2020; Date of Mailing—Oct. 28, 2020; 11 pages.
Written Opinion; International Application No. PCT/IB2020/056458; International Filing Date—Jul. 9, 2020; Date of Mailing—Oct. 28, 2020; 13 pages.
Angal S, et al.; "A single amino acid substitution abolishes the heterogeneity of chimeric mouse/human (IgG4) antibody"; Mol Immunol, vol. 30, Issue No. 1; pp. 105-108 (1993).
Brockmann et al.; "Synthetic single-framework antibody library integrated with rapid affinity maturation by VL shuffling"; Protein Engineering, Design & Selection vol. 24, Issue No. 9; pp. 691-700 (2011).
Brown, et al.; "Blockade of Programmed Death-1 Ligands on Dendritic Cells Enhances T Cell Activation and Cytokine Production"; J Immunol, vol. 170; pp. 1257-1266 (2003).
Chen et al., "Generation and Analysis of Random Point Mutations in an Antibody CDR2 Sequence: Many Mutated Antibodies Lose Their Ability to Bind Antigen" J. Exp. Med. The Rockefeller University Press, vol. 176, pp. 855-865, Sep. 1992.
Dong et al.; "B7-H1, a third member of the B7 family, co-stimulates T-cell proliferation and interleukin-10 secretion"; Nature Med, vol. 5, Issue No. 12; pp. 1365-1369 (1999).
Huovinen, T. et al.; "Primer Extension Mutagenesis Powered by Selective Rolling Circle Amplification"; PLoS One, vol. 7, Issue No. 2, e31817; 9 pages (2012).
Iwai, Y. et al.; "Involvement of PD-L1 on tumor cells in the escape from host immune system and tumor immunotherapy by PD-L1 blockade"; PNAS USA, vol. 99, Issue No. 99; pp. 12293-12297 (2002).
Karachaliou, N. et al.; "Interferon gamma, an important marker of response to immune checkpoint blockade in non-small cell lung cancer and melanoma patients"; Ther Adv Med Oncol, vol. 10; pp. 1-23; DOI: 10.1177/1758834017749748 (2018).

(Continued)

Primary Examiner — D. L. Jones
(74) Attorney, Agent, or Firm — CANTOR COLBURN LLP

(57) ABSTRACT

The present invention relates to an antibody or antigen-binding portion thereof that can bind to human programmed death 1 (PD-1). The antibody according to the present invention is further used in the preparation of a drug for treating disease in which expression of PD-1 is detrimental.

2 Claims, 10 Drawing Sheets

Specification includes a Sequence Listing.

(56) References Cited

OTHER PUBLICATIONS

Palucka, K. et al.; "Dendritic Cells as the Terminal Stage of Monocyte Differentiation"; J Immunol, vol. 160, Issue No. 9; pp. 4587-4595; DOI: 10.4049/jimmunol.160.9.4587 (1998).
Peng, W. et al.; "PD-1 Blockade Enhances T-cell Migration to Tumors by Elevating IFN-y Inducible Chemokines"; Cancer Res, vol. 72, Issue No. 20; pp. 5209-5218 (2012).
Rudikoff et al., "Single amino acid substitution alerting antigen-binding specificity", Proc. Natl. Acad. Sci USA, vol. 79, pp. 1979-1983, Mar. 1982.
Sheridan et al.; "Cautious optimism surrounds early clinical data for PD-1 blocker"; Nature Biotechnology, vol. 30; pp. 729-730 (2012).
Zou et al.; "Inhibitory B7-family molecules in the tumour microenvironment"; Nature Review Immunol, vol. 8, Issue No. 6; pp. 467-477 (2008).
Rudikoff et al., "Single amino acid substitution altering antigen-binding specificity" Proc. Natl. Acad. Sci. USA, vol. 79, pp. 1979-1983, Mar. 1982.

ANTIBODIES TO HUMAN PROGRAMMED DEATH RECEPTOR PD-1

CROSS REFERENCE TO RELATED APPLICATIONS

This application is a National Stage application of PCT/IB2020/056458, filed on Jul. 9, 2020. This application claims priority to Indian Application No. 201921027443, filed on Jul. 9, 2019, and all the benefits accruing therefrom under 35 U.S.C. § 119, the content of which is incorporated by reference in its entirety.

SEQUENCE LISTING

The Instant Application contains a Sequence Listing which has been submitted electronically in ASCII format and is hereby incorporated by reference in its entirety. Said ASCII copy, created on May 22, 2025 is named "ZLF0004US_ST25" and is 161,600 bytes in size. The Sequence Listing does not go beyond the disclosure in the application as filed.

FIELD OF THE INVENTION

The present invention relates to an antibody or antigen-binding portion thereof that can bind to human programmed cell death protein 1 (PD-1). The antibody according to the present invention is further used in the preparation of a drug for treating diseases in which expression of PD-1 is detrimental.

BACKGROUND OF THE INVENTION

PD-1 (CD279) is a 288 amino acid protein inhibitory receptor expressed on activated T-cells and B-cells, natural killer cells and monocytes. PD-1 is a member of the CD28/CTLA-4 (cytotoxic T lymphocyte antigen)/ICOS (inducible co-stimulator) family of T-cell co-inhibitory receptors. PD-1 receptor has two ligands namely, Protein Death-Ligand 1 (PD-L1) and Protein Death-Ligand 2 (PD-L2). PD-L1 (CD274, B7H1) is expressed widely on both lymphoid and non-lymphoid tissues such as CD4 and CD8 T-cells, macrophage lineage cells, peripheral tissues as well as on tumor cells, virally-infected cells and autoimmune tissue cells. PD-L2 (CD273, B7-DC) has a more restricted expression than PD-L1, being expressed on activated dendritic cells and macrophages (1). PD-L1 is expressed in most human cancers, including melanoma, glioma, non-small cell lung cancer, squamous cell carcinoma of head and neck, leukemia, pancreatic cancer, renal cell carcinoma, and hepatocellular carcinoma, and may be inducible in nearly all cancer types (2). PD-1 binding to its ligands results in decreased T-cell proliferation and cytokine secretion, suppressing humoral and cellular immune responses and worsening of diseases where an active immune response would have otherwise alleviated the disease state. This immune suppression can be reversed by inhibiting the local interaction of PD-1 with PD-L1, and the effect is additive when the interaction of PD-1 with PD-L2 is blocked as well (3, 4).

Blocking PD-1 with antagonists, including monoclonal antibodies, has been studied in treatments of cancer and chronic viral infections (5).

Monoclonal antibodies to PD-1 are known in the art and have been described, for example, in patent documents WO2006121168, WO2009114335, WO2008156712, WO2012145493, WO2015036394, WO2015112800, WO2016015685 and WO2018128939.

Three antibodies targeting human PD-1 for the treatment of various cancers in combination with conventional drugs are available commercially. These three antibodies are nivolumab, pembrolizumab and cemiplimab.

Despite the clinical success of anti-PD-1 antibodies, these therapeutic antibodies have several shortcomings, including the high cost, limited half-life and immunogenicity.

Accordingly, there is a continued need in the field of PD-1/PD-L1 pathway based disease treatment with antibodies that can effectively bind human PD-1 and block its binding with PD-L1 or PD-L2 and also improve upon some of the challenges of existing therapies. The present invention discloses such novel antibodies.

SUMMARY OF THE INVENTION

The present invention provides novel anti-PD-1 antibodies that have one or more improved characteristics, e.g., relative to known anti-PD-1 antibodies used for therapeutic purposes. The anti-PD-1 antibody or antigen binding portion thereof of the present invention binds with high affinity to human PD-1. The amino acid sequence of constant region of anti-PD-1 antibody comprises of the IgG1, IgG2, IgG3, IgG4, IgA, IgE, IgM or IgD constant region, preferably the IgG1 or IgG4. Further, one or more anti-PD-1 antibodies of the present invention has modified or reduced or no ADCC and/or CDC activity. In some of the aspects, the present invention provides anti-PD-1 antibodies which has high ADCC and/or CDC activity which may lead to lysis of PD-1 expressing cells. The anti-PD-1 antibody or antigen binding portion thereof of the present invention has a $K_D$ of $10^{-10}$ M or less, more preferably $10^{-11}$ M or less and even more preferably $10^{-12}$ M or less for a PD-1 antigen. $K_D$ value is a measurement of the binding affinity of the antibody towards its target antigen. The anti-PD-1 antibody or antigen binding portion thereof of the present invention can be used for the treatment of diseases where interaction of PD-1 with PDL1 and/or PDL2 is involved in modifying the disease state such as in infections and various cancers. In one aspect, the anti-PD-1 antibody or antigen binding portion thereof according to the present invention blocks PD-1 receptor interaction with its natural ligand PD-L1 and/or PD-L2. In another aspect of the invention, the anti-PD-1 antibody or antigen binding portion thereof kills the T cells that are expressing PD-1. Present invention also provides processes for preparing the novel anti-PD-1 antibodies and pharmaceutical compositions containing the same.

DEFINITIONS

Figure 1:
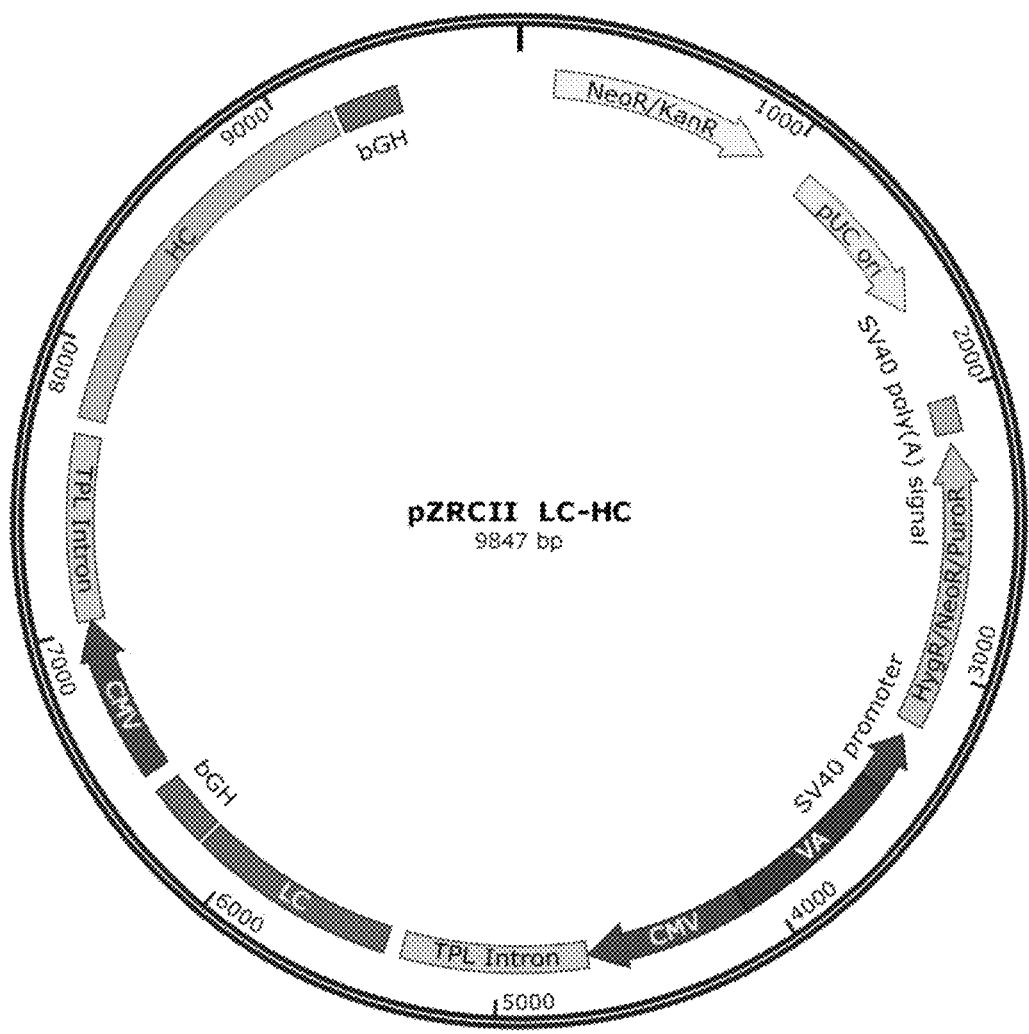
FIG. 1 depicts a general vector map of pZRCIIhyg Anti-PD-1 LC-HC vector construct which is used to prepare full-length monoclonal anti-PD-1 antibody of the present invention.

The term "antibody" as referred to herein includes whole antibodies and any antigen-binding fragment (i.e., "antigen-binding portion") or single chains thereof. An "antibody" refers to a glycoprotein comprising at least two heavy (H) chains and two light (L) chains inter-connected by disulfide bonds, or an antigen-binding portion thereof. Each heavy chain is comprised of a heavy chain variable region (abbreviated herein as VH) and a heavy chain constant region (abbreviated herein as CH). The heavy chain constant region is comprised of three domains, CH1, CH2 and CH3. Each light chain is comprised of a light chain variable region (abbreviated herein as VL) and a light chain constant region. The light chain constant region is comprised of one domain, CL. The VH and VL regions can be further subdivided into regions of hypervariability, termed complementarity determining regions (CDR), interspersed with regions that are more conserved, termed framework regions (FR). Each VH and VL is composed of three CDRs and four FRs, arranged from amino-terminus to carboxy-terminus in the following order: FR1, CDR1, FR2, CDR2, FR3, CDR3, FR4. The variable regions of the heavy and light chains contain a binding domain that interacts with an antigen. The constant regions of the antibodies may mediate the binding of the immunoglobulin to host tissues or factors, including various cells of the immune system (e.g., immune effector cells) and the first component (C1q) of the classical complement system.

The term "operatively linked" is intended to mean that an antibody gene is ligated into a vector such that transcriptional and translational control sequences within the vector serve their intended function of regulating the transcription and translation of the antibody gene.

The term "Ka" & Kd are well known to a skilled person, wherein "Ka" is the association rate of a particular antibody-antigen interaction, whereas the term "Kd" is the dissociation rate of a particular antibody-antigen interaction. The term "$K_D$" is an affinity rate constant, which is obtained from the ratio of Kd to Ka. It can be measured by using surface plasmon resonance method which is well known in the art. $K_D$ value is a measurement of the binding affinity of the antibody towards its target antigen. The term "$K_D$" is also defined in WO 2006121168. This patent document is incorporated herein by reference.

The terms "monoclonal antibody" or "monoclonal antibody composition" as used herein refer to a preparation of antibody molecules of single molecular composition. A monoclonal antibody composition displays a single binding specificity and affinity for a particular epitope.

The term "bispecific antibody" refers to a homogeneous antibody population involved in the highly specific recognition and binding of a two different antigenic determinants, or epitopes.

The term "recombinant antibody" according to the present invention, includes monoclonal antibodies which are generated recombinantly using synthetic heavy and light chain genes. Recombinant antibodies of this invention are monoclonal antibodies (mAbs) which are not produced using traditional hybridoma-based technologies, and do not need hybridomas and animals in the production process.

The term "immune effector function" as used herein is a biochemical event that results from the interaction of an antibody Fc region with an Fc receptor or ligand. Effector functions include but are not limited to ADCC, ADCP, and CDC. The term also represents a physiological event such as circulating half-life of a drug or targeting of a drug to a particular cell or tissue type.

The term "ADCC" or "antibody dependent cell-mediated cytotoxicity" as used herein is the cell-mediated reaction wherein nonspecific cytotoxic cells that express FcγRs recognize bound antibody on a target cell and subsequently cause lysis of the target cell.

The term "ADCP" or "antibody dependent cell-mediated phagocytosis" as used herein is the cell-mediated reaction wherein nonspecific cytotoxic cells that express FcγRs recognize bound antibody on a target cell and subsequently cause phagocytosis of the target cell.

The term "immune effector cell" as used herein is a cell that expresses one or more Fc receptors and mediates one or more effector functions. Effector cells include but are not limited to monocytes, macrophages, neutrophils, dendritic cells, eosinophils, mast cells, platelets, B cells, large granular lymphocytes, Langerhans' cells, natural killer (NK) cells, and γδT cells, and may be from any organism including but not limited to humans, mice, rats, rabbits, and monkeys.

The term "Fc" fragment, whose name reflects its ability to crystallize readily. In human IgG molecules, the Fc region is generated by papain cleavage N-terminal to Cys 226. The Fc region is central to the immune-effector functions of antibodies.

The term "Fc protein" as used herein refers to the portion of a single immunoglobulin heavy chain beginning in the hinge region just upstream of the papain cleavage site and ending at the C-terminus of the antibody. Accordingly, a complete Fc domain comprises at least a portion of a hinge (e.g., upper, middle, and/or lower hinge region) domain, a CH2 domain, and a CH3 domain.

The term "pharmaceutical formulation" refers to preparations, which are in such form as to permit the biological activity of the active ingredients to be unequivocally effective. The term "pharmaceutical formulation" or "pharmaceutical composition" or "composition" can be used here interchangeably.

The term "excipient" refers to an agent that may be added to a formulation to stabilize the active drug substance in the formulated form to adjust and maintain osmolality and pH of the pharmaceutical preparations. Examples of commonly used excipients include, but are not limited to, sugars, polyols, amino acids, surfactants, and polymers. "Pharmaceutically acceptable" excipients are those which can reasonably be administered to a subject mammal to provide an effective dose of the active ingredient employed.

The term "treatment" or "therapeutics" as used herein, refers to any treatment of a disease in a mammal, particularly in a human. It includes: (a) preventing the disease from occurring in a subject which may be predisposed to the disease or at risk of acquiring the disease but has not yet been diagnosed as having it; (b) inhibiting the disease, i.e., arresting its development; and (c) relieving the disease, i.e., causing regression of the disease.

The terms "patient" and "subject" are used interchangeably and are used in their conventional sense to refer to a living organism suffering from or prone to a condition that can be prevented or treated by administration of a composition of the present invention, and includes both humans and non-human animals. Examples of subjects include, but are not limited to, humans, chimpanzees and other apes and monkey species; farm animals such as cattle, sheep, pigs, goats and horses; domestic mammals such as dogs and cats; laboratory animals including rodents such as mice, rats and guinea pigs; birds, including domestic, wild and game birds such as chickens, turkeys and other gallinaceous birds, ducks, geese, and the like. The term does not denote a particular age. Thus, adult, juvenile and new born individuals are of interest.

An "effective amount" of an antibody of the invention, or composition thereof, is an amount that is delivered to a mammalian subject, either in a single dose or as part of a series, which is effective for inducing an immune response against target antigen in said subject. This amount varies depending upon the health and physical condition of the individual to be treated, the taxonomic group of individual to be treated and other relevant factors. It is expected that the amount will fall in a relatively broad range that can be determined through routine trials.

A "pharmaceutically effective dose" or "therapeutically effective dose" is that dose required to treat or prevent, or alleviate one or more PD-1 related disorder or symptom in a subject, preferably in the present invention, for cancer or infection or autoimmune disease. The pharmaceutically effective dose depends on inter alia the specific compound (herein it is anti-PD-1 antibody or its combination or conjugate or bispecific) to administer, the severity of the symptoms, the susceptibility of the subject to side effects, the type of disease, the composition used, the route of administration, the type of mammal being treated, the physical characteristics of the specific mammal under consideration such as health and physical condition, concurrent medication, the degree of protection desired, and other factors that those skilled in the medical arts will recognize.

Abbreviations of amino acids as used in the current application are provided in below table.

| Full Name | Abbreviation (3 Letter) | Abbreviation (1 Letter) |
|---|---|---|
| Alanine | Ala | A |
| Arginine | Arg | R |
| Asparagine | Asn | N |
| Aspartate | Asp | D |
| Cysteine | Cys | C |
| Glutamate | Glu | E |
| Glutamine | Gln | Q |
| Glycine | Gly | G |
| Histidine | His | H |
| Isoleucine | Ile | I |
| Leucine | Leu | L |
| Lysine | Lys | K |
| Methionine | Met | M |
| Phenylalanine | Phe | F |
| Proline | Pro | P |
| Serine | Ser | S |
| Threonine | Thr | T |
| Tryptophan | Trp | W |
| Tyrosine | Tyr | Y |
| Valine | Val | V |

Other abbreviations used in the present application:
ACT: Adoptive cell transfer
ADCC: Antibody-dependent cellular cytotoxicity
ADCP: Antibody-dependent cellular phagocytosis
CDC: Complement-dependent cytotoxicity
CDR: Complementary Determining Region
CFU: Colony forming unit
CH: Constant region of heavy chain
cHL: Classical Hodgkin Lymphoma
CL: Constant region of light chain
dNTP: deoxyribo Nucleotide Tri Phosphate
ESCC: Esophageal Squamous Cell Carcinoma
FACS: Fluorescence-activated cell sorting
HC: Heavy Chain
HCC: Hepatocellular Carcinoma
HCVR: Heavy Chain Variable Region
HEK: Human Embryonic Kidney
hyg: hygromycin
IFN-γ: IFN-gamma
LC: Light Chain
LCVR: Light Chain Variable Region
mAb: monoclonal Antibody
MCC: Merkel cell carcinoma
MLR: Mixed Lymphocyte Reaction
MOI: Multiplicity of Infection
NSCLC: Non-Small Cell Lung Cancer
PBMC: Peripheral blood mononuclear cells
PD-1/PD1: Programmed cell death receptor 1
PD-L1/PD L1: Programmed death ligand 1
PD-L2/PD L2: Programmed death ligand 2
Pfx: Proof reading DNA polymerase, Pfx™ from Invitrogen.
PMBCL: Primary Mediastinal Large B-Cell Lymphoma
sRCA: Selective rolling circle amplification
RCC: Renal Cell Carcinoma
rpm: Round per minute
SCCHN: Squamous Cell Carcinoma of the Head and Neck
SCLC: Small Cell Lung Cancer
SEQ/seq: Sequence
SPR: Surface Plasmon Resonance
VH: Variable region of heavy chain
VL: Variable region of light chain

EMBODIMENTS OF THE INVENTION

The disclosure of the present invention relates to novel anti-PD-1 antibodies that can be used for therapeutic purposes.

In one embodiment, the anti-PD-1 antibody or antigen binding portion thereof of the present invention binds with high affinity to human PD-1.

In one embodiment, the amino acid sequence of constant region of anti-PD-1 antibody comprises of the IgG1, IgG2, IgG3, IgG4, IgG2/G4, IgA, IgE, IgM or IgD constant region, preferably the IgG1 or IgG4.

In another embodiment, one or more anti-PD-1 antibodies of the present invention has modified or reduced or no ADCC and/or CDC activity. In one of the embodiments, the anti-PD-1 antibody or antigen binding portion thereof has reduced potential to cause the safety issue of ADCC and CDC. In another embodiment, the anti-PD-1 antibody or antigen binding portion thereof has ADCC and/or CDC activity.

In another embodiment, one or more anti-PD-1 antibodies of the present invention has ADCP activity.

In one of the embodiments, the anti-PD-1 antibody or antigen binding portion thereof of the present invention has a $K_D$ of $10^{-8}$ M or less, more preferably $10^{-10}$ M or less and even more preferably $10^{-11}$ M or less even more preferably $10^{-12}$ M or less for PD-1 antigen. $K_D$ value is a measurement of the binding affinity of the antibody towards its target antigen.

In one of the embodiments, the anti-PD-1 antibody or antigen binding portion thereof of the present invention cross-reacts with PD-1 from species other than human.

In one of the embodiments, the anti-PD-1 antibody or antigen binding portion thereof of the present invention has higher binding specificity towards human PD-1.

In one of the embodiments, an anti-PD-1 antibody or antigen binding portion thereof of the present invention has an increased half-life in subject.

In one embodiment, the anti-PD-1 antibody or antigen binding portion thereof according to the present invention blocks the function of PD-1.

In one embodiment, the anti-PD-1 antibody or antigen binding portion thereof according to the present invention prevents the binding of PD-1 to PD-L1 expressing target cells.

In one of the embodiments, the anti-PD-1 antibody or antigen binding portion thereof according to the present invention prevents the binding of PD-1 to PD-L2 expressing target cells.

In another embodiment, the anti-PD-1 antibody or antigen binding portion thereof of the present invention kills the T cells that are expressing PD-1.

In one embodiment, the anti-PD-1 antibody or antigen binding portion thereof according to the present invention has improved circulating half-life.

In another embodiment, the anti-PD-1 antibody or antigen binding portion of the present invention is able to bind to the monkey PD-1 enabling ease of drug development by providing a relevant animal pharmacology and toxicology model.

In one embodiment, the present invention provides a nucleic acid sequence encoding the anti-PD-1 antibody or antigen-binding portion thereof of the present invention.

In one embodiment, the present invention provides an expression vector comprising the nucleic acid sequence encoding the anti-PD-1 antibody or antigen-binding portion thereof of the present invention.

In one embodiment, the present invention provides a host cell comprising the expression vector wherein the expression vector comprising the nucleic acid sequence encoding the anti-PD-1 antibody or antigen-binding portion thereof of the present invention.

In one of the embodiments, the present invention provides a composition comprising an anti-PD-1 antibody or antigen-binding portion thereof that specifically binds human PD-1 and an acceptable carrier.

In one of the embodiments, the present invention provides an immunoconjugate comprising the anti-PD-1 antibody or antigen-binding portion thereof linked to a therapeutic agent.

In one of the embodiments, the present invention provides a bispecific molecule comprising the anti-PD-1 antibody or antigen-binding portion thereof linked to a second functional moiety having a different binding specificity than said antibody, or antigen-binding portion thereof.

In one of the embodiments, the present invention provides a combination comprising at least two or more antibodies or antigen binding portion thereof wherein at least one antibody or antigen binding portion thereof is the anti-PD-1 antibody or antigen-binding portion thereof of the present invention.

In another embodiment, the anti-PD-1 antibody or antigen binding portion thereof of the present invention can be used for the treatment of disease where activity of PD-1 is detrimental such as various cancers, various infections. In one of the embodiments, the anti-PD-1 antibody or antigen binding portion thereof of the present invention can be used for the treatment of auto-immune disorders.

In one of the embodiments, the anti-PD-1 antibody or antigen binding portion thereof of the present invention can be used for the treatment of cancer selected from NSCLC, SCLC, RCC, cHL, SCCHN, urothelial carcinoma, colorectal cancer, ESCC, primary mediastinal large b-cell lymphoma, microsatellite instability-high cancer, gastric cancer, cervical cancer, merkel cell carcinoma, endometrial carcinoma and tumor mutational burden-high (TMB-H) cancer, where PD-1 activity is amplified.

DETAILED DESCRIPTION OF THE INVENTION

In one embodiment, the anti-PD-1 antibody or antigen binding portion thereof of the present invention binds with high affinity to human PD-1.

In one embodiment, CDR1 of the heavy chain (herein after referred as CDRH1) of the anti-PD-1 antibody or antigen binding portion thereof of the present invention has an amino acid sequence of general formula (I): $X_{1a}$-$A_{1a}$-$X_{2a}$-$A_{2a}$ wherein, $X_{1a}$ is an amino acid selected from asparagine, glycine and threonine;

$A_{1a}$ is a dipeptide selected from Tyr-Tyr and Ile-Thr;

$X_{2a}$ is an amino acid selected from isoleucine, leucine, valine, phenylalanine, methionine and alanine;

$A_{2a}$ is single amino acid or dipeptide or tripeptide or tetrapeptide selected from tyrosine, asparagine, serine, glycine, Asn-Ser, Asn-Ser-Gly and Ser-Asn-Ser-Gly, with the proviso that asparagine as $X_{1a}$ and methionine as $X_{2a}$ are not present together.

In one of the preferred embodiments, CDRH1 of the heavy chain of the anti-PD-1 antibody or antigen binding portion thereof of the present invention has an amino acid sequence of the formula (Ia): $X_{1a}$-Y-Y-$X_{2a}$-Y wherein, $X_{1a}$ is an amino acid selected from asparagine and threonine;

$X_{2a}$ is an amino acid selected from isoleucine, leucine, valine, methionine and alanine, with the proviso that asparagine as $X_{1a}$ and methionine as $X_{2a}$ are not present together.

In a more preferred embodiment, CDRH1 of the anti-PD-1 antibody or antigen binding portion thereof of the present invention is TYYIY (SEQ. ID NO.: 4).

In an alternate preferred embodiment, the CDRH1 of the anti-PD-1 antibody or antigen binding portion thereof of the present invention is GITFSNSG (SEQ. ID NO.: 7).

In one embodiment, CDR2 of heavy chain (herein after referred as CDRH2) of the anti-PD-1 antibody or antigen binding portion thereof of the present invention has an amino acid sequence of general formula (II): $A_{1b}$-$X_{1b}$-$A_{2b}$-$X_{2b}$-$X_{3b}$-$A_{3b}$-$X_{4b}$-$X_{5b}$-$X_{6b}$-$X_{7b}$-$X_{8b}$-$A_{4b}$ wherein, $A_{1b}$ is optionally present and when present represents glycine;

$X_{1b}$ is an amino acid selected from methionine, isoleucine, leucine, glycine, valine and alanine;

$A_{2b}$ is tripeptide or tetrapeptide selected from Asn-Pro-Ser-Asn or Trp-Tyr-Asp;

Each of $X_{2b}$ and $X_{3b}$ independently represents an amino acid selected from glycine and serine;

$A_{3b}$ is single amino acid or dipeptide selected from lysine or Thr-Asn;

$X_{4b}$ is an amino acid selected from tyrosine, arginine and phenylalanine;

$X_{5b}$ is an amino acid selected from serine, tyrosine and asparagine;

$X_{6b}$ may be optionally present and when present represents an amino acid selected from glutamic acid and glutamine;

$X_{7b}$ may be optionally present and when present represents an amino acid selected from asparagine and lysine;

$X_{8b}$ may be optionally present and when present represents an amino acid selected from tyrosine and phenylalanine;

$A_{4b}$ may be optionally present and when present represents lysine.

In one of the preferred embodiments, CDRH2 of heavy chain of the anti-PD-1 antibody or antigen binding portion thereof of the present invention has an amino acid sequence of the formula (IIa): G-$X_{1b}$-N-P-S-N-$X_{2b}$-$X_{3b}$-T-N-$X_{4b}$-$X_{5b}$-$X_{6b}$-$X_{7b}$-$X_{8b}$-K wherein, $X_{1b}$ is an amino acid selected from methionine, isoleucine, leucine, glycine, valine and alanine;

Each of $X_{2b}$ and $X_{3b}$ independently represents an amino acid selected from glycine and serine;

Each of $X_{4b}$ and $X_{8b}$ independently represents an amino acid selected from tyrosine and phenylalanine;

$X_{5b}$ is an amino acid selected from serine and asparagine;

$X_{6b}$ is an amino acid selected from glutamic acid and glutamine;

$X_{7b}$ is an amino acid selected from asparagine and lysine.

In a more preferred embodiment, CDRH2 of the anti-PD-1 antibody or antigen binding portion thereof of the present invention is selected from GVNPSNGGTNYNENYK (SEQ. ID NO.: 8), GVNPSNGGTNYNQNYK (SEQ. ID NO.: 26) or GVNPSNSGTNYNENYK (SEQ. ID NO.: 9).

In an alternate preferred embodiment, the CDRH2 of the anti-PD-1 antibody or antigen binding portion thereof of the present invention is IWYDGSKRY (SEQ. ID NO.: 30).

In one embodiment, the CDR3 of the heavy chain (herein after referred as CDRH3) of the anti-PD-1 antibody or antigen binding portion thereof of the present invention has an amino acid sequence of general formula (III): $A_{1c}$-$X_{1c}$-$A_{2c}$-$X_{2c}$-$A_{3c}$-$X_{3c}$-$A_{4c}$-$X_{4c}$-$X_{5c}$-$A_{5c}$ wherein, $A_{1c}$ may be optionally present and when present represents arginine;

$X_{1c}$ is an amino acid selected from aspartic acid, asparagine and glutamic acid;

$A_{2c}$ is an amino acid or dipeptide selected from asparagine, serine and threonine or Tyr-Arg;

$X_{2c}$ is an amino acid selected from tyrosine, histidine, aspartic acid, glutamic acid, glycine and phenylalanine;

$A_{3c}$ is an amino acid selected from aspartic acid, tyrosine, isoleucine, phenylalanine, histidine and tryptophan;

$X_{3c}$ may be optionally present and when present represents an amino acid selected from isoleucine, leucine, valine, alanine, glutamine and methionine;

$A_{4c}$ may be optionally present and when present represents glycine;

$X_{4c}$ may be optionally present and when present represents an amino acid selected from tyrosine, histidine and phenylalanine;

$X_{5c}$ may be optionally present and when present represents an amino acid selected from aspartic acid and glutamic acid;

$A_{5c}$ may be optionally present and when present represents tyrosine.

In one of the embodiments, the CDRH3 of the heavy chain of the anti-PD-1 antibody or antigen binding portion thereof of the present invention has an amino acid sequence of the formula (IIIa): R-$X_{1c}$-Y-R-$X_{2c}$-D-$X_{3c}$-G-$X_{4c}$-$X_{5c}$-Y wherein, Each of $X_{1c}$ and $X_{5c}$ independently represents an amino acid selected from aspartic acid and glutamic acid;

Each of $X_{2c}$ and $X_{4c}$ independently represents an amino acid selected from tyrosine, histidine and phenylalanine;

$X_{3c}$ is an amino acid selected from isoleucine, leucine, valine, alanine, glutamine and methionine.

In a more preferred embodiment CDRH3 of the anti-PD-1 antibody or antigen binding portion thereof of the present invention is selected from RDYRYDMGFDY (SEQ. ID NO.: 32) or RDYRYDMGYDY (SEQ. ID NO.: 33) or RDYRYDMGHDY (SEQ. ID NO.: 47).

In an alternate preferred embodiment, the CDRH3 of the anti-PD-1 antibody or antigen binding portion thereof of the present invention is ESEY (SEQ. ID NO.: 48) or NNDI (SEQ. ID NO.: 49) or NSDF (SEQ. ID NO.: 50) or NSDH (SEQ. ID NO.: 51) or NSDY (SEQ. ID NO.: 52) or NSGY (SEQ. ID NO.: 53) or NTDW (SEQ. ID NO.: 54) or NTDY (SEQ. ID NO.: 55).

In one embodiment, CDR1 of light chain (herein after referred as CDRL1) of the anti-PD-1 antibody or antigen binding portion thereof of the present invention has an amino acid sequence of general formula (IV): $A_{1d}$-$X_{1d}$-$A_{2d}$-$X_{2d}$-$X_{3d}$-$A_{3d}$-$X_{4d}$-$A_{4d}$-$X_{5d}$-$A_{5d}$ wherein, $A_{1d}$ is dipeptide or tripeptide selected from Gln-Ser or Arg-Ala-Ser;

$X_{1d}$ is an amino acid selected from valine, glutamic acid and lysine;

$A_{2d}$ is an amino acid selected from glycine and serine;

$X_{2d}$ is an amino acid selected from isoleucine, leucine, valine, alanine, serine and methionine;

$X_{3d}$ is an amino acid selected from serine, tyrosine and glutamic acid;

$A_{3d}$ may be optionally present and when present represents an amino acid selected from threonine;

$X_{4d}$ may be optionally present and when present represents an amino acid selected from serine, aspartic acid and glutamic acid.

$A_{4d}$ may be optionally present and when present represents a tetrapeptide Gly-Tyr-Ser-Tyr;

$X_{5d}$ may be optionally present and when present represents an amino acid selected from isoleucine, leucine, valine, alanine and methionine;

$A_{6d}$ may be optionally present and when present represents histidine.

In one of the preferred embodiments, CDRL1 of light chain (of the anti-PD-1 antibody or antigen binding portion thereof of the present invention has an amino acid sequence of the formula (IVa): R-A-S-$X_{1d}$-G-$X_{2d}$-$X_{3d}$-T-$X_{4d}$-G-Y-S-Y-$X_{5d}$-H wherein, $X_{1d}$ is an amino acid selected from glutamic acid and lysine;

Each of $X_{2d}$ and $X_{5d}$ independently represents an amino acid selected from isoleucine, leucine, valine, alanine and methionine;

$X_{3d}$ is an amino acid selected from serine and glutamic acid;

$X_{4d}$ is an amino acid selected from serine, aspartic acid and glutamic acid.

In a more preferred embodiment CDRL1 of the anti-PD-1 antibody or antigen binding portion thereof of the present invention is RASKGVSTSGYSYLH (SEQ. ID NO.: 77).

In an alternate preferred embodiment CDRL1 of the anti-PD-1 antibody or antigen binding portion thereof of the present invention is QSVSSY (SEQ. ID NO.: 81).

In one embodiment, CDRL2 of light chain (herein after referred as CDRL2) of anti-PD-1 antibody or antigen binding portion thereof has amino acid sequence of general formula (V): $A_{1e}$-$X_{1e}$-$A_{2e}$-$X_{2e}$-$A_{3e}$ wherein, $A_{1e}$ may be optionally present and when present represents a dipeptide Leu-Ala;

$X_{1e}$ is an amino acid selected from serine, aspartic acid and glutamic acid;

$A_{2e}$ is an amino acid selected from tyrosine or alanine;

$X_{2e}$ is an amino acid selected from isoleucine, leucine, valine, alanine, serine and methionine;

$A_{3e}$ may be optionally present and when present represents dipeptide Glu-Ser.

In one of the preferred embodiments, CDRL2 of light chain of anti-PD-1 antibody or antigen binding portion thereof has amino acid sequence of the formula (Va): L-A-$X_{1e}$-Y-$X_{2e}$-E-S wherein, $X_{1e}$ is an amino acid selected from serine, aspartic acid and glutamic acid;

$X_{2e}$ is an amino acid selected from isoleucine, leucine, valine, alanine and methionine.

In a more preferred embodiment CDRL2 of the anti-PD-1 antibody or antigen binding portion thereof of the present invention is LASYLES (SEQ. ID NO.: 108).

In an alternate preferred embodiment CDRL2 of the anti-PD-1 antibody or antigen binding portion thereof of the present invention is DAS (SEQ. ID NO.: 112).

In one embodiment, CDR3 of light chain (herein after referred as CDRL3) of anti-PD-1 antibody or antigen binding portion thereof has amino acid sequence of general formula (VI): $A_{1f}$-$X_{1f}$-$A_{2f}$-$X_{2f}$-$X_{3f}$-$X_{4f}$-$X_{5f}$-$X_{6f}$ wherein, $A_{1f}$ is dipeptide selected from Gln-His and Gln-Gln;

$X_{1f}$ is an amino acid sequence selected from serine, arginine, aspartic acid and glutamic acid;

$A_{2f}$ is an amino acid selected from arginine and serine;

$X_{2f}$ is an amino acid selected from aspartic acid, asparagine and glutamic acid;

Each of $X_{3f}$ and $X_{5f}$ independently represents an amino acid sequence selected from isoleucine, leucine, valine, alanine, tryptophan, arginine and methionine;

$X_{4f}$ is proline;

$X_{6f}$ is threonine.

In one of the preferred embodiments, CDRL3 of light chain of anti-PD-1 antibody or antigen binding portion thereof has amino acid sequence formula (VIa): Q-H-$X_{1f}$-R-$X_{2f}$-$X_{3f}$-P-$X_{4f}$-T wherein, $X_{1f}$ is an amino acid sequence selected from serine, arginine, aspartic acid and glutamic acid;

$X_{2f}$ is an amino acid selected from aspartic acid and glutamic acid;

Each of $X_{3f}$ and $X_{4f}$ independently represents an amino acid sequence selected from isoleucine, leucine, valine, alanine and methionine.

In a more preferred embodiment CDRL3 of the anti-PD-1 antibody or antigen binding portion thereof of the present invention is QHSRDLPLT (SEQ. ID NO.: 132).

In an alternate preferred embodiment CDRL3 of the anti-PD-1 antibody or antigen binding portion thereof of the present invention is QQSSNWPRT (SEQ. ID NO.: 136).

In one of the preferred embodiments, CDRH1, CDRH2, CDRH3, CDRL1, CDRL2 and CDRL3 of the anti-PD-1 antibody or antigen binding portion thereof of the present invention is selected from the amino acid sequences as given in below table 1.

TABLE 1

| Seq. ID No. | CDR region | Amino acid sequence of CDR region |
|---|---|---|
| 1 | CDRH1 | NYYLY |
| 2 | CDRH1 | NYYVY |
| 3 | CDRH1 | NYYIY |
| 4 | CDRH1 | TYYIY |
| 5 | CDRH1 | TYYVY |
| 6 | CDRH1 | TYYMY |
| 7 | CDRH1 | GITFSNSG |
| 8 | CDRH2 | GVNPSNGGTNYNENYK |
| 9 | CDRH2 | GVNPSNSGTNYNENYK |
| 10 | CDRH2 | GVNPSNSGTNYNQNYK |
| 11 | CDRH2 | GVNPSNGSTNYNQNYK |
| 12 | CDRH2 | GMNPSNGGTNYNENYK |
| 13 | CDRH2 | GMNPSNGSTNYNQNYK |
| 14 | CDRH2 | GVNSSNGGTNYNENYK |
| 15 | CDRH2 | GINSSNGGTNYNENYK |
| 16 | CDRH2 | GVNSSNGSTNYNENYK |
| 17 | CDRH2 | GLNSSNGSTNYNENYK |
| 18 | CDRH2 | GVNPSNGGTNYSEKYK |
| 19 | CDRH2 | GVNPSNGGTNYSEKFK |
| 20 | CDRH2 | GLNPSNSGTNYNENYK |

TABLE 1-continued

AMINO ACID SEQUENCES OF CDR REGION

| Seq. ID No. | CDR region | Amino acid sequence of CDR region |
|---|---|---|
| 21 | CDRH2 | GLNPSNGSTNYNENYK |
| 22 | CDRH2 | GINPSNGGTNYNENYK |
| 23 | CDRH2 | GVNPSNGGTNFNENYK |
| 24 | CDRH2 | GVNPSNGGTNYNEKYK |
| 25 | CDRH2 | GVNPSNGGTNYNENFK |
| 26 | CDRH2 | GVNPSNGGTNYNQNYK |
| 27 | CDRH2 | GVNPSNSGTNYNQNYK |
| 28 | CDRH2 | GVNPSNGSTNYNQNYK |
| 29 | CDRH2 | GMNPSNGGTNYNENYK |
| 30 | CDRH2 | IWYDGSKRY |
| 31 | CDRH3 | RDYRFDMGYDY |
| 32 | CDRH3 | RDYRYDMGFDY |
| 33 | CDRH3 | RDYRYDMGYDY |
| 34 | CDRH3 | REYRFDMGYDY |
| 35 | CDRH3 | REYRFDMGYEY |
| 36 | CDRH3 | REYRYDMGYEY |
| 37 | CDRH3 | RDYRYDLGYDY |
| 38 | CDRH3 | REYRYDMGFDY |
| 39 | CDRH3 | RDYRYDMGFEY |
| 40 | CDRH3 | RDYRYDMGYEY |
| 41 | CDRH3 | REYRYDMGYEY |
| 42 | CDRH3 | RDYRYDIGFDY |
| 43 | CDRH3 | REYRYDIGYDY |
| 44 | CDRH3 | REYRYDIGYEY |
| 45 | CDRH3 | RDYRYDQGYDY |
| 46 | CDRH3 | REYRYDQGYEY |
| 47 | CDRH3 | RDYRYDMGHDY |
| 48 | CDRH3 | ESEY |
| 49 | CDRH3 | NNDI |
| 50 | CDRH3 | NSDF |
| 51 | CDRH3 | NSDH |
| 52 | CDRH3 | NSDY |
| 53 | CDRH3 | NSGY |
| 54 | CDRH3 | NTDW |
| 55 | CDRH3 | NTDY |
| 56 | CDRL1 | RASKGVSTSGYSFLH |
| 57 | CDRL1 | RASKGVSTSGYSWLH |
| 58 | CDRL1 | RASKGVSTSGYSYLY |
| 59 | CDRL1 | RASKGVSTSGYSYIY |
| 60 | CDRL1 | RASKGVSTSGYSFLY |
| 61 | CDRL1 | RASKGVSTSGYTYLY |
| 62 | CDRL1 | RASKNVSTSGYSYLY |
| 63 | CDRL1 | RASEGVSTSGYSYLH |
| 64 | CDRL1 | RASEGVSTSGFSYIH |
| 65 | CDRL1 | RASKNVSTTGFSYLH |
| 66 | CDRL1 | RASKNVSSTSYSYLH |
| 67 | CDRL1 | RASKNVSSTSFSYLY |
| 68 | CDRL1 | RASKGVSSTSFSYIH |
| 69 | CDRL1 | RASRGISTSGYSYIH |
| 70 | CDRL1 | RASEGISTSGYSYIH |
| 71 | CDRL1 | RASEGLDTSGYSYIH |
| 72 | CDRL1 | RASEGLETSGYSYIH |
| 73 | CDRL1 | RASEGISTSGYSYVH |
| 74 | CDRL1 | RASKGISTDGYSYMH |
| 75 | CDRL1 | RASKGISTEGYSYMH |
| 76 | CDRL1 | RADKGVSTSGYSYMH |
| 77 | CDRL1 | RASKGVSTSGYSYLH |
| 78 | CDRL1 | RASKSVSTSGFSYLH |
| 79 | CDRL1 | RASQSVSSYLA |
| 80 | CDRL1 | RGSKGVSSGIYSYLH |
| 81 | CDRL1 | QSVSSY |
| 82 | CDRL2 | IASYLES |
| 83 | CDRL2 | MASYLES |
| 84 | CDRL2 | VASYLES |
| 85 | CDRL2 | FASYLES |
| 86 | CDRL2 | AASYLES |
| 87 | CDRL2 | IASFLES |
| 88 | CDRL2 | IASWLES |
| 89 | CDRL2 | IASHLES |
| 90 | CDRL2 | MASFLES |
| 91 | CDRL2 | MASWLES |
| 92 | CDRL2 | LASYLQS |
| 93 | CDRL2 | IASYLQS |
| 94 | CDRL2 | IASFLQS |
| 95 | CDRL2 | LASFLQS |

TABLE 1-continued

AMINO ACID SEQUENCES OF CDR REGION

| Seq. ID No. | CDR region | Amino acid sequence of CDR region |
|---|---|---|
| 96 | CDRL2 | LASWLQS |
| 97 | CDRL2 | IASWLQS |
| 98 | CDRL2 | VASWLQS |
| 99 | CDRL2 | AASFLES |
| 100 | CDRL2 | LADYLES |
| 101 | CDRL2 | LADYIES |
| 102 | CDRL2 | LADYVES |
| 103 | CDRL2 | LAEYMES |
| 104 | CDRL2 | LAEYVES |
| 105 | CDRL2 | LADYLEDY |
| 106 | CDRL2 | LADYIEDY |
| 107 | CDRL2 | LAEYLEDY |
| 108 | CDRL2 | LASYLES |
| 109 | CDRL2 | LASNLES |
| 110 | CDRL2 | DASNRAT |
| 111 | CDRL2 | KASSLES |
| 112 | CDRL2 | DAS |
| 113 | CDRL3 | QHSRELPLT |
| 114 | CDRL3 | QHSRNLPLT |
| 115 | CDRL3 | QHSREIPLT |
| 116 | CDRL3 | QHSRNIPLT |
| 117 | CDRL3 | QHSRDIPLT |
| 118 | CDRL3 | QHSRDFPLT |
| 119 | CDRL3 | QHSRNFPLT |
| 120 | CDRL3 | QHSRDIPIT |
| 121 | CDRL3 | QHSRDFPIT |
| 122 | CDRL3 | QRSRDLPLT |
| 123 | CDRL3 | QKSRDLPLT |
| 124 | CDRL3 | QYSRDLPIT |
| 125 | CDRL3 | QRSRDIPLT |
| 126 | CDRL3 | QKSRDIPLT |
| 127 | CDRL3 | QYSRDIPLT |
| 128 | CDRL3 | QHERDLPLT |
| 129 | CDRL3 | QHERDIPLT |
| 130 | CDRL3 | QHRRDIPVT |
| 131 | CDRL3 | QHDRDLPMT |
| 132 | CDRL3 | QHSRDLPLT |
| 133 | CDRL3 | QHSWELPLT |
| 134 | CDRL3 | QHYSNYPLT |
| 135 | CDRL3 | QHSRDAPLT |
| 136 | CDRL3 | QQSSNVVPRT |

In one of the embodiments, the present invention provides anti-PD-1 antibody or antigen binding portion thereof comprising:

(a) CDRH1 of the general formula (I): $X_{1a}$-$A_{1a}$-$X_{2a}$-$A_{2a}$;
(b) CDRH2 of the general formula (II): $A_{1b}$-$X_{1b}$-$A_{2b}$-$X_{2b}$-$X_{3b}$-$A_{3b}$-$X_{4b}$-$X_{5b}$-$X_{6b}$-$X_{7b}$-$X_{8b}$-$A_{4b}$;
(c) CDRH3 of the general formula (III): $A_{1c}$-$X_{1c}$-$A_{2c}$-$X_{2c}$-$A_{3c}$-$X_{3c}$-$A_{4c}$-$X_{4c}$-$X_{5c}$-$A_{5c}$;
(d) CDRL1 of the general formula (IV): $A_{1d}$-$X_{1d}$-$A_{2d}$-$X_{2d}$-$X_{3d}$-$A_{3d}$-$X_{4d}$-$A_{4d}$-$X_{5d}$-$A_{5d}$;
(e) CDRL2 of the general formula (V): $A_{1e}$-$X_{1e}$-$A_{2e}$-$X_{2e}$-$A_{3e}$ and
(f) CDRL3 of the general formula (VI): $A_{1f}$-$X_{1f}$-$A_{2f}$-$X_{2f}$-$X_{3f}$-$X_{4f}$-$X_{5f}$-$X_{6f}$ wherein, $X_{1a}$ is an amino acid selected from asparagine, glycine and threonine;

$A_{1a}$ is a dipeptide selected from Tyr-Tyr and Ile-Thr;

$X_{2a}$ is an amino acid selected from isoleucine, leucine, valine, phenylalanine, methionine and alanine;

$A_{2a}$ is single amino acid or dipeptide or tripeptide or tetrapeptide selected from tyrosine, asparagine, serine, glycine, Asn-Ser, Asn-Ser-Gly and Ser-Asn-Ser-Gly;

$A_{1b}$ is optionally present and when present represents glycine;

$X_{1b}$ is an amino acid selected from methionine, isoleucine, leucine, glycine, valine and alanine;

$A_{2b}$ is tripeptide or tetrapeptide selected from Asn-Pro-Ser-Asn or Trp-Tyr-Asp;

Each of $X_{2b}$ and $X_{3b}$ independently represents an amino acid selected from glycine and serine;

$A_{3b}$ is single amino acid or dipeptide selected from lysine or Thr-Asn;

$X_{4b}$ is an amino acid selected from tyrosine, arginine and phenylalanine;

$X_{5b}$ is an amino acid selected from serine, tyrosine and asparagine;

$X_{6b}$ may be optionally present and when present represents an amino acid selected from glutamic acid and glutamine;

$X_{7b}$ may be optionally present and when present represents an amino acid selected from asparagine and lysine;

$X_{8b}$ may be optionally present and when present represents an amino acid selected from tyrosine and phenylalanine;

$A_{4b}$ may be optionally present and when present represents lysine;

$A_{1c}$ may be optionally present and when present represents arginine;

$X_{1c}$ is an amino acid selected from aspartic acid, asparagine and glutamic acid;

$A_{2c}$ is an amino acid or dipeptide selected from asparagine, serine and threonine or Tyr-Arg;

$X_{2c}$ is an amino acid selected from tyrosine, histidine, aspartic acid, glutamic acid, glycine and phenylalanine;

$A_{3c}$ is an amino acid selected from aspartic acid, tyrosine, isoleucine, phenylalanine, histidine and tryptophan;

$X_{3c}$ may be optionally present and when present represents an amino acid selected from isoleucine, leucine, valine, alanine, glutamine and methionine;

$A_{4c}$ may be optionally present and when present represents glycine;

$X_{4c}$ may be optionally present and when present represents an amino acid selected from tyrosine, histidine and phenylalanine;

$X_{5c}$ may be optionally present and when present represents an amino acid selected from aspartic acid and glutamic acid;

$A_{5c}$ may be optionally present and when present represents tyrosine;

$A_{1d}$ is dipeptide or tripeptide selected from Gln-Ser or Arg-Ala-Ser;

$X_{1d}$ is an amino acid selected from valine, glutamic acid and lysine;

$A_{2d}$ is an amino acid selected from glycine and serine;

$X_{2d}$ is an amino acid selected from isoleucine, leucine, valine, alanine, serine and methionine;

$X_{3d}$ is an amino acid selected from serine, tyrosine and glutamic acid;

$A_{3d}$ may be optionally present and when present represents an amino acid selected from threonine;

$X_{4d}$ may be optionally present and when present represents an amino acid selected from serine, aspartic acid and glutamic acid;

$A_{4d}$ may be optionally present and when present represents tetrapeptide Gly-Tyr-Ser-Tyr;

$X_{5d}$ may be optionally present and when present represents an amino acid selected from isoleucine, leucine, valine, alanine and methionine;

$A_{5d}$ may be optionally present and when present represents histidine;

$A_{1e}$ may be optionally present and when present represents dipeptide Leu-Ala;

$X_{1e}$ is an amino acid selected from serine, aspartic acid and glutamic acid;

$A_{2e}$ is an amino acid selected from tyrosine or alanine;

$X_{2e}$ is an amino acid selected from isoleucine, leucine, valine, alanine, serine and methionine;

$A_{3e}$ may be optionally present and when present represents dipeptide Glu-Ser;

$A_{1f}$ is dipeptide selected from Gln-His and Gln-Gln;

$X_{1f}$ is an amino acid sequence selected from serine, arginine, aspartic acid and glutamic acid;

$A_{2f}$ is an amino acid selected from arginine and serine;

$X_{2f}$ is an amino acid selected from aspartic acid, asparagine and glutamic acid;

Each of $X_{3f}$ and $X_{5f}$ independently represents an amino acid sequence selected from isoleucine, leucine, valine, alanine, tryptophan, arginine and methionine;

$X_{4f}$ is proline;

$X_{6f}$ is threonine, with the proviso that asparagine as $X_{1a}$ and methionine as $X_{2a}$ are not present together.

In one of the preferred embodiments, the present invention provides anti-PD-1 antibody or antigen binding portion thereof comprising:

(a) CDRH1 comprising amino acid sequence of the formula (Ia): $X_{1a}$-Y-Y-$X_{2a}$-Y;

(b) CDRH2 comprising amino acid sequence of the formula (IIa): G-$X_{1b}$-N-P-S-N-$X_{2b}$-$X_{3b}$-T-N-$X_{4b}$-$X_{5b}$-$X_{6b}$-$X_{7b}$-$X_{8b}$-K and (c) CDRH3 comprising amino acid sequence of the formula (IIIa): R-$X_{1c}$-Y-R-$X_{2c}$-D-$X_{3c}$-G-$X_{4c}$-$X_{5c}$-Y;

(d) CDRL1 comprising amino acid sequence of the formula (IVa): R-A-S-$X_{1d}$-G-$X_{2d}$-$X_{3d}$-T-$X_{4d}$-G-Y-S-Y-$X_{5d}$-H;

(e) CDRL2 comprising amino acid sequence of the formula (Va): L-A-$X_{1e}$-Y-$X_{2e}$-E-S;

(f) CDRL3 comprising amino acid sequence of the formula (VIa): Q-H-$X_{1f}$-R-$X_{2f}$-$X_{3f}$-P-$X_{4f}$-T wherein $X_{1a}$ is an amino acid selected from asparagine and threonine;

$X_{2a}$ is an amino acid selected from isoleucine, leucine, valine, methionine and alanine;

$X_{1b}$ is an amino acid selected from methionine, isoleucine, leucine, glycine, valine and alanine;

Each of $X_{2b}$ and $X_{3b}$ independently represents an amino acid selected from glycine and serine;

Each of $X_{4b}$ and $X_{8b}$ independently represents an amino acid selected from tyrosine and phenylalanine;

$X_{5b}$ is an amino acid selected from serine and asparagine;

$X_{6b}$ is an amino acid selected from glutamic acid and glutamine;

$X_{7b}$ is an amino acid selected from asparagine and lysine;

Each of $X_{1c}$ and $X_{5c}$ independently represents an amino acid selected from aspartic acid and glutamic acid;

Each of $X_{2c}$ and $X_{4c}$ independently represents an amino acid selected from tyrosine, histidine and phenylalanine;

$X_{3c}$ is an amino acid selected from isoleucine, leucine, valine, alanine, glutamine and methionine;

$X_{1d}$ is an amino acid selected from glutamic acid and lysine

Each of $X_{2d}$ and $X_{5d}$ independently represents an amino acid selected from isoleucine, leucine, valine, alanine and methionine;

$X_{3d}$ is an amino acid selected from serine and glutamic acid;

$X_{4d}$ is an amino acid selected from serine, aspartic acid and glutamic acid;

$X_{1e}$ is an amino acid selected from serine, aspartic acid and glutamic acid;

$X_{2e}$ is an amino acid selected from isoleucine, leucine, valine, alanine and methionine;

$X_{1f}$ is an amino acid sequence selected from serine, arginine, aspartic acid and glutamic acid;

$X_{2f}$ is an amino acid selected from aspartic acid and glutamic acid;

Each of $X_{3f}$ and $X_{4f}$ independently represents an amino acid sequence selected from isoleucine, leucine, valine, alanine and methionine, with the proviso that asparagine as $X_{1a}$ and methionine as $X_{2a}$ are not present together.

In one of the preferred embodiments, the amino acid sequences of CDRH1, CDRH2 and CDRH3 of anti-PD-1 antibody or antigen binding portion thereof of the present invention are TYYIY (SEQ. ID NO.: 4), GVNPSNGGTNYNENYK (SEQ. ID NO.: 8) and RDYRYDMGFDY (SEQ. ID NO.: 32) respectively.

In another of the preferred embodiments, the amino acid sequences of CDRH1, CDRH2 and CDRH3 of anti-PD-1 antibody or antigen binding portion thereof of the present invention are TYYIY (SEQ. ID NO.: 4), GVNPSNGGTNYNENYK (SEQ. ID NO.: 8) and RDYRYDMGYDY (SEQ. ID NO.: 33) respectively.

In a still another of the preferred embodiments, the amino acid sequences of CDRH1, CDRH2 and CDRH3 of anti-PD-1 antibody or antigen binding portion thereof of the present invention are TYYIY (SEQ. ID NO.: 4), GVNPSNGGTNYNENYK (SEQ. ID NO.: 8) and RDYRYDMGHDY (SEQ. ID NO.: 47) respectively.

In another of the preferred embodiments, the amino acid sequences of CDRH1, CDRH2 and CDRH3 of anti-PD-1 antibody or antigen binding portion thereof of the present invention are TYYIY (SEQ. ID NO.: 4), GVNPSNSGTNYNENYK (SEQ. ID NO.: 9) and RDYRYDMGFDY (SEQ. ID NO.: 32) respectively.

In yet another of the preferred embodiments, the amino acid sequences of CDRH1, CDRH2 and CDRH3 of anti-PD-1 antibody or antigen binding portion thereof of the present invention are TYYIY (SEQ. ID NO.: 4), GVNPSNSGTNYNENYK (SEQ. ID NO.: 9) and RDYRYDMGYDY (SEQ. ID NO.: 33) respectively.

In still another of the preferred embodiments, the amino acid sequences of CDRH1, CDRH2 and CDRH3 of anti-PD-1 antibody or antigen binding portion thereof of the present invention are TYYIY (SEQ. ID NO.: 4), GVNPSNSGTNYNENYK (SEQ. ID NO.: 9) and RDYRYDMGHDY (SEQ. ID NO.: 47) respectively.

In another of the preferred embodiments, the amino acid sequences of CDRH1, CDRH2 and CDRH3 of anti-PD-1 antibody or antigen binding portion thereof of the present invention are TYYIY (SEQ. ID NO.: 4), GVNPSNGGTNYNQNYK (SEQ. ID NO.: 26) and RDYRYDMGFDY (SEQ. ID NO.: 32) respectively.

In another of the preferred embodiments, the amino acid sequences of CDRH1, CDRH2 and CDRH3 of anti-PD-1 antibody or antigen binding portion thereof of the present invention are TYYIY (SEQ. ID NO.: 4), GVNPSNGGTNYNQNYK (SEQ. ID NO.: 26) and RDYRYDMGYDY (SEQ. ID NO.: 33) respectively.

In yet another of the preferred embodiments, the amino acid sequences of CDRH1, CDRH2 and CDRH3 of anti-PD-1 antibody or antigen binding portion thereof of the present invention are TYYIY (SEQ. ID NO.: 4), GVNPSNGGTNYNQNYK (SEQ. ID NO.: 26) and RDYRYDMGHDY (SEQ. ID NO.: 47) respectively.

In another of the preferred embodiments, the amino acid sequences of CDRH1, CDRH2 and CDRH3 of anti-PD-1 antibody or antigen binding portion thereof of the present invention are GITFSNSG (SEQ. ID NO.: 7), IWYDGSKRY (SEQ. ID NO.: 30) and NSDF (SEQ. ID NO.: 50) respectively.

In another of the preferred embodiments, the amino acid sequences of CDRH1, CDRH2 and CDRH3 of anti-PD-1 antibody or antigen binding portion thereof of the present invention are GITFSNSG (SEQ. ID NO.: 7), IWYDGSKRY (SEQ. ID NO.: 30) and NSDH (SEQ. ID NO.: 51) respectively.

In one of the preferred embodiments, the amino acid sequences of CDRH1, CDRH2 and CDRH3 of anti-PD-1 antibody or antigen binding portion thereof of the present invention are GITFSNSG (SEQ. ID NO.: 7), IWYDGSKRY (SEQ. ID NO.: 30) and NSDY (SEQ. ID NO.: 52) respectively.

In another of the preferred embodiments, the amino acid sequences of CDRH1, CDRH2 and CDRH3 of anti-PD-1 antibody or antigen binding portion thereof of the present invention are GITFSNSG (SEQ. ID NO.: 7), IWYDGSKRY (SEQ. ID NO.: 30) and NTDW (SEQ. ID NO.: 54) respectively.

In one of the preferred embodiments, the amino acid sequences of CDRH1, CDRH2 and CDRH3 of anti-PD-1 antibody or antigen binding portion thereof of the present invention are GITFSNSG (SEQ. ID NO.: 7), IWYDGSKRY (SEQ. ID NO.: 30) and NTDY (SEQ. ID NO.: 55) respectively.

In one of the preferred embodiments, the amino acid sequences of CDRL1, CDRL2 and CDRL3 of anti-PD-1 antibody or antigen binding portion thereof of the present invention are RASKGVSTSGYSYLH (SEQ. ID NO.: 77), LASYLES (SEQ. ID NO.: 108) and QHSRDLPLT (SEQ. ID NO.: 132) respectively.

In another of the preferred embodiments, the amino acid sequences of CDRL1, CDRL2 and CDRL3 of anti-PD-1 antibody or antigen binding portion thereof of the present invention are QSVSSY (SEQ. ID NO.: 81), DAS (SEQ. ID NO.: 112) and QQSSNWPRT (SEQ. ID NO.: 136) respectively.

In another embodiment, the present invention provides an antibody, or antigen-binding portion thereof comprising:
(a) CDRH1 comprising an amino acid sequence selected from the group consisting of SEQ ID NOs: 1, 2, 3, 4, 5, 6 and 7;
(b) CDRH2 comprising an amino acid sequence selected from the group consisting of SEQ ID NOs: 8, 9, 10, 11, 12, 13, 14, 15, 16, 17, 18, 19, 20, 21, 22, 23, 24, 25, 26, 27, 28, 29 and 30;
(c) CDRH3 comprising an amino acid sequence selected from the group consisting of SEQ ID NOs: 31, 32, 33, 34, 35, 36, 37, 38, 39, 40, 41, 42, 43, 44, 45, 46, 47, 48, 49, 50, 51, 52, 53, 54 and 55;
(d) CDRL1 comprising an amino acid sequence selected from the group consisting of SEQ ID NOs: 56, 57, 58, 59, 60, 61, 62, 63, 64, 65, 66, 67, 68, 69, 70, 71, 72, 73, 74, 75, 76, 77, 78, 79, 80 and 81;
(e) CDRL2 comprising an amino acid sequence selected from the group consisting of SEQ ID NOs: 82, 83, 84, 85, 86, 87, 88, 89, 90, 91, 92, 93, 94, 95, 96, 97, 98, 99, 100, 101, 102, 103, 104, 105, 106, 107, 108, 109, 110, 111 and 112; and
(f) CDRL3 comprising an amino acid sequence selected from the group consisting of SEQ ID NOs: 113, 114, 115, 116, 117, 118, 119, 120, 121, 122, 123, 124, 125, 126, 127, 128, 129, 130, 131, 132, 133, 134, 135 and 136;
wherein, the antibody specifically binds PD-1, preferably human PD-1.

In one of the embodiments, HCVR and LCVR of the anti-PD-1 antibody or the antigen binding portion thereof of the present invention is selected from the amino acid sequences as given in below table 2.

TABLE 2

AMINO ACID SEQUENCES OF VARIABLE REGION

| Seq ID No. | Variable region | Amino acid sequence of variable region |
|---|---|---|
| 137 | HCVR IP-H4 | QVQLVQSGVEVKKPGASVKVSCKASGYTFTTYYIYW VRQAPGQGLEWMGGVNPSNGGTNYNENYKNRVTL TTDSSTTTAYMELKSLQFDDTAVYYCARRDYRYDM GFDYWGQGTTVTSS |
| 138 | HCVR IP-H4.2 | QVQLVQSGVEVKKPGASVKVSCKASGYTFTTYYIYW VRQAPGQGLEWMGGVNPSNGGTNYNENYKNRVTL TTDSSTTTAYMELKSLQFDDTAVYYCARRDYRYDM GYDYWGQGTTVTSS |

TABLE 2-continued

AMINO ACID SEQUENCES OF VARIABLE REGION

| Seq ID No. | Variable region | Amino acid sequence of variable region |
|---|---|---|
| 139 | HCVR IP-H4.2 (Y.H) | QVQLVQSGVEVKKPGASVKVSCKASGYTFTTYYIYW VRQAPGQGLEWMGGVNPSNGGTNYNENYKNRVTL TTDSSTTTAYMELKSLQFDDTAVYYCARRDYRYDM GHDYWGQGTTVTVSS |
| 140 | HCVR IP-H4.19 | QVQLVQSGVEVKKPGASVKVSCKASGYTFTTYYIYW VRQAPGQGLEWMGGVNPSNSGTNYNENYKNRVTLT TDSSTTTAYMELKSLQFDDTAVYYCARRDYRYDMG FDYWGQGTTVTVSS |
| 141 | HCVR IP-H4.19 (F.Y) | QVQLVQSGVEVKKPGASVKVSCKASGYTFTTYYIYW VRQAPGQGLEWMGGVNPSNSGTNYNENYKNRVTLT TDSSTTTAYMELKSLQFDDTAVYYCARRDYRYDMG YDYWGQGTTVTVSS |
| 142 | HCVR IP-H4.19 (Y.H) | QVQLVQSGVEVKKPGASVKVSCKASGYTFTTYYIYW VRQAPGQGLEWMGGVNPSNSGTNYNENYKNRVTLT TDSSTTTAYMELKSLQFDDTAVYYCARRDYRYDMG HDYWGQGTTVTVSS |
| 143 | HCVR IP-H4.36 | QVQLVQSGVEVKKPGASVKVSCKASGYTFTTYYIYW VRQAPGQGLEWMGGVNPSNGGTNYNQNYKNRVTL TTDSSTTTAYMELKSLQFDDTAVYYCARRDYRYDM GFDYWGQGTTVTVSS |
| 144 | HCVR IP-H4.36 (F.Y) | QVQLVQSGVEVKKPGASVKVSCKASGYTFTTYYIYW VRQAPGQGLEWMGGVNPSNGGTNYNQNYKNRVTL TTDSSTTTAYMELKSLQFDDTAVYYCARRDYRYDM GYDYWGQGTTVTVSS |
| 145 | HCVR IP-H4.36 (Y.H) | QVQLVQSGVEVKKPGASVKVSCKASGYTFTTYYIYW VRQAPGQGLEWMGGVNPSNGGTNYNQNYKNRVTL TTDSSTTTAYMELKSLQFDDTAVYYCARRDYRYDM GHDYWGQGTTVTVSS |
| 146 | HCVR N5 | QVQLVESGGGVVQPGRSLRLDCKASGITFSNSGMHW VRQAPGKGLEWVAVIWYDGSKRYYADSVKGRFTIS RDNSKNTLFLQMNSLRAEDTAVYYCATNSDFWGQG TLVTVSSASTKG |
| 147 | HCVR N6 | QVQLVESGGGVVQPGRSLRLDCKASGITFSNSGMHW VRQAPGKGLEWVAVIWYDGSKRYYADSVKGRFTIS RDNSKNTLFLQMNSLRAEDTAVYYCATNSDHWGQG TLVTVSSASTKG |
| 148 | HCVR N7 | QVQLVESGGGVVQPGRSLRLDCKASGITFSNSGMHW VRQAPGKGLEWVAVIWYDGSKRYYADSVKGRFTIS RDNSKNTLFLQMNSLRAEDTAVYYCATNSDYWGQG TLVTVSSASTKG |
| 149 | HCVR N9 | QVQLVESGGGVVQPGRSLRLDCKASGITFSNSGMHW VRQAPGKGLEWVAVIWYDGSKRYYADSVKGRFTIS RDNSKNTLFLQMNSLRAEDTAVYYCATNTDWWGQG TLVTVSSASTKG |
| 150 | HCVR N10 | QVQLVESGGGVVQPGRSLRLDCKASGITFSNSGMHW VRQAPGKGLEWVAVIWYDGSKRYYADSVKGRFTISR DNSKNTLFLQMNSLRAEDTAVYYCATNTDYWGQGT LVTVSSASTKG |
| 151 | LCVR IP-L1 | EIVLTQSPATLSLSPGERATLSCRASKGVSTSGYSYLH WYQQKPGQAPRLLIYLASYLESGVPARFSGSGSGTDF TLTISSLEPEDFAVYYCQHSRDLPLTFGGGTKVEIK |
| 152 | LCVR NL | EIVLTQSPATLSLSPGERATLSCRASQSVSSYLAWYQQ KPGQAPRLLIYDASNRATGIPARFSGSGSGTDFTLTIS SLEPEDFAVYYCQQSSNWPRTFGQGTKVEIK |

TABLE 3

CDR REGIONS OF SELECTED HCVR SEQUENCES

| Seq ID No. of HCVR | CDRH1 | CDRH2 | CDRH3 |
|---|---|---|---|
| 137 | TYYIY (SEQ. ID NO.: 4) | GVNPSNGGTNYNENYK (SEQ. ID NO.: 8) | RDYRYDMGFDY (SEQ. ID NO.: 32) |
| 138 | TYYIY (SEQ. ID NO.: 4) | GVNPSNGGTNYNENYK (SEQ. ID NO.: 8) | RDYRYDMGYDY (SEQ. ID NO.: 33) |
| 139 | TYYIY (SEQ. ID NO.: 4) | GVNPSNGGTNYNENYK (SEQ. ID NO.: 8) | RDYRYDMGHDY (SEQ. ID NO.: 47) |
| 140 | TYYIY (SEQ. ID NO.: 4) | GVNPSNSGTNYNENYK (SEQ. ID NO.: 9) | RDYRYDMGFDY (SEQ. ID NO.: 32) |
| 141 | TYYIY (SEQ. ID NO.: 4) | GVNPSNSGTNYNENYK (SEQ. ID NO.: 9) | RDYRYDMGYDY (SEQ. ID NO.: 33) |
| 142 | TYYIY (SEQ. ID NO.: 4) | GVNPSNSGTNYNENYK (SEQ. ID NO.: 9) | RDYRYDMGHDY (SEQ. ID NO.: 47) |
| 143 | TYYIY (SEQ. ID NO.: 4) | GVNPSNGGTNYNQNYK (SEQ. ID NO.: 26) | RDYRYDMGFDY (SEQ. ID NO.: 32) |
| 144 | TYYIY (SEQ. ID NO.: 4) | GVNPSNGGTNYNQNYK (SEQ. ID NO.: 26) | RDYRYDMGYDY (SEQ. ID NO.: 33) |
| 145 | TYYIY (SEQ. ID NO.: 4) | GVNPSNGGTNYNQNYK (SEQ. ID NO.: 26) | RDYRYDMGHDY (SEQ. ID NO.: 47) |
| 146 | GITFSNSG (SEQ. ID NO.: 7) | IWYDGSKRY (SEQ. ID NO.: 30) | NSDF (SEQ. ID NO.: 50) |
| 147 | GITFSNSG (SEQ. ID NO.: 7) | IWYDGSKRY (SEQ. ID NO.: 30) | NSDH (SEQ. ID NO.: 51) |
| 148 | GITFSNSG (SEQ. ID NO.: 7) | IWYDGSKRY (SEQ. ID NO.: 30) | NSDY (SEQ. ID NO.: 52) |
| 149 | GITFSNSG (SEQ. ID NO.: 7) | IWYDGSKRY (SEQ. ID NO.: 30) | NTDW (SEQ. ID NO.: 54) |
| 150 | GITFSNSG (SEQ. ID NO.: 7) | IWYDGSKRY (SEQ. ID NO.: 30) | NTDY (SEQ. ID NO.: 55) |

In one of the embodiments, variable region of heavy chain of anti-PD-1 antibody or antigen binding portion thereof of the present invention comprising of CDRH1, CDRH2 and CDRH3 comprising amino acid sequences selected from below given table 3.

In one of the embodiments, variable region of light chain of anti-PD-1 antibody or antigen binding portion thereof of the present invention comprising of CDRL1, CDRL2 and CDRL3 comprising amino acid sequences selected from below given table 4.

TABLE 4

CDR REGIONS OF SELECTED LCVR SEQUENCES

| Seq ID No. of LCVR | CDR regions of LCVR sequences | | |
|---|---|---|---|
| | CDRL1 | CDRL2 | CDRL3 |
| 151 | RASKGVSTSGYSYLH (SEQ. ID NO.: 77) | LASYLES (SEQ. ID NO.: 108) | QHSRDLPLT (SEQ. ID NO.: 132) |
| 152 | QSVSSY (SEQ. ID NO.: 81) | DAS (SEQ. ID NO.: 112) | QQSSNWPRT (SEQ. ID NO.: 136) |

Accordingly, the present invention provides an anti-PD-1 antibody, or antigen-binding portion thereof, comprising a heavy chain variable region and a light chain variable region, wherein:
(a) the heavy chain variable region comprises an amino acid sequence selected from the group consisting of SEQ ID NOs: 137, 138, 139, 140, 141, 142, 143, 144, 145, 146, 147, 148, 149 and 150;
(b) the light chain variable region comprises an amino acid sequence of SEQ ID NO.: 151 and 152.

Preferred Combinations of CDRS

A preferred combination of CDRs of anti-PD-1 antibody or antigen-binding portion thereof according to the present invention comprises:
(a) a heavy chain variable region CDRH1 comprising SEQ ID NO: 4;
(b) a heavy chain variable region CDRH2 comprising SEQ ID NO: 8;
(c) a heavy chain variable region CDRH3 comprising SEQ ID NO: 32;
(d) a light chain variable region CDRL1 comprising SEQ ID NO: 77;
(e) a light chain variable region CDRL2 comprising SEQ ID NO: 108; and
(f) a light chain variable region CDRL3 comprising SEQ ID NO: 132

Another preferred combination of CDRs of anti-PD-1 antibody or antigen-binding portion thereof according to the present invention comprises:
(a) a heavy chain variable region CDRH1 comprising SEQ ID NO: 4;
(b) a heavy chain variable region CDRH2 comprising SEQ ID NO: 9;
(c) a heavy chain variable region CDRH3 comprising SEQ ID NO: 32;
(d) a light chain variable region CDRL1 comprising SEQ ID NO: 77;
(e) a light chain variable region CDRL2 comprising SEQ ID NO: 108; and
(f) a light chain variable region CDRL3 comprising SEQ ID NO: 132

Another preferred combination of CDRs of anti-PD-1 antibody or antigen-binding portion thereof according to the present invention comprises:
(a) a heavy chain variable region CDRH1 comprising SEQ ID NO: 4;
(b) a heavy chain variable region CDRH2 comprising SEQ ID NO: 26;
(c) a heavy chain variable region CDRH3 comprising SEQ ID NO: 32;
(d) a light chain variable region CDRL1 comprising SEQ ID NO: 77;
(e) a light chain variable region CDRL2 comprising SEQ ID NO: 108; and
(f) a light chain variable region CDRL3 comprising SEQ ID NO: 132

More preferred combination of CDRs of anti-PD-1 antibody or antigen-binding portion thereof according to the present invention comprises:
(a) a heavy chain variable region CDRH1 comprising SEQ ID NO: 4;
(b) a heavy chain variable region CDRH2 comprising SEQ ID NO:8;
(c) a heavy chain variable region CDRH3 comprising SEQ ID NO: 33;
(d) a light chain variable region CDRL1 comprising SEQ ID NO: 77;
(e) a light chain variable region CDRL2 comprising SEQ ID NO: 108; and
(f) a light chain variable region CDRL3 comprising SEQ ID NO: 132

More preferred combination of CDRs of anti-PD-1 antibody or antigen-binding portion thereof according to the present invention comprises:
(a) a heavy chain variable region CDRH1 comprising SEQ ID NO: 4;
(b) a heavy chain variable region CDRH2 comprising SEQ ID NO:8;
(c) a heavy chain variable region CDRH3 comprising SEQ ID NO: 47;
(d) a light chain variable region CDRL1 comprising SEQ ID NO: 77;
(e) a light chain variable region CDRL2 comprising SEQ ID NO: 108; and
(f) a light chain variable region CDRL3 comprising SEQ ID NO: 132

Another preferred combination of CDRs of anti-PD-1 antibody or antigen-binding portion thereof according to the present invention comprises:
(a) a heavy chain variable region CDRH1 comprising SEQ ID NO: 4;
(b) a heavy chain variable region CDRH2 comprising SEQ ID NO: 9;
(c) a heavy chain variable region CDRH3 comprising SEQ ID NO: 33;
(d) a light chain variable region CDRL1 comprising SEQ ID NO: 77;
(e) a light chain variable region CDRL2 comprising SEQ ID NO: 108; and
(f) a light chain variable region CDRL3 comprising SEQ ID NO: 132

Another preferred combination of CDRs of anti-PD-1 antibody or antigen-binding portion thereof according to the present invention comprises:

(a) a heavy chain variable region CDRH1 comprising SEQ ID NO: 4;
(b) a heavy chain variable region CDRH2 comprising SEQ ID NO: 9;
(c) a heavy chain variable region CDRH3 comprising SEQ ID NO: 47;
(d) a light chain variable region CDRL1 comprising SEQ ID NO: 77;
(e) a light chain variable region CDRL2 comprising SEQ ID NO: 108; and
(f) a light chain variable region CDRL3 comprising SEQ ID NO: 132

Another preferred combination of CDRs of anti-PD-1 antibody or antigen-binding portion thereof according to the present invention comprises:
(a) a heavy chain variable region CDRH1 comprising SEQ ID NO: 4;
(b) a heavy chain variable region CDRH2 comprising SEQ ID NO: 26;
(c) a heavy chain variable region CDRH3 comprising SEQ ID NO: 33;
(d) a light chain variable region CDRL1 comprising SEQ ID NO: 77;
(e) a light chain variable region CDRL2 comprising SEQ ID NO: 108; and
(f) a light chain variable region CDRL3 comprising SEQ ID NO: 132

Another preferred combination of CDRs of anti-PD-1 antibody or antigen-binding portion thereof according to the present invention comprises:
(a) a heavy chain variable region CDRH1 comprising SEQ ID NO: 4;
(b) a heavy chain variable region CDRH2 comprising SEQ ID NO: 26;
(c) a heavy chain variable region CDRH3 comprising SEQ ID NO: 47;
(d) a light chain variable region CDRL1 comprising SEQ ID NO: 77;
(e) a light chain variable region CDRL2 comprising SEQ ID NO: 108; and
(f) a light chain variable region CDRL3 comprising SEQ ID NO: 132

Another preferred combination of CDRs of anti-PD-1 antibody or antigen-binding portion thereof according to the present invention comprises:
a) a heavy chain variable region CDRH1 comprising SEQ ID NO: 7;
(b) a heavy chain variable region CDRH2 comprising SEQ ID NO: 30;
(c) a heavy chain variable region CDRH3 comprising SEQ ID NO: 50;
(d) a light chain variable region CDRL1 comprising SEQ ID NO: 81;
(e) a light chain variable region CDRL2 comprising SEQ ID NO: 112; and
(f) a light chain variable region CDRL3 comprising SEQ ID NO: 136

Another preferred combination of CDRs of anti-PD-1 antibody or antigen-binding portion thereof according to the present invention comprises:
a) a heavy chain variable region CDRH1 comprising SEQ ID NO: 7;
(b) a heavy chain variable region CDRH2 comprising SEQ ID NO: 30;
(c) a heavy chain variable region CDRH3 comprising SEQ ID NO: 51;
(d) a light chain variable region CDRL1 comprising SEQ ID NO: 81;
(e) a light chain variable region CDRL2 comprising SEQ ID NO: 112; and
(f) a light chain variable region CDRL3 comprising SEQ ID NO: 136

Another preferred combination of CDRs of anti-PD-1 antibody or antigen-binding portion thereof according to the present invention comprises:
a) a heavy chain variable region CDRH1 comprising SEQ ID NO: 7;
(b) a heavy chain variable region CDRH2 comprising SEQ ID NO: 30;
(c) a heavy chain variable region CDRH3 comprising SEQ ID NO: 52;
(d) a light chain variable region CDRL1 comprising SEQ ID NO: 81;
(e) a light chain variable region CDRL2 comprising SEQ ID NO: 112; and
(f) a light chain variable region CDRL3 comprising SEQ ID NO: 136

Another preferred combination of CDRs of anti-PD-1 antibody or antigen-binding portion thereof according to the present invention comprises:
a) a heavy chain variable region CDRH1 comprising SEQ ID NO: 7;
(b) a heavy chain variable region CDRH2 comprising SEQ ID NO: 30;
(c) a heavy chain variable region CDRH3 comprising SEQ ID NO: 54;
(d) a light chain variable region CDRL1 comprising SEQ ID NO: 81;
(e) a light chain variable region CDRL2 comprising SEQ ID NO: 112; and
(f) a light chain variable region CDRL3 comprising SEQ ID NO: 136

Another preferred combination of CDRs of anti-PD-1 antibody or antigen-binding portion thereof according to the present invention comprises:
a) a heavy chain variable region CDRH1 comprising SEQ ID NO: 7;
(b) a heavy chain variable region CDRH2 comprising SEQ ID NO: 30;
(c) a heavy chain variable region CDRH3 comprising SEQ ID NO: 55;
(d) a light chain variable region CDRL1 comprising SEQ ID NO: 81;
(e) a light chain variable region CDRL2 comprising SEQ ID NO: 112; and
(f) a light chain variable region CDRL3 comprising SEQ ID NO: 136

Preferred Combinations of Variable Regions

A preferred combination of HCVR and LCVR of anti-PD-1 antibody or antigen-binding portion thereof according to the present invention comprises:
(a) a heavy chain variable region comprising the amino acid sequence of SEQ ID NO: 137; and
(b) a light chain variable region comprising the amino acid sequence of SEQ ID NO: 151

A preferred combination of HCVR and LCVR of anti-PD-1 antibody or antigen-binding portion thereof according to the present invention comprises:
(a) a heavy chain variable region comprising the amino acid sequence of SEQ ID NO: 138; and
(b) a light chain variable region comprising the amino acid sequence of SEQ ID NO: 151

A preferred combination of HCVR and LCVR of anti-PD-1 antibody or antigen-binding portion thereof according to the present invention comprises:
  (a) a heavy chain variable region comprising the amino acid sequence of SEQ ID NO: 139; and
  (b) a light chain variable region comprising the amino acid sequence of SEQ ID NO: 151

A preferred combination of HCVR and LCVR of anti-PD-1 antibody or antigen-binding portion thereof according to the present invention comprises:
  (a) a heavy chain variable region comprising the amino acid sequence of SEQ ID NO: 140; and
  (b) a light chain variable region comprising the amino acid sequence of SEQ ID NO: 151

Another preferred combination of HCVR and LCVR of anti-PD-1 antibody or antigen-binding portion thereof according to the present invention comprises:
  (a) a heavy chain variable region comprising the amino acid sequence of SEQ ID NO: 141; and
  (b) a light chain variable region comprising the amino acid sequence of SEQ ID NO: 151

Another preferred combination of HCVR and LCVR of anti-PD-1 antibody or antigen-binding portion thereof according to the present invention comprises:
  (a) a heavy chain variable region comprising the amino acid sequence of SEQ ID NO: 142; and
  (b) a light chain variable region comprising the amino acid sequence of SEQ ID NO: 151

Another preferred combination of HCVR and LCVR of anti-PD-1 antibody or antigen-binding portion thereof according to the present invention comprises:
  (a) a heavy chain variable region comprising the amino acid sequence of SEQ ID NO: 143; and
  (b) a light chain variable region comprising the amino acid sequence of SEQ ID NO: 151

Another preferred combination of HCVR and LCVR of anti-PD-1 antibody or antigen-binding portion thereof according to the present invention comprises:
  (a) a heavy chain variable region comprising the amino acid sequence of SEQ ID NO: 144; and
  (b) a light chain variable region comprising the amino acid sequence of SEQ ID NO: 151

Another preferred combination of HCVR and LCVR of anti-PD-1 antibody or antigen-binding portion thereof according to the present invention comprises:
  (a) a heavy chain variable region comprising the amino acid sequence of SEQ ID NO: 145; and
  (b) a light chain variable region comprising the amino acid sequence of SEQ ID NO: 151

Another preferred combination of HCVR and LCVR of anti-PD-1 antibody or antigen-binding portion thereof according to the present invention comprises:
  (a) a heavy chain variable region comprising the amino acid sequence of SEQ ID NO: 146; and
  (b) a light chain variable region comprising the amino acid sequence of SEQ ID NO: 152

Another preferred combination of HCVR and LCVR of anti-PD-1 antibody or antigen-binding portion thereof according to the present invention comprises:
  (a) a heavy chain variable region comprising the amino acid sequence of SEQ ID NO: 147; and
  (b) a light chain variable region comprising the amino acid sequence of SEQ ID NO: 152

Another preferred combination of HCVR and LCVR of anti-PD-1 antibody or antigen-binding portion thereof according to the present invention comprises:
  (a) a heavy chain variable region comprising the amino acid sequence of SEQ ID NO: 148; and
  (b) a light chain variable region comprising the amino acid sequence of SEQ ID NO: 152

Another preferred combination of HCVR and LCVR of anti-PD-1 antibody or antigen-binding portion thereof according to the present invention comprises:
  (a) a heavy chain variable region comprising the amino acid sequence of SEQ ID NO: 149; and
  (b) a light chain variable region comprising the amino acid sequence of SEQ ID NO: 152

Another preferred combination of HCVR and LCVR of anti-PD-1 antibody or antigen-binding portion thereof according to the present invention comprises:
  (a) a heavy chain variable region comprising the amino acid sequence of SEQ ID NO: 150; and
  (b) a light chain variable region comprising the amino acid sequence of SEQ ID NO: 152

In one of the embodiments, the antibody or antigen binding portion thereof of the present invention comprising at least one of the following characteristics:
  (a) cross-reacts with PD-1 from species other than human;
  (b) higher binding specificity towards human PD-1;
  (c) promotes IL-2 cytokine secretion;
  (d) promotes higher IFN-gamma secretion;
  (e) blocks PD-1 receptor interaction with its natural ligand PD-L1 and/or PD-L2;
  (f) promotes T cell proliferation and
  (g) has improved circulating half-life.

In one of the embodiments, the anti-PD-1 antibody or antigen binding portion thereof has a $K_D$ of $10^{-10}$ M or less, more preferably $10^{-11}$ M or less for a PD-1 antigen. In a preferred embodiment, the anti-PD-1 antibody or antigen binding portion thereof of the present invention binds to human PD-1 with a $K_D$ of $10^{-10}$ M or less, preferably $10^{-11}$ M or less. $K_D$ value is a measurement of the binding affinity of the antibody towards its target antigen. Such binding affinity and binding kinetics of anti-PD-1 antibodies can be examined by SPR analysis. The said analysis is very well known in the art to measure affinity of the antibody or antigen binding portion thereof towards its target antigen and a skilled person is well aware of the techniques for performing such analysis.

In one of the embodiments, the anti-PD-1 antibody or antigen binding portion thereof of the present invention has high specificity towards PD-1. The anti-PD-1 antibody according to the present invention has high affinity towards human PD-1 antigen/epitope. In another embodiment, the anti-PD-1 antibody or antigen binding portion thereof of the present invention has high binding specificity towards human PD-1. Binding specificity is examined by SPR method. The "high specificity towards PD-1 or towards human PD-1" means the antibody or antigen binding portion thereof does not bind to the other T cell co-inhibitory receptors with the same affinity.

In one of the embodiments, the anti-PD-1 antibody or antigen binding portion thereof cross-reacts with PD-1 from other species such as cynomolgus monkey, etc. with enough affinity.

In another embodiment, the anti-PD-1 antibody or antigen binding portion thereof of the present invention blocks interaction of PD-1 with its ligand in surface plasmon resonance assay.

In another embodiment, the anti-PD-1 antibody or antigen binding portion thereof of the present invention kills the T cells that are expressing PD-1. In one embodiment, the anti-PD-1 antibody or antigen binding portion thereof according to the present invention promotes IL-2 cytokine secretion. In such embodiment, the anti-PD-1 antibody or antigen binding portion thereof according to the present invention when available during MLR, results in an increased production of IL-2 as measured by ELISA.

In one embodiment, the anti-PD-1 antibody or antigen binding portion thereof according to the present invention promotes higher IFN-gamma secretion. The term "higher" refers herein is with reference to known anti-PD-1 antibody. In another embodiment, the anti-PD-1 antibody or antigen binding portion thereof of the present invention when available during MLR, results in an increased production of IFN-gamma as measured by ELISA. Bone marrow transplant experiments using IFN-γR−/− mice implicated IFN-γ as a crucial nexus for controlling PD-1-mediated tumor infiltration by T cells. It is also evaluated and confirmed that other IFN-γ inducible chemokines may also play a role in the synergistic effect of anti-PD-1 on ACT. (7) In addition, IFN-γ is reported as an important marker for prediction of response to immune checkpoint blockade (8).

In one embodiment, the anti-PD-1 antibody or antigen binding portion thereof according to the present invention promotes T cell proliferation. In such embodiment, the anti-PD-1 antibody or antigen binding portion thereof according to the present invention when available during MLR, results in an increased T cell proliferation as measured by proliferation measurement assay. Such assays are known to the person skilled in the art.

In one of the embodiments, the anti-PD-1 antibody or antigen binding portion thereof according to the present invention has improved pharmacokinetic properties. In one of the embodiments, the anti-PD-1 antibody or antigen binding portion thereof according to the present invention has an increased half-life in humans.

The pharmacokinetic profile of anti-PD1 of the present invention is determined in the cynomolgus monkey. Since the intended route of administration in patients is intravenous, anti-PD1 antibody is administered intravenously to the animals in the studies in a buffer solution. In brief, the study includes 3 animals/sex/group which are administered at dose levels up to 50 mg/Kg. PD effects of the anti-PD1 antibody such as peripheral immune cell population modulation, and change in absolute lymphocyte count (ALC) are studied.

In one embodiment, the anti-PD-1 antibody or antigen binding portion thereof according to the present invention blocks PD-1 receptor interaction with its natural ligands PD-L1 and/or PD-L2. The anti-PD-1 antibodies of the present invention are tested for their ability to block binding of the ligands PD-L1 and PD-L2 to PD-1 expressed on cells by using a mixed lymphocyte reaction (MLR). The anti-PD-1 antibodies of the present invention are tested for their ability to block binding of the ligands PD-L1 and PD-L2 to PD-1 by SPR.

In one of the embodiments, effect of binding of anti-PD-1 antibody or antigen binding portion thereof of the present invention to PD-1 on T cell activation is analysed by suitable assays known in the art. An anti-PD-1 antibody or antigen binding portion thereof according to the present invention binds to PD-1 expressed on PD-1 expressing transfected cell line. Further, anti-PD-1 antibodies or antigen binding portion thereof according to the present invention binds to peripheral blood mononuclear cells (PBMC).

The antibodies according to the present invention can be full-length (for example, an IgG1 or IgG4 antibody) or may comprise only an antigen-binding portion (for example, a Fab, F(ab')2 or scFv fragment), and optionally be modified to effect functionality, e.g., to eliminate residual effector functions such as ADCC and CDC activity.

In one of the embodiments, the amino acid sequences of constant region of anti-PD-1 antibody is the IgG1, IgG2, IgG3, IgG4, IgA, IgE, IgM, IgD constant region or hybrid of mentioned constant regions such as IgG2/IgG4, preferably IgG1 or IgG4, more preferably IgG4.

In another embodiment, the Fc region of the antibodies of the present invention is altered by replacing at least one amino acid residue with a different amino acid residue to alter the effector function(s) of the antibody.

In one of the preferred embodiments, the amino acid sequences of the heavy chain constant region of the anti-PD-1 antibody of the present invention has mutation in its hinge region, preferably a serine to proline mutation in the hinge region of IgG4 constant region of the antibody. Human IgG4 antibodies can exist in two forms that are associated with hinge heterogeneity. In one form, an antibody comprises a stable four-chain construct of approximately 150-160 kDa in which the dimers are held together by an inter chain heavy chain disulfide bond. In a second form, the dimers are not linked via inter chain disulfide bonds and a molecule of about 75-80 kDa is formed composed of a covalently coupled light and heavy chain (half-antibody). The latter forms have been extremely difficult to separate from the full antibody, even after affinity purification. The frequency of appearance of the second form in various intact IgG4 isotypes is due to, but not limited to, structural differences associated with the hinge region isotype of the antibody. A single amino acid substitution in the hinge region of the human IgG4 hinge can significantly reduce the appearance of the second form (6) to levels typically observed using a human IgG1 hinge. Full-length antibodies comprising CDRs or variable regions of the present invention further comprise said single amino acid substitution (i.e., S228P) when it is developed in IgG4 form.

In one embodiment, the anti-PD-1 antibody of the present invention has ADCC and/or CDC activity. In a preferred embodiment, the anti-PD-1 antibody of the present invention with modified or reduced or no ADCC and/or CDC activity is an anti-PD-1 antibody with IgG1 or IgG4 or IgG2/IgG4 constant region. In another embodiment, the Fc region of the antibodies of the present invention is altered by replacing at least one amino acid residue with a different amino acid residue to increase ADCC and/or CDC activity. In one of the preferred embodiment, the anti-PD-1 antibody of the present invention with increased ADCC and/or CDC activity is an anti-PD-1 antibody with IgG1 or IgG1 with at least one altered amino acid residue constant region. IgG1 with at least one altered amino acid residue constant region as referred herein is a modified IgG1 which may provide higher ADCC and/or CDC activity as compared to IgG1 without such modification.

In another preferred embodiment, the anti-PD-1 antibody of the present invention with reduced or no ADCC and/or CDC activity is an anti-PD-1 antibody with IgG1 or IgG1 with at least one altered amino acid residue constant region. IgG1 with at least one altered amino acid residue constant region as referred herein is a modified IgG1 which may provide reduced or no ADCC and/or CDC activity as compared to IgG1 without such modification.

In another preferred embodiment, the anti-PD-1 antibody of the present invention with reduced or no ADCC and/or CDC activity is an anti-PD-1 antibody with IgG4 or IgG4 with at least one altered amino acid residue constant region. IgG4 with at least one altered amino acid residue constant region as referred herein is a modified IgG4 which may provide reduced or no ADCC and/or CDC activity as compared to IgG4 without such modification.

In another aspect, anti-PD-1 antibody according to the present invention has increased FcRn binding and increased half-life with modified or reduced or no ADCC and/or CDC activity. In one of the embodiments, the anti-PD-1 antibody according to the present invention has amino acid sequences of constant region of IgG1 or IgG4 with P329G and/or M428L & N434S mutation. The constant region of anti-PD-1 antibody with mentioned all three mutations in IgG1 and IgG4 constant region are referred herein as IgG1(GLS) and IgG4(GLS), respectively.

In a preferred embodiment, the anti-PD-1 antibody according to the present invention comprising single amino acid substitution selected from S228P, P329G, M428L, N434S and suitable combination thereof.

In one of the embodiments, the anti-PD-1 antibody according to the present invention is monoclonal antibody or bispecific antibody or polyclonal antibody, preferably monoclonal antibody.

In one of the embodiments, the antibody or antigen-binding portion thereof targeting PD-1 antigen according to the present invention is murine, chimeric, recombinant or humanized in nature, preferably recombinant in nature.

Immunoconjugates and Bispecific Antibodies

In one of the embodiments, the anti-PD-1 antibody of the present invention is conjugated to drug, preferably cytotoxic agent optionally through linker. The present invention also provides an immunoconjugate comprising an antibody of the invention, or antigen-binding portion thereof, linked to another therapeutic agent, such as a cytotoxin or a radioactive isotope. Such immunoconjugates prepared according to the present invention specifically bind to PD1 expressing immune cells leading to their lysis. These immune cells can include T cells, NK cells, B cells, monocytes and the like expressing PD-1. Thus, the immunoconjugates prepared according to the current invention help to treat disease where an activity of PD-1 expressing immune cells is detrimental.

In one of the embodiments, the anti-PD-1 antibody of the present invention is used to make a bispecific molecule. A bispecific molecule comprising an antibody, or antigen binding portion thereof, of the present invention, having two unique antigen-binding arms or functional moieties such that one binds PD-1 and the other with a different binding specificity. In one of the embodiments, the second functional moiety according to the present invention can bind to antigen selected from CTLA-4, PD-L1, LAG-3, TIGIT and HER2.

Nucleic Acid Molecules Encoding Anti-PD-1 Antibodies, Vectors And Host Cells

The present invention provides nucleic acid molecules or nucleic acid sequences encoding the antibodies, or antigen-binding portions thereof of the present invention as well as expression vectors comprising such nucleic acid sequences and host cells comprising such expression vectors. In the present application, pZRCII as well as pZRCIII vectors are used for the cloning and expression of anti-PD-1 antibodies of the present invention. pZRCII vector (pZRCIIhyg) and pZRCIII vector are described in patent documents WO 2007/017903 and WO 2012/046255A2, respectively. The host cell according to the present invention is prokaryotic or eukaryotic cell, preferably the host cell is an *E. coli* cell or a mammalian cell, such as a CHO cell or NS0 cell or CHO-GS cell or CHO-S cell or CHO-K1 cell.

Preparation of Antibodies

In the present invention, the anti-PD-1 antibody or antigen binding portion thereof is produced using recombinant techniques. In recombinant technique according to the present invention, suitable expression vectors are used. Vector to prepare antibodies of the present invention can be a vector which is readily known to the person skilled in the art. The expression vector and expression control sequences are chosen to be compatible with the expression host cell used. The antibody light chain gene and the antibody heavy chain gene can be inserted into separate vector or, more typically, both genes are inserted into the same expression vector. The antibody genes are inserted into the expression vector by standard methods (e.g., ligation of complementary restriction sites on the antibody gene fragment and vector, or blunt end ligation if no restriction sites are present) known to persons skilled in the art. For example, to express the antibodies, or antibody fragments thereof, DNAs encoding partial or full-length light and heavy chains, can be obtained by standard molecular biology techniques (e.g., PCR amplification or cDNA cloning using a hybridoma that expresses the antibody of interest) and the DNAs can be inserted into expression vectors such that the genes are operatively linked to transcriptional and translational control sequences. In addition to the antibody chain genes and regulatory sequences, the recombinant expression vectors of the invention may carry additional sequences, such as sequences that regulate replication of the vector in host cells (e.g., origins of replication) and selectable marker genes. The heavy chain variable regions of the antibodies described herein can be used to create full-length antibody genes of any antibody isotype by inserting them into expression vectors already encoding heavy chain constant and full-length light chain of the desired isotype such that the $V_H$ segment is operatively linked to the $C_H$ segment(s) within the vector. Additionally or alternatively, the recombinant expression vector can encode a signal peptide that facilitates secretion of the antibody chain from a host cell. For expression of the light and heavy chains, the expression vector(s) encoding the heavy and light chains is transfected into a host cell by standard techniques such as lipid mediated transfection, electroporation, calcium-phosphate precipitation, DEAE-dextran transfection and the like. Preferred mammalian host cells for expressing the recombinant antibodies of the invention include Chinese Hamster Ovary (CHO cells) (including DHFR-CHO cells), NS0 myeloma cells, COS cells and SP2 cells. In particular, for use with NS0 myeloma cells, another preferred expression system is the GS gene expression system. Antibodies produced according to the present invention can be further produced by known cell culture techniques for large scale antibody production. Antibodies can be recovered from the culture medium using standard protein purification methods. When using recombinant techniques, the antibody can be produced intracellularly, in the periplasmic space, or directly secreted into the medium. If the antibody is produced intracellularly, as a first step, the particulate debris, either host cells or lysed fragments, is removed, for example, by centrifugation or ultrafiltration. Antibodies of the invention can be tested for binding to PD-1 by, for example, standard ELISA.

Anti-PD-1 antibodies of the present invention is also prepared using phage display library approach after making Fab libraries using site directed mutagenesis approach as described herein examples. In this method, anti-PD-1 Fab regions are generated using phage library approach which are further converted into full-length using expression vector based recombinant techniques as described in this application.

Combination of Anti-PD-1 of the Present Invention with Other Drugs

The present invention provides a combination comprising at least two or more antibodies or antigen binding portion thereof wherein at least one antibody or antigen binding portion thereof is anti-PD-1 antibody of the present invention. The combination according to the present invention may comprise second antibody or antigen binding portion thereof selected from anti-LAG3 antibody, anti-CTLA4 antibody, anti-HER2 antibody, anti-VEGF antibody, anti-PDL1 antibody, anti-PD-1 antibody, in combination with anti-PD-1 antibody or antigen binding portion thereof the present invention. In another embodiment, the present invention provides a combination comprising of anti-PD-1 antibody or antigen binding portion(s) thereof and a peptide or a combination comprising anti-PD-1 antibody or antigen binding portion(s) thereof and a cytokine (preferably interleukin).

Pharmaceutical Compositions

A pharmaceutical composition, containing one or a combination of monoclonal antibodies or antigen-binding portion(s) thereof or a combination of anti-PD-1 antibody or antigen binding portion(s) thereof and a peptide or a combination of anti-PD-1 antibody or antigen binding portion(s) thereof and a cytokine (preferably interleukin), of the present invention, formulated together with a pharmaceutically acceptable carrier can be developed. Present invention also provides a composition, e.g., a pharmaceutical composition, containing one or a combination of monoclonal antibodies, or antigen-binding portion(s) thereof, or a combination of anti-PD-1 antibody or antigen binding portion(s) thereof and a peptide or a combination of anti-PD-1 antibody or antigen binding portion(s) thereof and a cytokine (preferably interleukin), of the present invention, formulated together with a pharmaceutically acceptable carrier. Such compositions may include one or a combination of (e.g., two or more different) antibodies, or immunoconjugates or bispecific molecules of the invention. For example, a pharmaceutical composition of the invention can comprise a combination of antibodies (or immunoconjugates or bispecifics) that bind to different epitopes on the target antigen or to different epitopes on different target antigens or that have complementary activities.

In one of the embodiments, the anti-PD-1 antibody or antigen binding portion thereof can be combined with other suitable drug for the treatment of various cancers, infections or autoimmune disorders.

The anti-PD-1 antibody or antigen binding portion thereof of the present invention can be combined or can be used in combination with other suitable chemically synthesised therapeutic drug(s). The said chemically synthesised therapeutic drug can be anti-cancer or anti-infective drugs or combination of such drugs.

The anti-PD-1 antibody or antigen binding portion thereof of the present invention can be combined with chemotherapeutic agent(s) in clinical setting.

The anti-PD-1 antibody or antigen binding portion thereof of the present invention can be used in combination with vaccine(s) to induce T and B cell immune responses, possibly by prolonging vaccine-induced T- or B-cell proliferation, in both prophylactic and therapeutic settings.

Therapeutic Uses

In one of the embodiments, the anti-PD-1 antibody or antigen binding portion thereof or combination or conjugate or bispecific antibody of the present invention can be used for the treatment of disease where activity of PD-1 or an expression of PD-1 is detrimental. Such diseases are readily known to the person skilled in the art.

The anti-PD-1 antibody or antigen-binding portion thereof or combination or conjugate or bispecific antibody of the present invention can be used to treat various cancers such as NSCLC, SCLC, RCC, cHL, SCCHN, breast cancer, urothelial carcinoma, colorectal cancer, ESCC, primary mediastinal large b-cell lymphoma, microsatellite instability-high cancer, gastric cancer, ovarian cancer, prostate cancer, gliomas, glioblastoma, astrocytomas, glioblastoma multiforme, Bannayan-Zonana syndrome, Cowden disease, Lhermitte-Duclos disease, inflammatory breast cancer, Wilm's tumor, Ewing's sarcoma, Rhabdomyosarcoma, ependymoma, medulloblastoma, kidney cancer, liver cancer, melanoma, pancreatic cancer, sarcoma, osteosarcoma, giant cell tumor of bone, thyroid cancer, lymphoblastic T cell leukemia, Chronic myelogenous leukemia, Chronic lymphocytic leukemia, Hairy-cell leukemia, acute lymphoblastic leukemia, acute myelogenous leukemia, AML, Chronic neutrophilic leukemia, Acute lymphoblastic T cell leukemia, plasmacytoma, Immunoblastic large cell leukemia, Mantle cell leukemia, Multiple myeloma Megakaryoblastic leukemia, multiple myeloma, acute megakaryocyte leukemia, promyelocytic leukemia, Erythroleukemia, malignant lymphoma, hodgkins lymphoma, non-hodgkins lymphoma, lymphoblastic T cell lymphoma, Burkitt's lymphoma, follicular lymphoma, neuroblastoma, cervical cancer, merkel cell carcinoma, endometrial carcinoma, tumor mutational burden-high (TMB-H) cancer, vulval cancer, salivary gland cancer, nasopharangeal cancer, buccal cancer, cancer of the mouth, GIST (gastrointestinal stromal tumor), and testicular cancer.

The anti-PD-1 antibody or antigen-binding portion thereof or combination or conjugate or bispecific antibody of the present invention can be used to treat various infections. Examples of such infection can be infections are the infection caused by pathogens selected from HIV, Hepatitis (A, B, & C), Influenza, Herpes, Giardia, Malaria, *Leishmania, Staphylococcus aureus, Pseudomonas aeruginosa*, SARS-CoV, MERS-CoV, SARS-CoV-2, Ebola, etc.

The anti-PD-1 antibody or antigen-binding portion thereof or combination or conjugate or bispecific antibody of the present invention can be used to treat various autoimmune disorders. Examples of such autoimmune disorder are rheumatoid arthritis, psoriasis, psoriatic arthritis, ankylosing spondylitis, juvenile rheumatoid arthritis, Crohn's disease, ulceritive colitis, sepsis, atopic disease such as asthma, eczema, allergies, multiple sclerosis, systemic lupus erythematosus, vasculitis, myasthenia gravis, Graves disease, Hashimoto's thyroiditis, sepsis, Autoimmune hemolytic anemia, Pernicious anemia, Idiopathic thrombocytopenic purpura, Goodpasture's syndrome, Bullous pemphigoid, Pemphigous vulgaris, Hashimoto's thyroiditis, Insulin-dependent diabetes mellitus (IDDM), CIDP Diabetes, Antianemics (Beta-Thalassemia), Hematopoietic Agents, Ophthalmic Drugs, Bone Diseases, Neurological Genetic Disorders, Age-related macular degeneration, Diabetic Retinopathy, Macular diseases, Ocular Genetic Disorders, Hemophilia B, Agents for (Coagulation factor IX (9) deficiency) Cardiovascular Diseases, Type 2 Diabetes, Immunosuppressants, Treatment of Transplant Rejection, Myelodysplastic Syndrome Therapy, Retinopathy, Aplastic anemia, Analgesic Drugs, Hematologic Genetic Disorders, Multisystem Genetic Disorders, Osteoarthritis, Scleroderma, Treatment of Autoimmune Diseases, Treatment of Gout, Urticaria, Heart Failure Therapy, Lymphoma Therapy, Nephritis, Respiratory Disorders and Therapy of Inborn Errors of Metabolism.

In a preferred embodiment, the present invention provides effective amount of an anti-PD-1 antibody or antigen binding portion(s) thereof as disclosed in the current invention which can reduce PD-1 mediated-immunosuppression. These antibodies can be administered in conventional routes and dosages such as "pharmaceutically effective dose" or "therapeutically effective dose".

EXAMPLES

The following examples are illustrative and should not be construed as limiting the scope of this disclosure in any way as many variations and equivalents will become apparent to those skilled in the art upon reading the present disclosure. All patents, patent applications and publications cited herein are incorporated herein by reference in their entireties.

Example 1: Generation of pZRCII hyg Anti-PD-1 Light and Heavy Chain Vectors

Construction of pZRCII hygigg4 Vector

Chemically synthesized Human IgG4 constant region (SEQ ID No.: 156) was amplified to incorporate restriction enzymes SalI, ApaI overhangs at 5' and NotI overhangs at 3' termini by 30 cycles of PCR using 0.2 pM of specific oligonucleotide primers containing the above restriction sites in a volume of 50 µl containing 1×Pfx buffer, 1.5 mM MgSO$_4$, 2.5 µM each of the 4 dNTPs and 1 unit of Pfx Polymerase. Each PCR amplification cycle consisted of incubations at 95° C. for 30 seconds (denaturation), 55° C. for 45 seconds (annealing) and 72° C. for 1 minute (extension). Amplified product of the PCR reaction was resolved on a 1% Agarose gel. The desired fragment of approximately 980 base pairs in size was excised out from the gel and purified using Qiagen Gel extraction kit. This purified PCR fragment and pZRCII vector with hygromycin resistance gene, were digested with restriction enzymes SalI and NotI. pZRCII vector was prepared as described in patent publication WO 2007/017903. The vector fragment of approximately 7692 base pair was purified from the gel by using Qiagen Gel extraction kit. The digested PCR fragment was also purified using Qiagen gel extraction kit. Digested and purified PCR product and pZRCII hyg vector were ligated and ligation product was transformed in E. coli Top 10F' strain. Transformants were scored on the basis of kanamycin resistance. Plasmid DNA isolated from such colonies was analyzed for the presence of IgG4 constant region fragment by restriction digestion using SalI and NotI restriction enzyme. One of the plasmids showing the expected restriction profile having the IgG4 constant region fragment integrated in the pZRCII vector was named, pZRCII IgG4 constant. In the same manner, chemically synthesized IgG1 Fc (SEQ ID No.: 157) was cloned in pZRCII vector and named as pZRCIIhyg.IgG1 vector.

Construction of pZRCIIhyg Anti-PD-1 LC-HC Vector Constructs

Anti-PD1 light chain and heavy chain genes were chemically synthesized and cloned into a cloning vector pMA (Geneart, Germany). To clone light chain gene in the pZRCIIhyg.IgG4 constant region vector, pMA with light chain and pZRCIIhyg.IgG4 vectors were digested with XhoI and kpnI restriction enzymes. The light chain of approximately 737 bp (SEQ ID No.: 163) and pZRCIIhyg.IgG4 vector of approximately 8672 base pairs in size was excised from the gel and purified using Qiagen Gel extraction kit. The digested and purified light chain and pZRCIIhyg.IgG4 vector were ligated and transformed in E. coli Top 10F' strain. Transformants were selected on the basis of kanamycin resistance. Plasmid DNA isolated from about 20 such colonies was analyzed for the presence of light chain gene by restriction digestion using various restriction enzymes. One such plasmid, having the light chain gene integrated in the first transcription assembly of pZRCIIhyg.IgG4 vector was selected to prepare pZRCIIhyg. LC-HC vectors. To clone heavy chain genes, chemically synthesized heavy chain gene variable fragments (SEQ ID No.:158, 159, 160, 161 and 162), all of approximately 446 base pairs in size and pZRCII hyg. LC-IgG4 vector having light chain of SEQ ID NO.: 163 were digested with SalI and ApaI. The digested and purified, heavy chain gene variable region fragments (SEQ ID No.: 158, 159, 160, 161 and 162) were individually ligated into pZRCIIhyg Anti-PD-1 LC IgG4 vector and transformed in E. coli Top 10F'. Transformants were selected on the basis of kanamycin resistance. Plasmid DNA isolated from the transformants was analyzed for the presence of heavy chain gene by restriction digestion using SalI and NotI. Final vectors containing light chain of SEQ ID No.: 163 and heavy chain of SEQ ID No.:158, light chain of SEQ ID No.: 163 and heavy chain of SEQ ID No.: 159, light chain of SEQ ID No.: 163 and heavy chain of SEQ ID No.: 160, light chain of SEQ ID No.: 163 and heavy chain of SEQ ID No.: 161, light chain of SEQ ID No.: 163 and heavy chain of SEQ ID No.: 162 were confirmed by nucleotide sequencing of heavy and light chains. The final constructs comprising different combinations of heavy chain and light chain were named as IP-H4L1, IP-H4.2L1, IP-H4.2(Y.H)L1, IP-H4.19L1, and IP-H4.36L1, respectively. The said different constructs encode amino acid sequences of HCVR and LCVR of anti-PD-1 antibodies of the present invention as described in table 5.

TABLE 5

List of anti-PD-1 antibody constructs with their respective SEQ ID NO.s of HCVR and LCVR

| Name of construct | SEQ ID No. of HCVR | SEQ ID No. LCVR |
|---|---|---|
| IP-H4L1(IgG1) | 137 | 151 |
| IP-H4L1(IgG4) | 137 | 151 |
| IP-H4.2L1 | 138 | 151 |
| IP-H4.2(Y.H)L1 | 139 | 151 |
| IP-H4.19L1 | 140 | 151 |
| IP-H4.36L1 | 143 | 151 |

A general vector map of the said construct is represented in FIG. 1. IP-H4L1 is also generated with IgG1 isotype as illustrated herein using chemically synthesized Human IgG1 constant region (SEQ ID No.: 157).

Amino acid sequences of variable regions of heavy chains and light chain are provided in table 2 and constant region of IgG1, IgG4 and light chain are given at end of the present specification. In the same manner, nucleotide sequences of variable regions of heavy chains, constant region of IgG1 and IgG4 and light chain are also given at end of the present specification.

Example 2: Generation of Anti-PD-1 MAbs Synthesized Using pZRCII Vector

To generate material for proof of concept studies, different Anti-PD-1 antibodies constructs as prepared in Example 1 (IP-H4L1, IP-H4.2L1, IP-H4.2(Y.H)L1, IP-H4.19L1, and IP-H4.36L1) were expressed using ExpiCHO™ expression system (Gibco). On the day prior to transfection, ExpiCHO-S™ cells were seeded to a final density of 3×10⁶ viable cells/mL in a shake flask/culti-tube and allowed to grow overnight. On the next day, the cells were counted and adjusted to a final density of 6×10⁶ viable cells/mL with fresh ExpiCHO™ Expression Medium, pre-warmed to 37° C. ExpiFectamine™ CHO transfection reagent and plasmid DNA complexes were prepared. The solution was slowly added to the cell suspension with gentle mixing. Cells were incubated in a 37° C. incubator with a humidified atmosphere and 5% $CO_2$ in an orbital shaker. Temperature was shifted to 32° C. on Day 1. ExpiFectamine™ CHO Enhancer and feed were added on Day 1 followed by a second feeding on Day 5 post-transfection. Cultures were harvested (on Day 8-12) and one step purification was carried out using aga-rose-Protein A matrix (MAbselect SuRe antibody purification resin, GE). The bound antibody was eluted using Glycine Buffer, pH 2.5 and neutralized to pH 7 with Tris Buffer pH 9. The protein concentration of the purified antibody was determined by Protein A HPLC method.

Example 3: Phage Display Fab Library Preparation (a) Fab Plasmid Generation

For library generation, E. coli optimized Fab region with overhangs of EcoRI and BamHI was chemically synthesized and cloned in pMA/pMK vectors obtained from Geneart, Germany.

Fab gene (SEQ ID No. 164) was isolated from pMA vector construct after digestion with EcoRI and BamHI. An amino sequence of cloned Fab gene is provided herein as SEQ ID NOs.: 165 for VH and 166 for VL.

Figure 2:
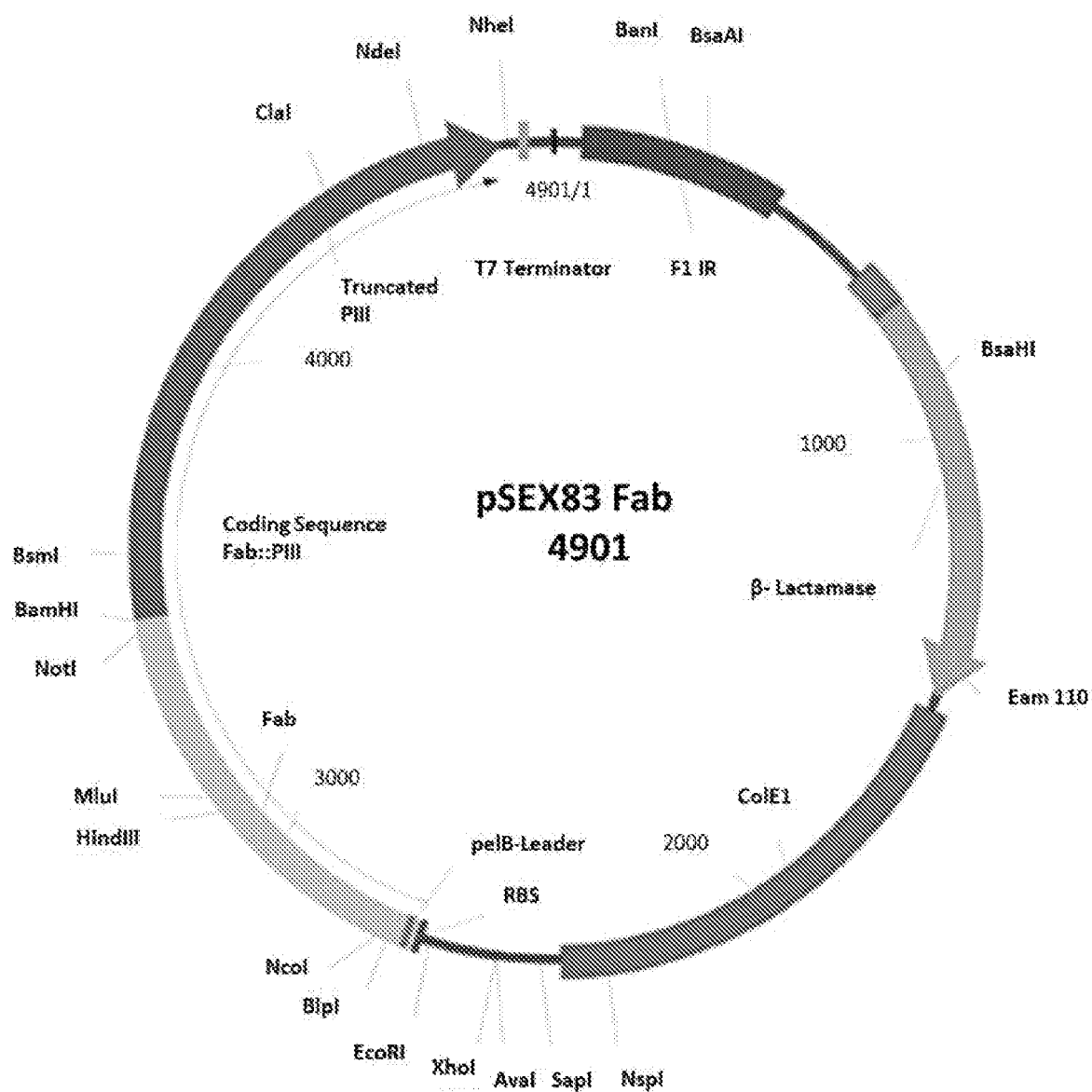
FIG. 2 depicts a general vector map of pSEX83 used in library generation to make anti-PD-1 Fab of the present invention.

The pSEX81 (Cat No: PR3005, Progen) phagemid vector was modified in which pIII gene of phagemid vector was truncated and digested with EcoRI and BamHI and the linearized vector was ligated with the digested Fab gene. The resultant modified vector is referred herein as pSEX83. Vector map of pSEX83 is given herein as FIG. 2. The digested Fab and pSEX83 vector fragments were analyzed on agarose gel and purified from the gel using QIAquick gel extraction kit (Qiagen cat no 28706). The ligation products of both Fab (insert) and pSEX83 (vector) were transformed in electro-competent E. coli TG1 cells (Cat No: 60502-1, Lucigen). Transformed cells were plated on 2xYT agar plates containing ampicillin (100 μg/mL). The clones were analysed by EcoRI and BamHI restriction digestion and DNA sequencing using Sanger's method.

(b) Preparation of Libraries

Two steps were followed to prepare Fab phage display library.

Step 1: PCR Primer Based Site Directed Mutagenesis in the CDRH1

Here CDRH1 region of the Fab was targeted for making variants. The mutations in the selected regions were introduced by using PCR with respective primer pair (NI-CDRH1F and NI-CDRH1R) having SapI restriction site (Table 6). Each primer pair was designed in such a way that they amplified a complete plasmid in a linear form which after restriction digestion by SapI followed by ligation with T4 DNA ligase resulted in a circular plasmid with mutations introduced by the primer pair.

100 ng of the template DNA of Fab gene in pSEX83 vector was used for amplification using the primer pairs mentioned in table 6. Once the template was amplified using the randomized primers the product was digested with SapI to obtain sticky ends. After PCR purification, the digested product was ligated overnight at 16° C. Ligated DNA was then transformed to freshly prepared electrocompetent cells (TG1). Transformed cells were cultured for the production of phages. The phage production was done separately for each library as explained earlier (9).

TABLE 6

LIST OF PRIMERS USED IN PCR PRIMER BASED SITE DIRECTED MUTAGENESIS

| SEQ. ID NO. | PCR Primer names | PCR primer sequences |
|---|---|---|
| SEQ ID NO.: 176 | NI-CDRH1F | Actatcgttagctcttctnnsnnsn nsnnsnnscactgggttcgtcaagc cccc |
| SEQ ID NO.: 177 | NI-CDRH1R | Actatcgttagctcttctsnnagta attcctgaggctttgcagtccagac gc |
| SEQ ID NO.: 178 | NI-CDRH2.1 | Aaccgagtccgcgtagtaacgttts nnsnnsnnsnnsnnsnntgcta cccactccaacccttttcc |
| SEQ ID NO.: 179 | NI-CDRH2.2 | Gcgaccttaaccgagtccgcgtas nnsnnsnnsnnsnnsnnccaga tcactgctacccactccaa |
| SEQ ID NO.: 180 | NI-CDRH2.3 | Aatagtaaagcgacctttaaccgas nnsnnsnnsnnsnnsnngccat cataccagatcactgctac |
| SEQ ID NO.: 181 | NI-CDRL3.01 | Ttccaccttggtaccttgaccaaat gtacgaggsnnsnnsnnsnnsnnsn ngcagtagtaaaccgcgaagtcttc |
| SEQ ID NO.: 182 | NI-CDRL3.02 | Ttccaccttggtaccttgaccaaat gtacgsnnsnnsnnsnnsnnsnntt ggcagtagtaaaccgcgaagtcttc |
| SEQ ID NO.: 183 | NI-CDRL3.03 | Ttccaccttggtaccttgaccaaat gtsnnsnnsnnsnnsnnsnntt gtt ggcagtagtaaaccgcgaagtcttc |
| SEQ ID NO.: 184 | NI-CDRL3.04 | Ttccaccttggtaccttgaccaaas nnsnnsnnsnnsnnsnnsnnggattgtt ggcagtagtaaaccgcgaagtcttc |
| SEQ ID NO.: 185 | NI-CDRL3.05 | Ttccaccttggtaccttgaccaaat gtacgsnnsnnsnnsnnsnnsnngc agtagtaaaccgcgaagtcttc |
| SEQ ID NO.: 186 | NI-CDRL3.06 | Ttccaccttggtaccttgaccaaat gtsnnsnnsnnsnnsnnsnnngcagt agtaaaccgcgaagtcttc |
| SEQ ID NO.: 187 | NI-CDRL3.07 | Ttccaccttggtaccttgaccaaas nnsnnsnnsnnsnnsnnngcagtagt aaaccgcgaagtcttc |
| SEQ ID NO.: 188 | NI-CDRL3.08 | Ttccaccttggtaccttgaccaaas nnsnnsnnsnnsnnsnncgaggatt gttggcagtagtaaaccgcgaagtc ttc |
| SEQ ID NO.: 189 | NI-CDRL3.09 | Ttccaccttggtaccttgaccaaas nnsnnsnnsnnsnnsnngttcgagg attgttggcagtagtaaaccgcgaa gtcttc |
| SEQ ID NO.: 190 | NI-CDRL3.10 | Ttccaccttggtaccttgaccaaas nnsnnsnnsnnsnnsnnccagttcg aggattgttggcagtagtaaaccgc gaagtcttc |
| SEQ ID NO.: 191 | NI-CDRH3.00 | Tcactaatgtaccttgacccasnn snnsnnsnntgtggcgcaatagtac actgcc |

TABLE 6-continued

LIST OF PRIMERS USED IN PCR PRIMER BASED SITE DIRECTED MUTAGENESIS

| SEQ. ID NO. | PCR Primer names | PCR primer sequences |
|---|---|---|
| SEQ ID NO.: 192 | NI-CDRH3.01 | Tcactaatgtaccttgaccccasnn snnsnnsnnsnntgtggcgcaatag tacactgcc |
| SEQ ID NO.: 193 | NI-CDRH3.02 | Tcactaatgtaccttgaccccasnn snnsnnsnnsnnsnntgtggcgcaa tagtacactgcc |
| SEQ ID NO.: 194 | NI-CDRH3.03 | Tcactaatgtaccttgaccccasnn snnsnnsnnsnnsnnatttgtggcg caatagtacact |
| SEQ ID NO.: 195 | NI-CDRH3.04 | Tcactaatgtaccttgaccccasnn snnsnnsnnsnnsnnatcatttgtg gcgcaatagtac |
| SEQ ID NO.: 196 | NI-CDRH3.05 | Tcactaatgtaccttgaccccasnn snnsnnsnnsnnsnnatcatcattt gtggcgcaatag |
| SEQ ID NO.: 197 | NI-CDRH3.06 | Tcactaatgtaccttgaccccasnn snnsnnsnnsnnsnnataatcatca tttgtggcgcaa |
| SEQ ID NO.: 198 | NI-CDRH3.07 | Tcactaatgtaccttgaccccasnn snnsnnsnnsnnsnnsnnataatca tcatttgtggcgcaa |

Step 2: Kunkel Mutagenesis and SRCA

Kunkel mutagenesis was performed with sRCA following Huovinen et al 2012. Small culture of CJ236 cells was infected with phages carrying plasmid of the CDRH1 mutated Fab gene. The infected cells were grown in 2×YT containing uridine (6 μg/ml) and carbenicillin antibiotic (100 μg/ml). Phages were produced after superinfection with VCS M13 helper phage (Agilent technologies, USA) and purified by precipitating with PEG6000 (4%) and NaCl (500 mM). Single-stranded uridylated DNA (ss(U)DNA), was extracted from the purified phages by using M13 purification kit from E.Z.N.A.® M13 DNA mini kit (OMEGA bio-tek, USA) following the manufacturer's instructions.

This ss(U)DNA was used as a template in Kunkel mutagenesis and different primers with random mutations were used for making the library. Primers targeting different CDRs i.e., CDRH2, CDRH3 and CDRL3 of nivolumab Fab (Table 6) were hybridized separately to the ss(U)DNA template and extended by Kunkel mutagenesis method. The product was UDG-treated and selectively amplified by RCA (10). The RCA product was digested with Hind III, circularized using T4 DNA ligase and transformed in SS320 cells. Phages (the secondary library) were produced separately for each mutagenesis primer by superinfection with helper phage as described below.

Example 4: Mutant Fab Phage Production and Purification Thereof

Flasks containing 2×YT media with carbenicillin or ampicillin (100 μL/mL) were inoculated with the cells from the glycerol stock of the above described library at the initial concentration of 0.06 $OD_{600}$. Cultures were grown at 37° C. with shaking at 250 rpm till they reach an $OD_{600}$ of up to ~0.4-0.6. Helper phages either, VCSM13 (Agilent, Cat no. 200251) or M13KO7 (GE healthcare, Cat no. 27152401), were then added to the culture at a multiplicity of infection (MOI) of 20, and incubated first without shaking at 37° C. for 40 minutes, followed by another 40 minutes of incubation at 37° C. with shaking. Kanamycin was then added to the media and culture was grown overnight at 26° C. at 150 rpm. Overnight phage culture was centrifuged at 4000 g and cell pellet was discarded. PEG (20%)/NaCl (2.5M) solution at a ratio of 1:5 was added to the supernatant in order to precipitate the phages. Resuspended solution was incubated on ice for 20 minutes followed by centrifugation at 14,000 g for 15 minutes at 4° C. Supernatant was discarded and pellet was resuspended in 1 mL of sterile PBS with 0.01% sodium azide. Phages were stored at 4° C. until further use.

Example 5: Biopanning of Phages Expressing High Affinity Fab Variants

The library ($1 \times 10^{12}$ pfu) prepared in example 4 was screened for high affinity Fab binders to PD1 receptor. First round of panning against recombinant PD1 receptor antigen (Sino biological, Cat No, 10377-H08H) at pH 7.4, was performed using antigen-immobilized, Immunotubes (Quidel, USA) that were prepared by incubating them with a 5 μg/mL PD1 protein solution in carbonate buffer (0.1 M, pH 9.6) overnight at 4° C. Immunotubes were washed 3 times with PBS and then incubated with phages in PBS for 2 h at 25° C. with constant rotation. The tubes were washed ten times with 4 mL PBS with tween 20 (0.1%) and subsequently 10 times with PBS. The bound phages were eluted with glycine-HCL pH 2.1 (0.1 M). The eluted phages were rescued by infection of TG1 E. coli cells, plated, and phages produced as described in example 4.

Second and third round of panning were performed on the PD1 antigen coated immunotubes in such a manner that output phages from first round of panning ($1 \times 10^{11}$ CFU) and second ($1 \times 10^{10}$ CFU) round of panning were used, as input phages for second and third round of panning, respectively. Phages after third round of panning were infected in TG1 cells as mentioned before and phagemid DNA was isolated for anti-PD-1 cloning in suitable expression vector.

Example 6: Screening of Individual Anti-PD-1 Clones as Soluble Fab Proteins

Cloning into Expression Vector and Protein Production

The anti-PD-1 genes from the enriched library produced after 3 rounds of panning were cloned into the expression vector pOPE101 (carbenicillin resistant) (Progen, Germany) such that the individual anti-PD-1 clones could be produced as His-tagged fusion products. Both the vector DNA (pOPE101) and phagemid DNA were digested with restriction enzymes (EcoRI and BamHI) to isolate vector and anti-PD-1 genes, respectively. Both restriction digested vector and anti-PD-1 gene were ligated and transformed to TG1 electrocompetent cells. Transformed cells were plated on to the 2×YT agar plates containing carbenicillin antibiotic. Individual clones were picked from the 2×YT agar plates and cultured in 15 mL tube with 5 mL of 2×YT media containing carbenicillin or ampicillin (100 μL/mL) overnight at 32° C. at 200 rpm. Next day, cultures were reinoculated to fresh 2×YT medium containing carbenicillin (100 μg/mL) and glucose (0.1%) at a volumetric ratio of 1:200. Cultures were grown until the $OD_{600}$ reached ~0.6-0.8. After that 1 mM Isopropyl β-D-1-thiogalactopyranoside (IPTG) was added to the culture and grown overnight at 30° C. at 200 rpm. Overnight culture was spun at 10,800 g for 15 minutes and supernatant was removed. Cell pellet was resuspended in 1/20$^{th}$ volume of the original culture in 1×PBS buffer pH-7.4 containing 2 mg/ml lysozyme, 0.1% triton X and 1 U/100 mL benzonase and incubated at 37° C. for 1 h. Resuspended pellet was centrifuged at 10,800 g for 15 minutes and supernatant was collected as the cell lysate containing the soluble His-tagged Fab variants. This cell lysate fraction was used in immunoassays to study Anti-PD-1 binding after quantifying the soluble Fab in the periplasmic fraction.

Determination of Concentration of Soluble Anti-PD-1 Fabs in Periplasmic Fractions Clones were cultured individually for the production of soluble Fab variants as described above. Total Fab in cell lysate or periplasmic fraction was quantified by immobilizing the soluble Fabs on maxisorp plates pre-coated with goat anti-Human IgG antibody (Fab specific) (Sigma-Aldrich, Cat no. I5260). Coating was done overnight with the goat anti-Human IgG antibody (Fab specific) (Sigma-Aldrich, Cat no. 15260) at concentrations of 1 µg/mL (100 µl/well) in coating buffer (0.1M NaHCO$_3$, pH 9.6). After washing the plate twice, cell lysate 100 µL (1/20 v/v in 1×PBS) was added and incubated for 1 h at 25° C. Known concentrations of serially diluted human Fabs were used as standards for the calculation of amount of Fab protein in cell lysate. The plate was washed 3 time with PBST (0.1% Tween20 in 1×PBS). 100 µl (1:10000) of HRP conjugated goat anti-Human IgG antibody (Fab specific) (Sigma-Aldrich, Cat no. A0293) was added to each well of the plate and incubated for 1 h. Plate was then washed 5 times with PBST followed by addition of substrate o-phenylenediamine dihydrochloride (OPD) (100 µL/well) for 15 minutes at 37° C. The reaction was stopped using 1N H$_2$SO$_4$ (100 µL/well) and optical density (OD) was measured at 450 nm using TECAN INFINITE® M1000pro. Concentration of Fab in cell lysate was then calculated using reference standards.

Qualitative Analysis of Anti-PD-1 Fab Binders

Recombinant PD1 antigen was coated on polystyrene plate (100 ng/100 µL/well), overnight at 4° C. in coating buffer (0.1M NaHCO$_3$, pH 9.6). After washing the plate twice, 100 ng of Fab binder diluted in 100 µl PBS pH 6.0 was added to each well and incubated for 1 h at 25° C. Plates were washed 4 times with PBST (0.1% Tween20 in 1×PBS pH 6.0) followed by addition of 100 µl (1:10000) of HRP conjugated goat anti-Human IgG antibody (Fab specific) (Sigma-Aldrich, Cat no. A0293) and incubated for 1 h at 25° C. Plate was then washed 5 times with PBST followed by addition of substrate o-phenylenediamine dihydrochloride (OPD) (100 µL/well) for 15 minutes at 37° C. The reaction was stopped using 1N H$_2$SO$_4$ (100 µL/well) and optical density was measured at 450 nm using TECAN INFINITE® M1000pro. Individual clones with relatively high OD signal compared to the parent Fab were shortlisted for further characterization.

Example 7: Generation of pZRCIII Hyg Anti-PD-1 Light and Heavy Chain Vectors Five clones were shortlisted based on the results obtained from the qualitative analysis of anti-PD-1 Fab binders. These five clones are referred herein as N5, N6, N7, N9 and N10 based on HCVR region of Fab binders.

Genes encoding heavy chain variable regions of N5, N6, N7, N9 and N10 (Amino acid sequences SEQ ID No.:146-150 and nucleotide sequences SEQ ID No.: 169-173, respectively) and light chain gene (SEQ ID No.: 167 and 174 are amino acid and nucleotide sequence, respectively.) were chemically synthesized and cloned into pMA vector (GeneArt, Germany). To clone light chain, in mammalian expression vector, pZRCIII hyg.IgG4 vector was digested with XhoI and KpnI restriction enzymes. The light chain insert digested with same restriction enzymes was ligated to XhoI and KpnI digested pZRCIII hyg.IgG4 vector and transformed in E. coli Top 10F' strain. Transformants were selected on the basis of kanamycin resistance. Plasmid DNA isolated from such colonies was analyzed for the presence of light chain gene by restriction digestion using XhoI and KpnI restriction enzyme. One of the plasmids showing the expected restriction profile was further digested with SalI and ApaI restriction enzymes to insert genes encoding heavy chain variable regions of N5, N6, N7, N9 and N10 (Amino acid sequences SEQ ID No.:146-150 and nucleotide sequences SEQ ID No.: 169-173, respectively) in frame with IgG4 constant region (SEQ ID No.: 168 and 175 are amino acid and nucleotide sequence, respectively) of pZRCIII hyg.IgG4 vector. The vector and insert digested with SalI and ApaI restriction enzymes were ligated and transformed in E. coli Top 10F' strain. Transformants were selected on the basis of kanamycin resistance. The plasmid DNA from transformants was digested with SalI and ApaI restriction enzymes to confirm the presence of the respective variable region. Final vectors containing light chain of SEQ ID No.: 174 and heavy chain of SEQ ID No.:169; light chain of SEQ ID No.: 174 and heavy chain of SEQ ID No.: 170; light chain of SEQ ID No.: 174 and heavy chain of SEQ ID No.: 171; light chain of SEQ ID No.: 174 and heavy chain of SEQ ID No.: 172; and light chain of SEQ ID No.: 174 and heavy chain of SEQ ID No.: 173, were confirmed by nucleotide sequencing of heavy and light chains. These final vectors are named as N5NL, N6NL, N7NL, N8NL, N9NL and N10NL, respectively.

The said different constructs encode amino acid sequences of HCVR and LCVR of anti-PD-1 antibodies of the present invention as described in table 7.

TABLE 7

List of anti-PD-1 antibody constructs with their respective SEQ ID NO.s of amino acid sequences of HCVR and LCVR

| Name of construct | SEQ ID No. of HCVR | SEQ ID NO. LCVR |
|---|---|---|
| N5NL | 146 | 152 |
| N6NL | 147 | 152 |
| N7NL | 148 | 152 |
| N9NL | 149 | 152 |
| N10NL | 150 | 152 |

Figure 3:
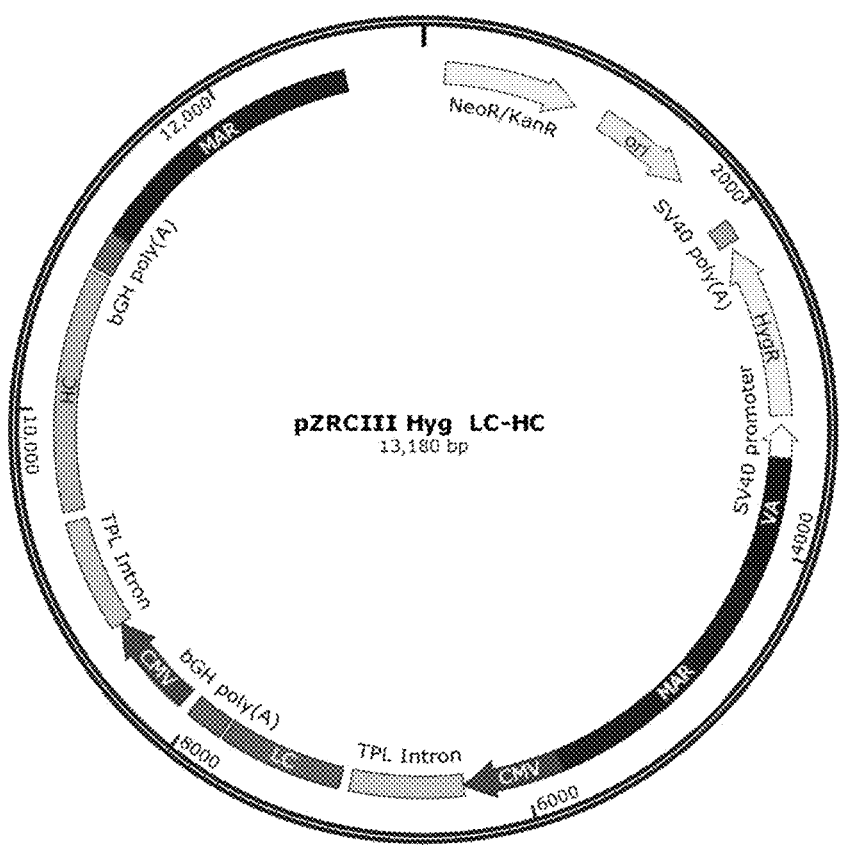
FIG. 3 depicts a general vector map of pZRCIIIhyg Anti-PD-1 LC-HC vector construct which is used to prepare full-length monoclonal anti-PD-1 antibody of the anti-PD-1 Fab of the present invention.

A general vector map of the said construct is represented in FIG. 3.

Amino acid sequences of variable regions of heavy chains and light chain are provided in table 2 and constant region of IgG1, IgG4 and light chain are given at end of the present specification. In the same manner, nucleotide sequences of variable regions of heavy chains, constant region of IgG1 and IgG4 and light chain are also given at end of the present specification.

Example 8: Generation of Anti-PD-1 MAbs Synthesized Using pZRCIII Vector

To generate material for proof of concept studies, different Anti-PD-1 antibodies constructs as prepared in Example 7 (N5NL, N6NL, N7NL, N9NL and N10NL) were expressed in CHO-S cells (Invitrogen). Cells were routinely cultured in CDM media from Lonza. Cells were seeded ~24 hours prior to transfection. Transfections were done by electroporation using Neon Transfection system (Invitrogen) using pre-optimized conditions. Post transfection, cells were plated in 24 well plate containing 1 ml prewarmed serum free media. Cells were incubated in humidified incubator at 37° C. in presence of 5% $CO_2$. The selection of transfected pool was done in the presence of 600 μg/ml of Hygromycin in serum free medium. The cell number of the pool was monitored regularly during the selection process over a period of 2-3 weeks and regular media exchanges were given. Anti-PD-1 expressing stable transfectant pools were expanded and the antibodies were produced using fed batch cultures. Cells were seeded at a density of $0.3 \times 10^6$ cells/ml in 125 ml Erlenmeyer shake flasks in chemically defined media Flasks were incubated in a humidified Kuhner incubator shaker at 37° C. temperature, 5% $CO_2$ level with shaking speed of 110 RPM. A fixed daily feeding regimen was followed during the entire culture. Chemically defined feeds from Hyclone, GE were used. Feeding was initiated post 72 hours of culture and continued till the culture was harvested. Cultures were harvested (on Day 8-12) and one step purification was carried out using agarose-Protein A matrix (MAbselect SuRe antibody purification resin, GE). The bound antibody was eluted using Glycine Buffer, pH 2.5 and neutralized to pH 7 with Tris Buffer pH 9. The protein concentration of the purified antibody was determined by Protein A HPLC method.

Example 9: Affinity Analysis of Anti-Human PD-1 Antibody by Surface Plasmon Resonance (SPR) Method Affinity rate constants for the binding of anti-PD-1 antibody candidates (IP-H4L1 (IgG4), IP-H4L1 (IgG1), IP-H4.2L1, IP-H4.19L1, IP-H4.36L1, N5NL, N6NL, N7NL, N9NL and N10NL) to the human PD-1 were determined using Proteon XPR (Biorad). Human PD-1 (Acro-Biosystems) was directly immobilized onto the GLC Chip (ProteOn) using amine-coupling method to obtain a ligand immobilization level of about 500 RU. 10 mM Phosphate Buffered Saline (PBS) (10 mM phosphate buffer, pH 7.4, 300 mM NaCl, 0.005% Surfactant P20) was used as the running buffer to carry out the kinetic measurements. All the one step purified antibody samples were diluted in running buffer described above at a suitable concentration in series of concentrations from 10 nM to 0.09 nM. These samples were injected over the chip at a flow rate of 50 μL/min with an association time of 300 s and dissociation time of 1800 s. After each sample run, the chip surface was regenerated with 10 mM Glycine Buffer pH 1.5 for 18 sec at a flow rate of 100 μ/min.

$K_D$ values (Kinetic constants) were determined as the ratio of dissociation rate (kd) to association rate (ka), i.e. $K_D = kd/ka$ using ProteOn manager software v3.1.0.6.

The results are presented in table 8. The data was analysed using Langmuir binding model.

TABLE 8

Results of affinity analysis of anti-PD-1 antibodies by Surface Plasmon Resonance

| Sample details | Association Rate constant Ka (1/Ms) | Dissociation Rate constant Kd (1/s) | Affinity Rate constant $K_D$ (M) |
|---|---|---|---|
| IP-H4.19L1 | 1.54E+06 | 6.28E−05 | 4.09E−11 |
| IP-H4.2L1 | 1.67E+06 | 1.37E−05 | 8.20E−12 |
| IP-H4.36L1 | 1.96E+06 | 6.20E−05 | 3.17E−11 |

TABLE 8-continued

Results of affinity analysis of anti-PD-1 antibodies by Surface Plasmon Resonance

| Sample details | Association Rate constant Ka (1/Ms) | Dissociation Rate constant Kd (1/s) | Affinity Rate constant $K_D$ (M) |
|---|---|---|---|
| IP-H4L1 (IgG4) | 1.87E+06 | 5.36E−05 | 2.86E−11 |
| IP-H4L1 (IgG1) | 2.12E+06 | 5.21E−05 | 2.48E−11 |
| N5NL | 2.03E+06 | 1.51E−04 | 7.50E−11 |
| N6NL | 1.86E+06 | 1.54E−04 | 8.26E−11 |
| N7NL | 1.95E+06 | 9.54E−05 | 4.91E−11 |
| N9NL | 1.48E+06 | 7.17E−05 | 4.86E−11 |
| N10NL | 1.34E+06 | 8.51E−05 | 6.39E−11 |

Figure 4:
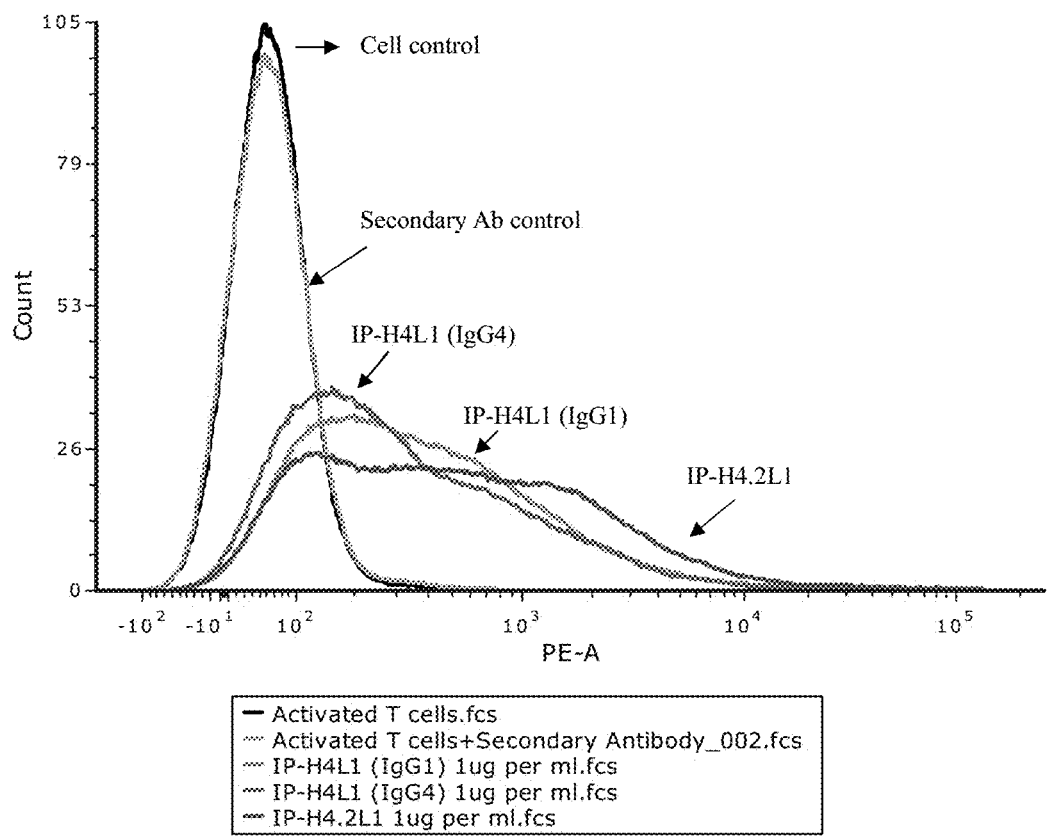
FIG. 4 depicts the results of flow cytometry experiment demonstrating that anti-PD-1 antibodies IP-H4.2L1, IP-H4L1 (IgG1) and IP-H4L1 (IgG4) of the present invention, directed against human PD-1, bind to PD-1 on the cell surface of human PBMCs.

Example 10: Analysis of Anti-PD-1 Antibodies Using Flow Cytometric Assay in PBMC Cells Human peripheral blood mononuclear cells (PBMC) depleted of monocytes were activated with plate-coated anti-CD3 antibody (clone UCHT-1; BD Biosciences) for 3 days. After washing, the cells were incubated with different concentrations of the anti-PD-1 antibodies IP-H4.2L1, IP-H4L1 (IgG1) and IP-H4L1 (IgG4). The binding of these anti-PD-1 antibodies to PD1 expressed on activated cells was assessed using R-phycoerythrin conjugated $F(ab)^2$ Fragment Goat Anti-Human IgG, Fcγ Fragment specific as a secondary reagent and evaluating the samples using a flow cytometer (BD FACS Canto™ II). The binding data is shown in FIG. 4. It demonstrates the binding specificity of IP-H4.2L, IP-H4L1 (IgG1) and IP-H4L1 (IgG4) for human PD1, expressed on the cells.

Figure 5:
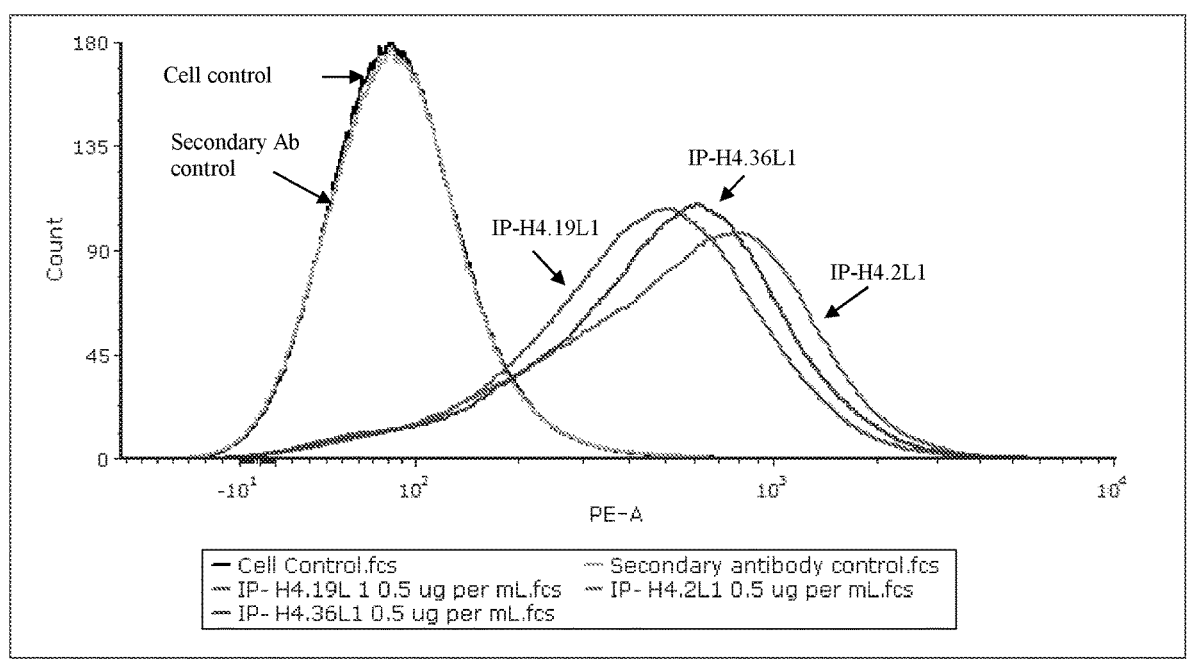
FIG. 5 depicts the results of flow cytometry experiment using HEK 293T cell lines demonstrating that anti-PD-1 antibodies IP-H4.2L1, IP-H4.19L1, IP-H4.36L1 of the present invention, directed against human PD-1, bind to PD-1 on the cell surface.

Example 11: Analysis of Anti-PD-1 Antibodies Using Flow Cytometric Assay in HEK-293T Cells HEK 293T cells stably transfected to express human PD-1 were incubated with different concentrations of the anti-PD-1 antibodies IP-H4.19L1, IP-H4.2L1 and IP-H4.36L1. The binding of these antibodies to PD1 on HEK-293T cells was assessed using R-phycoerythrin conjugated $F(ab)^2$ Fragment Goat Anti-Human IgG, Fcγ fragment specific as a secondary reagent evaluated in a flow cytometer (BD FACS Canto™ II) using. The data is shown in FIG. 5. It demonstrates the binding specificity of IP-H4.19L1, IP-H4.2L1 and IP-H4.36L1 for human PD1 expressed on the cells.

Figure 6:
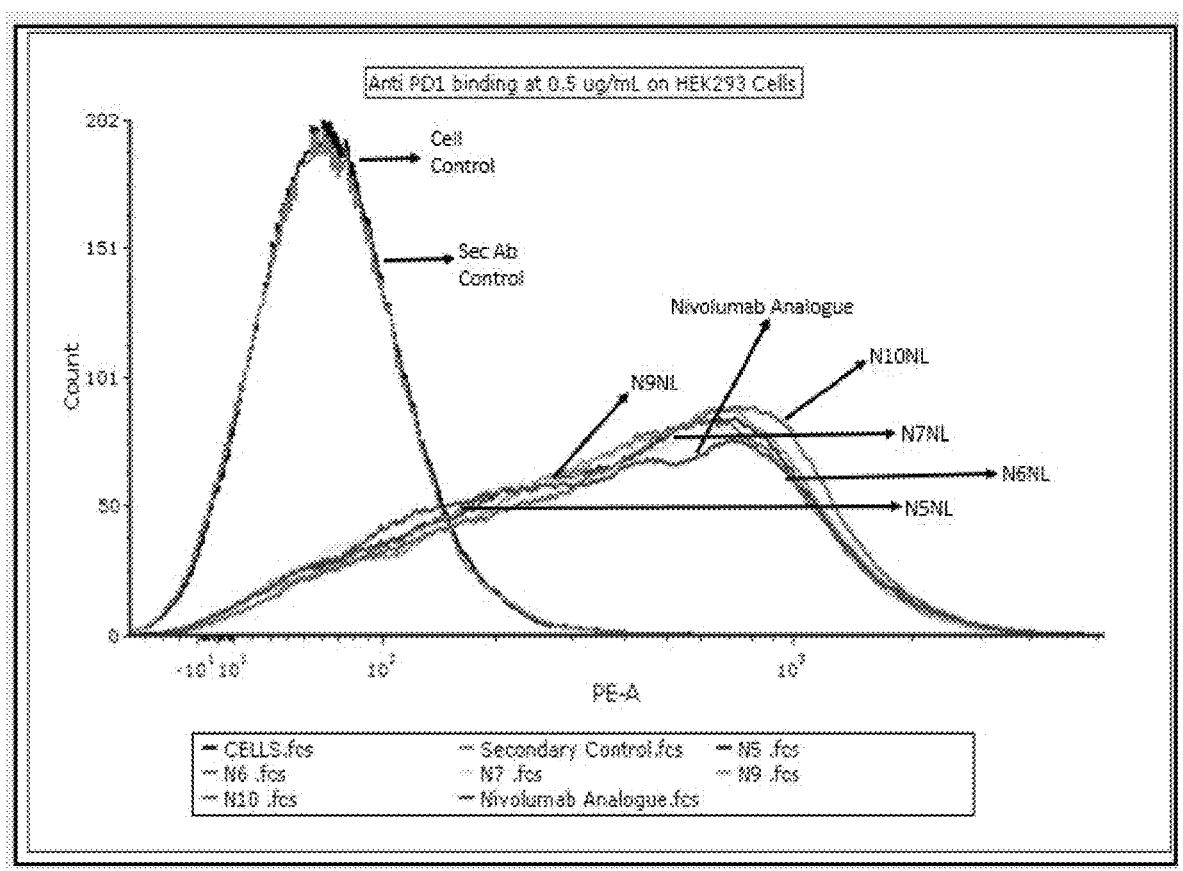
FIG. 6 depicts the results of flow cytometry experiment using HEK 293T cell lines demonstrating that anti-PD-1 antibodies N5NL, N6NL, N7NL, N9NL and N10NL of the present invention, directed against human PD-1, bind to PD-1 on the cell surface.

In the similar manner, other anti-PD-1 antibodies N5NL, N6NL, N7NL, N9NL and N10NL were analysed using flow cytometric assay in HEK-293T cells. The data is shown in FIG. 6.

Example 12: Analysis of Anti-PD-1 Antibody in Mixed Lymphocyte Reaction

Figure 7:
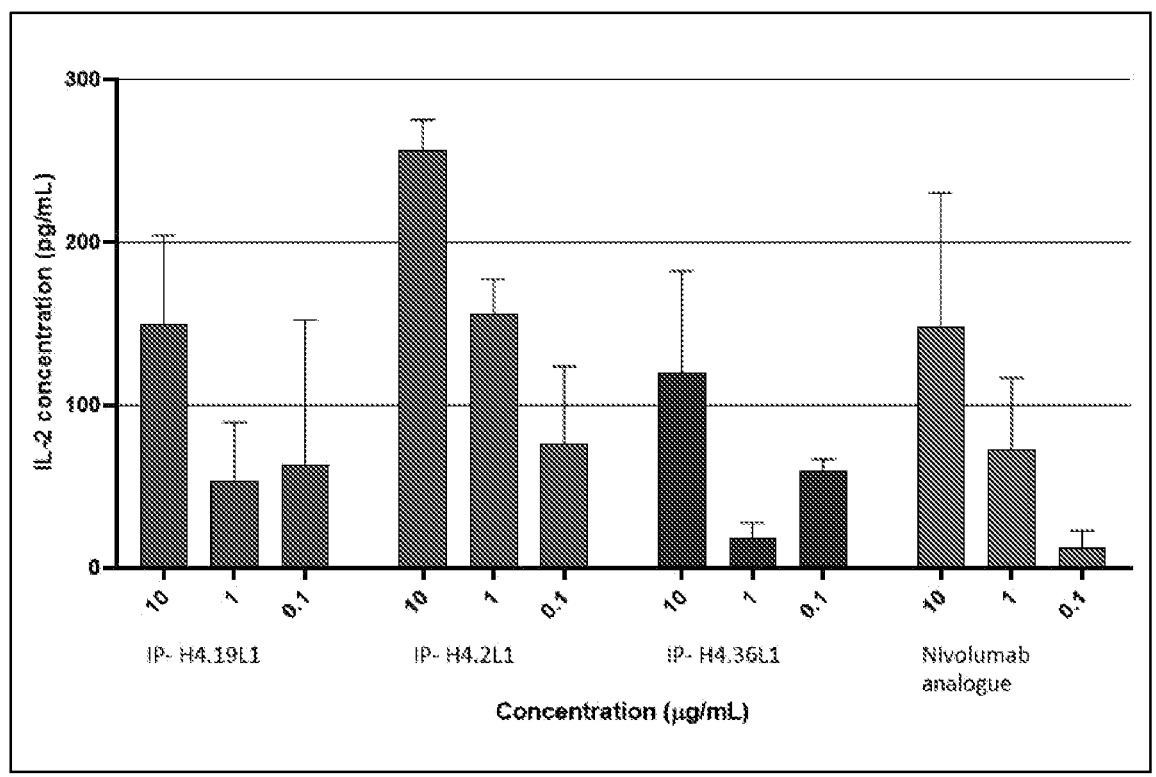
FIG. 7 depicts the results of experiment demonstrating that anti-PD-1 antibodies IP-H4.2L1, IP-H4.19L1, IP-H4.36L1 of the present invention, directed against human PD-1, promote Interleukin-2 (IL-2) secretion in a mixed lymphocyte reaction assay.
Figure 8:
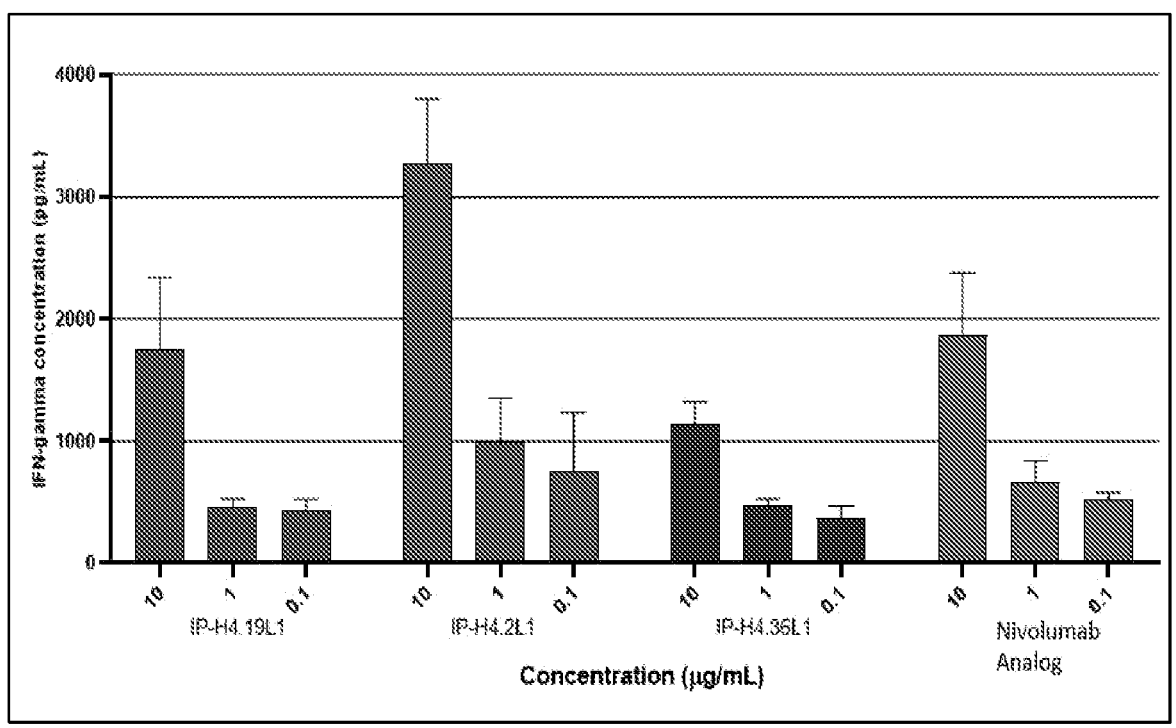
FIG. 8 depicts the results of experiment demonstrating that anti-PD-1 antibodies IP-H4.2L1, IP-H4.19L1, IP-H4.36L1 of the present invention, directed against human PD-1, promote IFN-gamma (IFN-γ) secretion in a mixed lymphocyte reaction assay.

Dendritic cells (DC) were generated by culturing monocytes isolated from PBMCs in vitro for 7 days with 50 ng/mL interleukin-4 (IL-4) and 100 ng/mL GM-CSF (11). Monocyte depleted PBMCs ($5 \times 10^4$) and allogeneic DCs ($1 \times 10^4$) were co-cultured with or without different concentration of anti PD1 antibodies IP-H4.2L1, IP-H4.36L1, IP-H4.19L1, IP-H4L1 (IgG4) and nivolumab analogue, added at the initiation of the assay. After 5 days, culture supernatants were collected and analysed for IL2 and IFN gamma secretion by ELISA (BD Biosciences). The increased secretion of either IL-2 or IFN gamma due to the given anti PD-1 antibody was calculated after subtracting the values obtained with the IgG4 isotype control from the respective group. The results of IL2 and IFN gamma are shown in FIGS. 7 and 8 respectively. The obtained results demonstrate that the anti-PD₁anti-PD-1 antibodies of the present invention are able promote secretion of IL-2 and IFN-gamma by T cells in an MLR.

Figure 9:
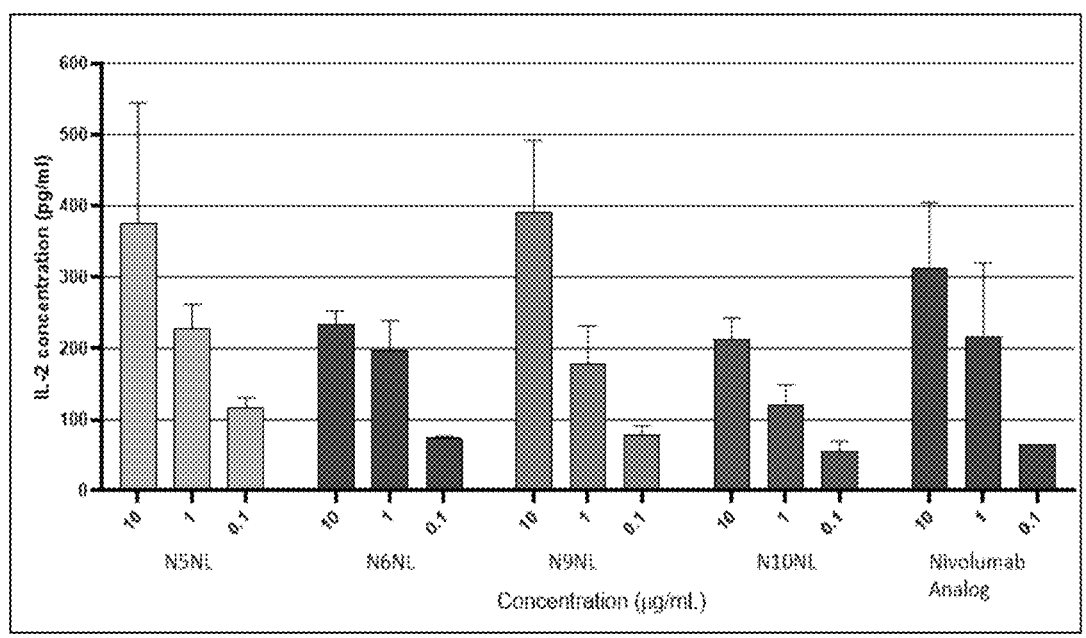
FIG. 9 depicts the results of experiment demonstrating that anti-PD-1 antibodies N5NL, N6NL, N9NL and N10NL of the present invention, directed against human PD-1, promote IL-2 secretion in a mixed lymphocyte reaction assay.
Figure 10:
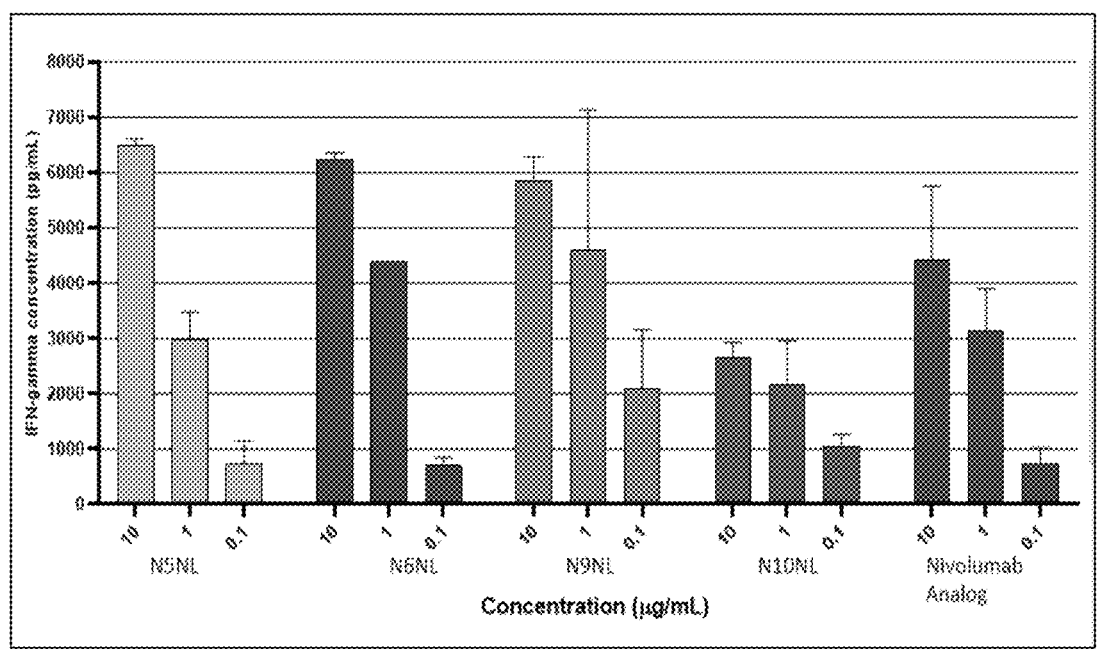
FIG. 10 depicts the results of experiment demonstrating that anti-PD-1 antibodies N5NL, N6NL, N9NL and N10NL of the present invention, directed against human PD-1, promote IFN-γ secretion in a mixed lymphocyte reaction assay.

In the similar manner, other anti-PD-1 antibodies N5NL, N6NL, N9NL and N10NL were analysed in mixed lymphocyte reaction for the analysis of increased IL2 and IFN gamma secretion by ELISA (BD Biosciences). The results of IL2 and IFN gamma are shown in FIGS. 9 and 10 respectively.

LIST OF AMINO ACID SEQUENCES
USED IN THE PRESENT INVENTION

IgG4 constant region
SEQ ID No.: 153
ASTKGPSVFPLAPCSRSTSESTAALGCLVKDYFPE

PVTVSWNSGALTSGVHTFPAVLQSSGLYSLSSVVT

VPSSSLGTKTYTCNVDHKPSNTKVDKRVESKYGPP

CPPCPAPEFLGGPSVFLFPPKPKDTLMISRTPEVT

CVVVDVSQEDPEVQFNVVYVDGVEVHNAKTKPREE

QFNSTYRVVSVLTVLHQDWLNGKEYKCKVSNKGLP

SSIEKTISKAKGQPREPQVYTLPPSQEEMTKNQVS

LTCLVKGFYPSDIAVEWESNGQPENNYKTTPPVLD

SDGSFFLYSRLTVDKSRWQEGNVFSCSVMHEALHN

HYTQKSLSLSLGK

IgG1 constant region
SEQ ID No.: 154
ASTKGPSVFPLAPSSKSTSGGTAALGCLVKDYFPE

PVTVSWNSGALTSGVHTFPAVLQSSGLYSLSSVVT

VPSSSLGTQTYICNVNHKPSNTKVDKKVEPKSCDK

THTCPPCPAPELLGGPSVFLFPPKPKDTLMISRTP

EVTCVVVDVSHEDPEVKFNWYVDGVEVHNAKTKPR

EEQYNSTYRVVSVLTVLHQDWLNGKEYKCKVSNKA

LPAPIEKTISKAKGQPREPQVYTLPPSREEMTKNQ

VSLTCLVKGFYPSDIAVEWESNGQPENNYKTTPPV

LDSDGSFFLYSKLTVDKSRWQQGNVFSCSVMHEAL

HNHYTQKSLSLSPGK

Light chain constant region of IP-L1
SEQ ID No.: 155
RTVAAPSVFIFPPSDEQLKSGTASVVCLLNNFYPR

EAKVQWKVDNALQSGNSQESVTEQDSKDSTYSLSS

TLTLSKADYEKHKVYACEVTHQGLSSPVTKSFNRG

EC

Heavy chain variable region of
nivolumab (prepared synthetically)
SEQ ID No.: 165
QVQLVESGGGVVQPGRSLRLDCKASGITFSNSGMH

WVRQAPGKGLEWVAVIWYDGSKRYYADSVKGRFTI

-continued
LIST OF AMINO ACID SEQUENCES
USED IN THE PRESENT INVENTION

SRDNSKNTLFLQMNSLRAEDTAVYYCATNDDYWGQ

GTLVTVSSASTKGPSVFPLAPCSRSTSESTAALGC

LVKDYFPEPVTVSWNSGALTSGVHTFPAVLQSSGL

YSLSSVVTVPSSSLGTKTYTCNVDHKPSNTKVDKR

VESKYGPPCPPC

Light chain of nivolumab
(prepared synthetically)
SEQ ID No.: 166
EIVLTQSPATLSLSPGERATLSCRASQSVSSYLAW

YQQKPGQAPRLLIYDASNRATGIPARFSGSGSGTD

FTLTISSLEPEDFAVYYCQQSSNWPRTFGQGTKVE

IKRTVAAPSVFIFPPSDEQLKSGTASVVCLLNNFY

PREAKVQWKVDNALQSGNSQESVTEQDSKDSTYSL

SSTLTLSKADYEKHKVYACEVTHQGLSSPVTKSFN

RGEC

Light chain of NL
SEQ ID No.: 167
EIVLTQSPATLSLSPGERATLSCRASQSVSSYLAW

YQQKPGQAPRLLIYDASNRATGIPARFSGSGSGTD

FTLTISSLEPEDFAVYYCQQSSNWPRTFGQGTKVE

IKRTVAAPSVFIFPPSDEQLKSGTASVVCLLNNFY

PREAKVQWKVDNALQSGNSQESVTEQDSKDSTYSL

SSTLTLSKADYEKHKVYACEVTHQGLSSPVTKSFN

RGEC

IgG4 constant region
SEQ ID No.: 168
PSVFPLAPCSRSTSESTAALGCLVKDYFPEPVTVS

WNSGALTSGVHTFPAVLQSSGLYSLSSVVTVPSSS

LGTKTYTCNVDHKPSNTKVDKRVESKYGPPCPPCP

APEFLGGPSVFLFPPKPKDTLMISRTPEVTCVVVD

VSQEDPEVQFNWYVDGVEVHNAKTKPREEQFNSTY

RVVSVLTVLHQDWLNGKEYKCKVSNKGLPSSIEKT

ISKAKGQPREPQVYTLPPSQEEMTKNQVSLTCLVK

GFYPSDIAVEWESNGQPENNYKTTPPVLDSDGSFF

LYSRLTVDKSRWQEGNVFSCSVMHEALHNHYTQKS

LSLSLGK

LIST OF NUCLEOTIDE SEQUENCES
USED IN THE PRESENT INVENTION

IgG4 constant region
SEQ ID No.: 156
GCCTCCACCAAGGGCCCCTCCGTGTTCCCTCTGGC

CCCTTGCTCCCGGTCCACCTCCGAGTCTACCGCCG

LIST OF NUCLEOTIDE SEQUENCES USED IN THE PRESENT INVENTION

CTCTGGGCTGCCTGGTGAAAGACTACTTCCCCGAG

CCCGTGACCGTGTCCTGGAACTCTGGCGCCCTGAC

CAGCGGCGTGCACACCTTCCCTGCCGTGCTGCAGT

CCTCCGGCCTGTACTCCCTGTCCTCCGTGGTGACC

GTGCCCTCCTCCAGCCTGGGCACCAAGACCTACAC

CTGTAACGTGGACCACAAGCCCTCCAACACCAAGG

TGGACAAGCGGGTGGAATCTAAGTACGGCCCTCCC

TGCCCCCCCTGCCCTGCCCCTGAATTTCTGGGCGG

ACCTTCCGTGTTCCTGTTCCCCCCAAAGCCCAAGG

ACACCCTGATGATCTCCCGGACCCCCGAAGTGACC

TGCGTGGTGGTGGACGTGTCCCAGGAAGATCCCGA

GGTGCAGTTCAATTGGTACGTGGACGGCGTGGAAG

TGCACAACGCCAAGACCAAGCCCAGAGAGGAACAG

TTCAACTCCACCTACCGGGTGGTGTCTGTGCTGAC

CGTGCTGCACCAGGACTGGCTGAACGGCAAAGAGT

ACAAGTGCAAGGTGTCCAACAAGGGCCTGCCCTCC

AGCATCGAAAAGACCATCTCCAAGGCCAAGGGCCA

GCCCCGCGAGCCCCAGGTGTACACCCTGCCCCCTA

GCCAGGAAGAGATGACCAAGAACCAGGTGTCCCTG

ACCTGTCTGGTGAAAGGCTTCTACCCCTCCGATAT

CGCCGTGGAATGGGAGTCCAACGGCCAGCCCGAGA

ACAACTACAAGACCACCCCCCCTGTGCTGGACTCC

GACGGCTCCTTCTTCCTGTACTCTCGGCTGACCGT

GGACAAGTCCCGGTGGCAGGAAGGCAACGTGTTCT

CCTGCTCCGTGATGCACGAGGCCCTGCACAACCAC

TACACCCAGAAGTCCCTGTCCCTGAGCCTGGGTAA

GTGATGA

IgG1 constant region
SEQ ID No.: 157

GCTAGCACCAAGGGCCCATCGGTCTTCCCCCTGGC

ACCCTCCTCCAAGAGCACCTCTGGGGGCACAGCGG

CCCTGGGCTGCCTGGTCAAGGACTACTTCCCCGAA

CCGGTGACGGTGTCGTGGAACTCAGGCGCCCTGAC

CAGCGGCGTGCACACCTTCCCGGCTGTCCTACAGT

CCTCAGGACTCTACTCCCTCAGCAGCGTGGTGACC

GTGCCCTCCAGCAGCTTGGGCACCCAGACCTACAT

CTGCAACGTGAATCACAAGCCCAGCAACACCAAGG

TGGACAAGAAAGTTGAGCCCAAATCTTGTGACAAA

ACTCACACATGCCCACCGTGCCCAGCACCTGAACT

CCTGGGGGGACCGTCAGTCTTCCTCTTCCCCCCAA

AACCCAAGGACACCCTCATGATCTCCCGGACCCCT

GAGGTCACATGCGTGGTGGTGGACGTGAGCCACGA

AGACCCTGAGGTCAAGTTCAACTGGTACGTGGACG

GCGTGGAGGTGCATAATGCCAAGACAAAGCCGCGG

GAGGAGCAGTACAACAGCACGTACCGTGTGGTCAG

CGTCCTCACCGTCCTGCACCAGGACTGGCTGAATG

GCAAGGAGTACAAGTGCAAGGTCTCCAACAAAGCC

CTCCCAGCCCCCATCGAGAAAACCATCTCCAAAGC

CAAAGGGCAGCCCCGAGAACCACAGGTGTACACCC

TGCCCCCATCCCGGGAGGAGATGACCAAGAACCAG

GTCAGCCTGACCTGCCTGGTCAAAGGCTTCTATCC

CAGCGACATCGCCGTGGAGTGGGAGAGCAATGGGC

AGCCGGAGAACAACTACAAGACCACGCCTCCCGTG

CTGGACTCCGACGGCTCCTTCTTCCTCTACAGCAA

GCTCACCGTGGACAAGAGCAGGTGGCAGCAGGGGA

ACGTCTTCTCATGCTCCGTGATGCATGAGGCTCTG

CACAACCACTACACGCAGAAGAGCCTCTCCCTGTC

TCCGGGTAAATGA

Heavy chain variable region of IP-H4
SEQ ID No.: 158

CAGGTGCAGCTGGTGCAGTCCGGCGTGGAAGTGAA

GAAACCTGGCGCCTCCGTGAAGGTGTCCTGCAAGG

CCTCCGGCTACACCTTCACCACCTACTACATCTAC

TGGGTCCGACAGGCCCCAGGCCAGGGCCTGGAATG

GATGGGCGGCGTGAACCCTTCCAACGGCGGCACCA

ACTACAACGAGAACTACAAGAACAGAGTGACCCTG

ACCACCGACTCCTCCACCACCACCGCCTACATGGA

ACTGAAGTCCCTGCAGTTCGACGACACCGCCGTGT

ACTACTGCGCCAGACGGGACTACAGATACGACATG

GGCTTCGACTACTGGGGCCAGGGCACCACCGTGAC

CGTGTCCTCT

Heavy chain variable region of IP-H4.2
SEQ ID No.: 159

CAGGTTCAATTGGTGCAGTCCGGCGTGGAAGTGAA

GAAACCTGGCGCTTCTGTGAAGGTGTCCTGCAAGG

CCTCTGGCTACACCTTTACCACCTACTACATCTAC

TGGGTCCGACAGGCTCCTGGACAGGGACTTGAATG

GATGGGCGGCGTGAACCCTTCTAACGGCGGCACCA

ACTACAACGAGAACTACAAGAACAGAGTGACCCTG

ACCACCGACTCCTCTACCACCACCGCCTACATGGA

ACTGAAGTCCCTGCAGTTCGACGACACCGCCGTGT

ACTACTGCGCCAGAAGAGACTACAGATACGACATG

GGCTACGACTACTGGGGCCAGGGCACAACAGTGAC

CGTGTCCTCT

Heavy chain variable region of
IP-H4.2 (Y.H)
SEQ ID No.: 160
CAGGTGCAGCTGGTGCAGTCCGGCGTGGAAGTGAA

GAAACCTGGCGCCTCCGTGAAGGTGTCCTGCAAGG

CCTCCGGCTACACCTTCACCACCTACTACATCTAC

TGGGTCCGACAGGCCCCAGGCCAGGGCCTGGAATG

GATGGGCGGCGTGAACCCTTCCAACGGCGGCACCA

ACTACAACGAGAACTACAAGAACAGAGTGACCCTG

ACCACCGACTCCTCCACCACCACCGCCTACATGGA

ACTGAAGTCCCTGCAGTTCGACGACACCGCCGTGT

ACTACTGCGCCAGACGGGACTACAGATACGACATG

GGCCATGACTACTGGGGCCAGGGCACCACCGTGAC

CGTGTCCTCTGCCTCCACCAAGGGCCC

Heavy chain variable region of IP-H4.19
SEQ ID No.: 161
CAGGTTCAATTGGTGCAGTCCGGCGTGGAAGTGAA

GAAACCTGGCGCTTCTGTGAAGGTGTCCTGCAAGG

CCTCTGGCTACACCTTTACCACCTACTACATCTAC

TGGGTCCGACAGGCTCCTGGACAGGGACTTGAATG

GATGGGCGGCGTGAACCCTTCCAACTCCGGCACCA

ACTACAACGAGAACTACAAGAACAGAGTGACCCTG

ACCACCGACTCCTCTACCACCACCGCCTACATGGA

ACTGAAGTCCCTGCAGTTCGACGACACCGCCGTGT

ACTACTGCGCCAGAAGAGACTACAGATACGACATG

GGCTTCGACTACTGGGGCCAGGGCACAACAGTGAC

CGTGTCCTCT

Heavy chain variable region of IP-H4.36
SEQ ID No.: 162
CAGGTTCAATTGGTGCAGTCCGGCGTGGAAGTGAA

GAAACCTGGCGCTTCTGTGAAGGTGTCCTGCAAGG

CCTCTGGCTACACCTTTACCACCTACTACATCTAC

TGGGTCCGACAGGCTCCTGGACAGGGACTTGAATG

GATGGGCGGCGTGAACCCTTCTAACGGCGGCACCA

ACTACAACGAGAACTACAAGAACAGAGTGACCCTG

ACCACCGACTCCTCTACCACCACCGCCTACATGGA

ACTGAAGTCCCTGCAGTTCGACGACACCGCCGTGT

ACTACTGCGCCAGAAGAGACTACAGATACGACATG

GGCTTCGACTACTGGGGCCAGGGCACAACAGTGAC

CGTGTCCTCT

Light chain of IP-L1
SEQ ID No.: 163
GAGATCGTGCTGACCCAGTCCCCCGCCACCCTGTC

TCTGTCTCCCGGCGAGAGAGCCACCCTGAGCTGCA

GAGCCTCCAAGGGCGTGTCCACCTCCGGCTACTCC

TACCTGCACTGGTATCAGCAGAAGCCCGGCCAGGC

CCCTCGGCTGCTGATCTACCTGGCCTCCTACCTGG

AATCCGGCGTGCCCGCCAGATTCTCCGGCTCTGGC

TCTGGCACCGACTTCACCCTGACCATCTCCAGCCT

GGAACCCGAGGACTTCGCCGTGTACTACTGCCAGC

ACTCCCGGGACCTGCCCCTGACCTTTGGCGGAGGC

ACCAAGGTGGAAATCAAGCGGACCGTGGCCGCTCC

CTCCGTGTTCATCTTCCCACCCTCCGACGAGCAGC

TGAAGTCCGGCACCGCCTCCGTCGTGTGCCTGCTG

AACAACTTCTACCCCCGCGAGGCCAAGGTGCAGTG

GAAGGTGGACAATGCCCTGCAGTCCGGCAACTCCC

AGGAATCCGTCACCGAGCAGGACTCCAAGGACAGC

ACCTACTCCCTGTCCTCCACCCTGACCCTGTCCAA

GGCCGACTACGAGAAGCACAAGGTGTACGCCTGCG

AAGTGACCCACCAGGGCCTGTCCAGCCCCGTGACC

AAGTCCTTCAACCGGGGCGAGTGCTAATGAGGTAC

C

Fab gene of nivolumab
SEQ ID NO.: 164
GGATAACAATTTCACACAGAATTCATTAAAGAGGA

GAAATTAACCATGAAAAAGAATATCGCATTTCTTC

TTGCATCTATGTTCGTTTTTTCTATTGCTACAAAT

GCCTATGCATCCGAAATCGTGCTGACCCAGTCGCC

CGCTACATTATCGTTGTCACCGGGGAACGCGCGA

CATTGTCCTGTCGCGCATCACAGAGCGTATCTTCG

TATTTGGCCTGGTATCAGCAAAAGCCAGGCCAAGC

CCCCCGTCTTTTAATTTATGACGCCTCTAATCGCG

CAACCGGCATTCCTGCACGCTTTTCCGGCTCAGGG

AGTGGCACGGATTTCACTTTGACGATCAGTAGTCT

TGAACCAGAAGACTTCGCGGTTTACTACTGCCAAC

AATCCTCGAACTGGCCTCGTACATTTGGTCAAGGT

LIST OF NUCLEOTIDE SEQUENCES
USED IN THE PRESENT INVENTION

ACCAAGGTGGAAATCAAACGCACCGTAGCCGCACC

GTCAGTCTTCATCTTCCCTCCCTCTGACGAACAAT

TAAAATCTGGCACAGCTTCCGTTGTATGCCTTCTT

AACAACTTTTATCCACGTGAAGCGAAAGTCCAATG

GAAAGTTGATAATGCACTTCAGTCTGGGAACTCAC

AGGAGTCCGTAACGGAACAGGACTCTAAGGACTCA

ACCTATAGCTTATCTTCAACATTGACATTGTCAAA

GGCAGACTATGAGAAGCACAAAGTGTACGCTTGTG

AAGTCACCCATCAGGGCTTGTCTTCTCCAGTAACC

AAAAGTTTCAATCGCGGGGAGTGTGGTGGTTCTGA

TTACAAAGATGACGATGACAAATAATTAACTCGAG

GCTGAGCAAAGCAGACTACTAATAACATAAAGTCT

ACGCCGGACGCATCGTGGCCCTAGTACGCAAGTTC

ACGTAAAAAGGGTAACTAGAGGTTGAGGTGATTTT

ATGAAAAGAATATCGCATTTCTTCTTGCATCTAT

GTTCGTTTTTTCTATTGCTACAAACGCGTACGCTG

AGATCTCCCAAGTCCAGCTGGTTGAATCAGGTGGG

GGAGTTGTTCAACCGGGGCGTTCCCTGCGTCTGGA

CTGCAAAGCCTCAGGAATTACTTTTTCAAACTCCG

GGATGCACTGGGTTCGTCAAGCCCCCGGAAAAGGG

TTGGAGTGGGTAGCAGTGATCTGGTATGATGGCTC

AAAACGTTACTACGCGGACTCGGTTAAAGGTCGCT

TTACTATTTCACGCGACAACTCGAAAAATACTTTG

TTCTTACAGATGAACTCTCTTCGCGCCGAAGATAC

GGCAGTGTACTATTGCGCCACAAATGATGATTATT

GGGGTCAAGGTACATTAGTGACCGTCAGTAGCGCG

AGTACGAAGGGACCTAGCGTGTTTCCCTTAGCACC

ATGTAGTCGTTCGACAAGCGAATCCACAGCGGCCT

TAGGGTGCTTAGTGAAGGATTATTTTCCCGAGCCA

GTAACAGTATCGTGGAATAGCGGCGCATTAACTTC

CGGCGTTCATACCTTCCCTGCCGTTTTACAGTCAT

CCGGTTTGTATTCTCTTTCGTCAGTAGTAACAGTG

CCTTCCTCCTCGCTGGGGACCAAGACCTATACCTG

CAATGTGGACCATAAGCCTTCAAACACAAAAGTAG

ACAAACGTGTTGAATCAAAGTACGGCCCGCCTTGT

CCGCCCTGCGGATCCAAAGATATCAGATCTGGT

LIST OF NUCLEOTIDE SEQUENCES
USED IN THE PRESENT INVENTION

Heavy chain variable region of N5
SEQ ID NO.: 169
CAGGTTCAATTGGTTGAATCTGGCGGCGGAGTGGT

GCAGCCTGGAAGAAGTCTGAGACTGGATTGCAAGG

CCTCCGGCATCACCTTCTCCAACTCTGGCATGCAC

TGGGTCCGACAGGCCCCTGGAAAAGGACTGGAATG

GGTCGCCGTGATTTGGTACGACGGCTCTAAGCGGT

ACTACGCCGACTCCGTGAAGGGCAGATTCACCATC

TCTCGGGACAACTCCAAGAACACCCTGTTTCTGCA

GATGAACTCCCTGAGAGCCGAGGACACCGCCGTGT

ACTACTGTGCCACCAACTCTGATTTTTGGGGCCAG

GGCACACTGGTCACCGTGTCCTCTGCTTCTACAAA

GGGCCC

Heavy chain variable region of N6
SEQ ID NO.: 170
CAGGTTCAATTGGTTGAATCTGGCGGCGGAGTGGT

GCAGCCTGGAAGAAGTCTGAGACTGGATTGCAAGG

CCTCCGGCATCACCTTCTCCAACTCTGGCATGCAC

TGGGTCCGACAGGCCCCTGGAAAAGGACTGGAATG

GGTCGCCGTGATTTGGTACGACGGCTCTAAGCGGT

ACTACGCCGACTCCGTGAAGGGCAGATTCACCATC

TCTCGGGACAACTCCAAGAACACCCTGTTTCTGCA

GATGAACTCCCTGAGAGCCGAGGACACCGCCGTGT

ACTACTGTGCCACCAATTCTGATCATTGGGGCCAG

GGCACACTGGTCACCGTGTCCTCTGCTTCTACAAA

GGGCCC

Heavy chain variable region of N7
SEQ ID NO.: 171
CAGGTTCAATTGGTTGAATCTGGCGGCGGAGTGGT

GCAGCCTGGAAGAAGTCTGAGACTGGATTGCAAGG

CCTCCGGCATCACCTTCTCCAACTCTGGCATGCAC

TGGGTCCGACAGGCCCCTGGAAAAGGACTGGAATG

GGTCGCCGTGATTTGGTACGACGGCTCTAAGCGGT

ACTACGCCGACTCCGTGAAGGGCAGATTCACCATC

TCTCGGGACAACTCCAAGAACACCCTGTTTCTGCA

GATGAACTCCCTGAGAGCCGAGGACACCGCCGTGT

ACTACTGTGCCACCAACTCTGATTATTGGGGCCAG

GGCACACTGGTCACCGTGTCCTCTGCTTCTACAAA

GGGCCC

LIST OF NUCLEOTIDE SEQUENCES
USED IN THE PRESENT INVENTION

Heavy chain variable region of N9
SEQ ID NO.: 172
CAGGTTCAATTGGTTGAATCTGGCGGCGGAGTGGT

GCAGCCTGGAAGAAGTCTGAGACTGGATTGCAAGG

CCTCCGGCATCACCTTCTCCAACTCTGGCATGCAC

TGGGTCCGACAGGCCCCTGGAAAAGGACTGGAATG

GGTCGCCGTGATTTGGTACGACGGCTCTAAGCGGT

ACTACGCCGACTCCGTGAAGGGCAGATTCACCATC

TCTCGGGACAACTCCAAGAACACCCTGTTTCTGCA

GATGAACTCCCTGAGAGCCGAGGACACCGCCGTGT

ACTACTGTGCCACAAATACCGATTGGTGGGCCAG

GGCACACTGGTCACAGTGTCCTCTGCTTCCACAAA

GGGCCC

Heavy chain variable region of N10
SEQ ID NO.: 173
CAGGTTCAATTGGTTGAATCTGGCGGCGGAGTGGT

GCAGCCTGGAAGAAGTCTGAGACTGGATTGCAAGG

CCTCCGGCATCACCTTCTCCAACTCTGGCATGCAC

TGGGTCCGACAGGCCCCTGGAAAAGGACTGGAATG

GGTCGCCGTGATTTGGTACGACGGCTCTAAGCGGT

ACTACGCCGACTCCGTGAAGGGCAGATTCACCATC

TCTCGGGACAACTCCAAGAACACCCTGTTTCTGCA

GATGAACTCCCTGAGAGCCGAGGACACCGCCGTGT

ACTACTGTGCCACCAATACCGATTATTGGGCCAG

GGCACACTGGTCACCGTGTCCTCTGCTTCTACAAA

GGGCCC

Light chain of NL
SEQ ID NO.: 174
GAGATCGTGCTGACCCAGTCCCCCGCCACCCTGTC

TCTGAGCCCTGGCGAGAGAGCCACCCTGAGCTGCA

GAGCCTCCCAGTCCGTGTCCTCCTACCTGGCCTGG

TATCAGCAGAAGCCCGGCCAGGCCCCTCGGCTGCT

GATCTACGACGCCTCCAACCGGGCCACCGGCATCC

CTGCCAGATTCTCCGGCTCTGGCTCCGGCACCGAC

TTCACCCTGACCATCTCCAGCCTGGAACCCGAGGA

CTTCGCCGTGTACTACTGCCAGCAGTCCTCCAACT

GGCCCCGGACCTTCGGCCAGGGCACCAAGGTGGAA

ATCAAGCGGACCGTGGCCGCTCCCTCCGTGTTCAT

CTTCCCACCCTCCGACGAGCAGCTGAAGTCCGGCA

CCGCCTCCGTGGTCTGCCTGCTGAACAACTTCTAC

CCCCGCGAGGCCAAGGTGCAGTGGAAGGTGGACAA

CGCCCTGCAGTCCGGCAACTCCCAGGAATCCGTGA

CCGAGCAGGACTCCAAGGACAGCACCTACTCCCTG

TCCTCCACCCTGACCCTGTCCAAGGCCGACTACGA

GAAGCACAAGGTGTACGCCTGCGAAGTGACCCACC

AGGGCCTGTCCAGCCCCGTGACCAAGTCCTTCAAC

CGGGGCGAGTGCTGATGA

IgG4 constant region
SEQ ID NO.: 175
GGGCCCCTCCGTGTTCCCTCTGGCCCCTTGCTCCC

GGTCCACCTCCGAGTCTACCGCCGCTCTGGGCTGC

CTGGTGAAAGACTACTTCCCCGAGCCCGTGACCGT

GTCCTGGAACTCTGGCGCCCTGACCAGCGGCGTGC

ACACCTTCCCTGCCGTGCTGCAGTCCTCCGGCCTG

TACTCCCTGTCCTCCGTGGTGACCGTGCCCTCCTC

CAGCCTGGGCACCAAGACCTACACCTGTAACGTGG

ACCACAAGCCCTCCAACACCAAGGTGGACAAGCGG

GTGGAATCTAAGTACGGCCCTCCCTGCCCCCCCTG

CCCTGCCCCTGAATTTCTGGGCGGACCTTCCGTGT

TCCTGTTCCCCCCAAAGCCCAAGGACACCCTGATG

ATCTCCCGGACCCCCGAAGTGACCTGCGTGGTGGT

GGACGTGTCCCAGGAAGATCCCGAGGTGCAGTTCA

ATTGGTACGTGGACGGCGTGGAAGTGCACAACGCC

AAGACCAAGCCCAGAGAGGAACAGTTCAACTCCAC

CTACCGGGTGGTGTCTGTGCTGACCGTGCTGCACC

AGGACTGGCTGAACGGCAAAGAGTACAAGTGCAAG

GTGTCCAACAAGGGCCTGCCCTCCAGCATCGAAAA

GACCATCTCCAAGGCCAAGGGCCAGCCCCGCGAGC

CCCAGGTGTACACCCTGCCCCCTAGCCAGGAAGAG

ATGACCAAGAACCAGGTGTCCCTGACCTGTCTGGT

GAAAGGCTTCTACCCCTCCGATATCGCCGTGGAAT

GGGAGTCCAACGGCCAGCCCGAGAACAACTACAAG

ACCACCCCCCCTGTGCTGGACTCCGACGGCTCCTT

CTTCCTGTACTCTCGGCTGACCGTGGACAAGTCCC

GGTGGCAGGAAGGCAACGTGTTCTCCTGCTCCGTG

ATGCACGAGGCCCTGCACAACCACTACACCCAGAA

GTCCCTGTCCCTGAGCCTGGGCAAGTGATGA

REFERENCES INCORPORATED IN CURRENT PATENT APPLICATION

1. Dong et al, B7-H1, a third member of the B7 family, co-stimulates T-cell proliferation and interleukin-10 secretion, Nature Med., 1999 December; 5(12):1365-9, 1999
2. Zou et al, Inhibitory B7-family molecules in the tumour microenvironment, Nature Review Immunol., June; 8(6): 467-77, 2008
3. Iwai et al., Involvement of PD-L1 on Tumor Cells in the Escape From Host Immune System and Tumor Immunotherapy by PD-L1 Blockade, Proc. Nat 7. Acad. ScL USA 99: 12293-7, 2002
4. Brown et al., Blockade of Programmed Death-1 Ligands on Dendritic Cells Enhances T Cell Activation and Cytokine Production, J. Immunol. 170:1257-66, 2003
5. Sheridan et al, Cautious optimism surrounds early clinical data for PD-1 blocker, Nature Biotechnology 30: 729-730, 2012
6. Angal S, King D J, Bodmer M W, Turner A, Lawson A D, Roberts G, Pedley B, Adair J R. A single amino acid substitution abolishes the heterogeneity of chimeric mouse/human (IgG4) antibody. Mol Immunol. 1993; 30(1): 105-8.
7. Weiyi Peng, Chengwen Liu, et al, PD-1 blockade enhances T cell migration to tumors by elevating IFN-γ inducible chemokines Cancer Res. 2012 Oct. 15; 72(20): 5209-5218
8. Niki Karachaliou, Maria Gonzalez-Cao, Guillermo Crespo, et al, Interferon gamma, an important marker of response to immune checkpoint blockade in non-small cell lung cancer and melanoma patients Therapeutic Advances in Medical Oncology, 2018, Vol. 10: 1-23, 2018
9. Brockmann et al, Synthetic single-framework antibody library integrated with rapid affinity maturation by VL shuffling, Protein Engineering, Design & Selection vol. 24 no. 9 pp. 691-700, 2011
10. Huovinen T, Brockmann E-C, Akter S, Perez-Gamarra S, Ylä-Pelto J, et al., Primer Extension Mutagenesis Powered by Selective Rolling Circle Amplification., Volume 7, Issue 2,e31817, 2012
11. Palucka et al., Dendritic Cells as the Terminal Stage ofMonocyte Differentiation, J Immunology, 160:4587-4595,1998

INCORPORATION BY REFERENCE

The entire disclosure of each of the patent documents and scientific articles referred to herein is incorporated by reference for all purposes.

EQUIVALENTS

The invention may be embodied in other specific forms without departing from the spirit or essential characteristics thereof. The foregoing embodiments are therefore to be considered in all respects illustrative rather than limiting the invention described herein. Scope of the invention is thus indicated by the appended claims rather than by the foregoing description, and all changes that come within the meaning and range of equivalency of the claims are intended to be embraced therein.

We claim:

1. An anti-PD-1 antibody or antigen binding portion thereof comprising a heavy chain variable region comprising the amino acid sequence of SEQ ID NO: 149 and a light chain variable region comprising the amino acid sequence of SEQ ID NO: 152, wherein the anti-PD-1 antibody comprising IgG4 constant region having amino acid sequence of SEQ ID NO: 153 comprising the single amino acid substitution S228P, P329G, M428L and N434S.

2. A composition comprising the antibody, or antigen-binding portion thereof, of claim 1, and a pharmaceutically acceptable carrier.

* * * * *

SEQUENCE LISTING

```
<160> NUMBER OF SEQ ID NOS: 198

<210> SEQ ID NO 1
<211> LENGTH: 5
<212> TYPE: PRT
<213> ORGANISM: Artificial Sequence
<220> FEATURE:
<223> OTHER INFORMATION: Recombinant Sequence

<400> SEQUENCE: 1

Asn Tyr Tyr Leu Tyr
1               5

<210> SEQ ID NO 2
<211> LENGTH: 5
<212> TYPE: PRT
<213> ORGANISM: Artificial Sequence
<220> FEATURE:
<223> OTHER INFORMATION: Recombinant Sequence

<400> SEQUENCE: 2

Asn Tyr Tyr Val Tyr
1               5

<210> SEQ ID NO 3
<211> LENGTH: 5
<212> TYPE: PRT
<213> ORGANISM: Artificial Sequence
<220> FEATURE:
<223> OTHER INFORMATION: Recombinant Sequence

<400> SEQUENCE: 3

Asn Tyr Tyr Ile Tyr
```

```
1               5

<210> SEQ ID NO 4
<211> LENGTH: 5
<212> TYPE: PRT
<213> ORGANISM: Artificial Sequence
<220> FEATURE:
<223> OTHER INFORMATION: Recombinant Sequence

<400> SEQUENCE: 4

Thr Tyr Tyr Ile Tyr
1               5

<210> SEQ ID NO 5
<211> LENGTH: 5
<212> TYPE: PRT
<213> ORGANISM: Artificial Sequence
<220> FEATURE:
<223> OTHER INFORMATION: Recombinant Sequence

<400> SEQUENCE: 5

Thr Tyr Tyr Val Tyr
1               5

<210> SEQ ID NO 6
<211> LENGTH: 5
<212> TYPE: PRT
<213> ORGANISM: Artificial Sequence
<220> FEATURE:
<223> OTHER INFORMATION: Recombinant Sequence

<400> SEQUENCE: 6

Thr Tyr Tyr Met Tyr
1               5

<210> SEQ ID NO 7
<211> LENGTH: 8
<212> TYPE: PRT
<213> ORGANISM: Artificial Sequence
<220> FEATURE:
<223> OTHER INFORMATION: Recombinant Sequence

<400> SEQUENCE: 7

Gly Ile Thr Phe Ser Asn Ser Gly
1               5

<210> SEQ ID NO 8
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 8

Gly Val Asn Pro Ser Asn Gly Gly Thr Asn Tyr Asn Glu Asn Tyr Lys
1               5                   10                  15

<210> SEQ ID NO 9
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 9

Gly Val Asn Pro Ser Asn Ser Gly Thr Asn Tyr Asn Glu Asn Tyr Lys
1               5                   10                  15
```

```
<210> SEQ ID NO 10
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 10

Gly Val Asn Pro Ser Asn Ser Gly Thr Asn Tyr Asn Gln Asn Tyr Lys
1               5                   10                  15

<210> SEQ ID NO 11
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 11

Gly Val Asn Pro Ser Asn Gly Ser Thr Asn Tyr Asn Gln Asn Tyr Lys
1               5                   10                  15

<210> SEQ ID NO 12
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 12

Gly Met Asn Pro Ser Asn Gly Gly Thr Asn Tyr Asn Glu Asn Tyr Lys
1               5                   10                  15

<210> SEQ ID NO 13
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 13

Gly Met Asn Pro Ser Asn Gly Ser Thr Asn Tyr Asn Gln Asn Tyr Lys
1               5                   10                  15

<210> SEQ ID NO 14
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 14

Gly Val Asn Ser Ser Asn Gly Gly Thr Asn Tyr Asn Glu Asn Tyr Lys
1               5                   10                  15

<210> SEQ ID NO 15
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 15

Gly Ile Asn Ser Ser Asn Gly Gly Thr Asn Tyr Asn Glu Asn Tyr Lys
1               5                   10                  15
```

<210> SEQ ID NO 16
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 16

Gly Val Asn Ser Ser Asn Gly Ser Thr Asn Tyr Asn Glu Asn Tyr Lys
1               5                   10                  15

<210> SEQ ID NO 17
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 17

Gly Leu Asn Ser Ser Asn Gly Ser Thr Asn Tyr Asn Glu Asn Tyr Lys
1               5                   10                  15

<210> SEQ ID NO 18
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 18

Gly Val Asn Pro Ser Asn Gly Gly Thr Asn Tyr Ser Glu Lys Tyr Lys
1               5                   10                  15

<210> SEQ ID NO 19
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 19

Gly Val Asn Pro Ser Asn Gly Gly Thr Asn Tyr Ser Glu Lys Phe Lys
1               5                   10                  15

<210> SEQ ID NO 20
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 20

Gly Leu Asn Pro Ser Asn Ser Gly Thr Asn Tyr Asn Glu Asn Tyr Lys
1               5                   10                  15

<210> SEQ ID NO 21
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 21

Gly Leu Asn Pro Ser Asn Gly Ser Thr Asn Tyr Asn Glu Asn Tyr Lys
1               5                   10                  15

```
<210> SEQ ID NO 22
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 22

Gly Ile Asn Pro Ser Asn Gly Gly Thr Asn Tyr Asn Glu Asn Tyr Lys
1               5                   10                  15

<210> SEQ ID NO 23
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 23

Gly Val Asn Pro Ser Asn Gly Gly Thr Asn Phe Asn Glu Asn Tyr Lys
1               5                   10                  15

<210> SEQ ID NO 24
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 24

Gly Val Asn Pro Ser Asn Gly Gly Thr Asn Tyr Asn Glu Lys Tyr Lys
1               5                   10                  15

<210> SEQ ID NO 25
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 25

Gly Val Asn Pro Ser Asn Gly Gly Thr Asn Tyr Asn Glu Asn Phe Lys
1               5                   10                  15

<210> SEQ ID NO 26
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 26

Gly Val Asn Pro Ser Asn Gly Gly Thr Asn Tyr Asn Gln Asn Tyr Lys
1               5                   10                  15

<210> SEQ ID NO 27
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 27

Gly Val Asn Pro Ser Asn Ser Gly Thr Asn Tyr Asn Gln Asn Tyr Lys
1               5                   10                  15

<210> SEQ ID NO 28
```

```
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 28

Gly Val Asn Pro Ser Asn Gly Ser Thr Asn Tyr Asn Gln Asn Tyr Lys
1               5                   10                  15

<210> SEQ ID NO 29
<211> LENGTH: 16
<212> TYPE: PRT
<213> ORGANISM: Artificial Sequence
<220> FEATURE:
<223> OTHER INFORMATION: Recombinant Sequence

<400> SEQUENCE: 29

Gly Met Asn Pro Ser Asn Gly Gly Thr Asn Tyr Asn Glu Asn Tyr Lys
1               5                   10                  15

<210> SEQ ID NO 30
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 30

Ile Trp Tyr Asp Gly Ser Lys Arg Tyr
1               5

<210> SEQ ID NO 31
<211> LENGTH: 11
<212> TYPE: PRT
<213> ORGANISM: Artificial Sequence
<220> FEATURE:
<223> OTHER INFORMATION: Recombinant Sequence

<400> SEQUENCE: 31

Arg Asp Tyr Arg Phe Asp Met Gly Tyr Asp Tyr
1               5                   10

<210> SEQ ID NO 32
<211> LENGTH: 11
<212> TYPE: PRT
<213> ORGANISM: Artificial Sequence
<220> FEATURE:
<223> OTHER INFORMATION: Recombinant Sequence

<400> SEQUENCE: 32

Arg Asp Tyr Arg Tyr Asp Met Gly Phe Asp Tyr
1               5                   10

<210> SEQ ID NO 33
<211> LENGTH: 11
<212> TYPE: PRT
<213> ORGANISM: Artificial Sequence
<220> FEATURE:
<223> OTHER INFORMATION: Recombinant Sequence

<400> SEQUENCE: 33

Arg Asp Tyr Arg Tyr Asp Met Gly Tyr Asp Tyr
1               5                   10

<210> SEQ ID NO 34
<211> LENGTH: 11
```

```
<212> TYPE: PRT
<213> ORGANISM: Artificial Sequence
<220> FEATURE:
<223> OTHER INFORMATION: Recombinant Sequence

<400> SEQUENCE: 34

Arg Glu Tyr Arg Phe Asp Met Gly Tyr Asp Tyr
1               5                   10

<210> SEQ ID NO 35
<211> LENGTH: 11
<212> TYPE: PRT
<213> ORGANISM: Artificial Sequence
<220> FEATURE:
<223> OTHER INFORMATION: Recombinant Sequence

<400> SEQUENCE: 35

Arg Glu Tyr Arg Phe Asp Met Gly Tyr Glu Tyr
1               5                   10

<210> SEQ ID NO 36
<211> LENGTH: 11
<212> TYPE: PRT
<213> ORGANISM: Artificial Sequence
<220> FEATURE:
<223> OTHER INFORMATION: Recombinant Sequence

<400> SEQUENCE: 36

Arg Glu Tyr Arg Tyr Asp Met Gly Tyr Glu Tyr
1               5                   10

<210> SEQ ID NO 37
<211> LENGTH: 11
<212> TYPE: PRT
<213> ORGANISM: Artificial Sequence
<220> FEATURE:
<223> OTHER INFORMATION: Recombinant Sequence

<400> SEQUENCE: 37

Arg Asp Tyr Arg Tyr Asp Leu Gly Tyr Asp Tyr
1               5                   10

<210> SEQ ID NO 38
<211> LENGTH: 11
<212> TYPE: PRT
<213> ORGANISM: Artificial Sequence
<220> FEATURE:
<223> OTHER INFORMATION: Recombinant Sequence

<400> SEQUENCE: 38

Arg Glu Tyr Arg Tyr Asp Met Gly Phe Asp Tyr
1               5                   10

<210> SEQ ID NO 39
<211> LENGTH: 11
<212> TYPE: PRT
<213> ORGANISM: Artificial Sequence
<220> FEATURE:
<223> OTHER INFORMATION: Recombinant Sequence

<400> SEQUENCE: 39

Arg Asp Tyr Arg Tyr Asp Met Gly Phe Glu Tyr
1               5                   10

<210> SEQ ID NO 40
<211> LENGTH: 11
<212> TYPE: PRT
```

```
<213> ORGANISM: Artificial Sequence
<220> FEATURE:
<223> OTHER INFORMATION: Recombinant Sequence

<400> SEQUENCE: 40

Arg Asp Tyr Arg Tyr Asp Met Gly Tyr Glu Tyr
1               5                   10

<210> SEQ ID NO 41
<211> LENGTH: 11
<212> TYPE: PRT
<213> ORGANISM: Artificial Sequence
<220> FEATURE:
<223> OTHER INFORMATION: Recombinant Sequence

<400> SEQUENCE: 41

Arg Glu Tyr Arg Tyr Asp Met Gly Tyr Glu Tyr
1               5                   10

<210> SEQ ID NO 42
<211> LENGTH: 11
<212> TYPE: PRT
<213> ORGANISM: Artificial Sequence
<220> FEATURE:
<223> OTHER INFORMATION: Recombinant Sequence

<400> SEQUENCE: 42

Arg Asp Tyr Arg Tyr Asp Ile Gly Phe Asp Tyr
1               5                   10

<210> SEQ ID NO 43
<211> LENGTH: 11
<212> TYPE: PRT
<213> ORGANISM: Artificial Sequence
<220> FEATURE:
<223> OTHER INFORMATION: Recombinant Sequence

<400> SEQUENCE: 43

Arg Glu Tyr Arg Tyr Asp Ile Gly Tyr Asp Tyr
1               5                   10

<210> SEQ ID NO 44
<211> LENGTH: 11
<212> TYPE: PRT
<213> ORGANISM: Artificial Sequence
<220> FEATURE:
<223> OTHER INFORMATION: Recombinant Sequence

<400> SEQUENCE: 44

Arg Glu Tyr Arg Tyr Asp Ile Gly Tyr Glu Tyr
1               5                   10

<210> SEQ ID NO 45
<211> LENGTH: 11
<212> TYPE: PRT
<213> ORGANISM: Artificial Sequence
<220> FEATURE:
<223> OTHER INFORMATION: Recombinant Sequence

<400> SEQUENCE: 45

Arg Asp Tyr Arg Tyr Asp Gln Gly Tyr Asp Tyr
1               5                   10

<210> SEQ ID NO 46
<211> LENGTH: 11
<212> TYPE: PRT
<213> ORGANISM: Artificial Sequence
```

```
<220> FEATURE:
<223> OTHER INFORMATION: Recombinant Sequence

<400> SEQUENCE: 46

Arg Glu Tyr Arg Tyr Asp Gln Gly Tyr Glu Tyr
1               5                   10

<210> SEQ ID NO 47
<211> LENGTH: 11
<212> TYPE: PRT
<213> ORGANISM: Artificial Sequence
<220> FEATURE:
<223> OTHER INFORMATION: Recombinant Sequence

<400> SEQUENCE: 47

Arg Asp Tyr Arg Tyr Asp Met Gly His Asp Tyr
1               5                   10

<210> SEQ ID NO 48
<211> LENGTH: 4
<212> TYPE: PRT
<213> ORGANISM: Artificial Sequence
<220> FEATURE:
<223> OTHER INFORMATION: Recombinant Sequence

<400> SEQUENCE: 48

Glu Ser Glu Tyr
1

<210> SEQ ID NO 49
<211> LENGTH: 4
<212> TYPE: PRT
<213> ORGANISM: Artificial Sequence
<220> FEATURE:
<223> OTHER INFORMATION: Recombinant Sequence

<400> SEQUENCE: 49

Asn Asn Asp Ile
1

<210> SEQ ID NO 50
<211> LENGTH: 4
<212> TYPE: PRT
<213> ORGANISM: Artificial Sequence
<220> FEATURE:
<223> OTHER INFORMATION: Recombinant Sequence

<400> SEQUENCE: 50

Asn Ser Asp Phe
1

<210> SEQ ID NO 51
<211> LENGTH: 4
<212> TYPE: PRT
<213> ORGANISM: Artificial Sequence
<220> FEATURE:
<223> OTHER INFORMATION: Recombinant Sequence

<400> SEQUENCE: 51

Asn Ser Asp His
1

<210> SEQ ID NO 52
<211> LENGTH: 4
<212> TYPE: PRT
<213> ORGANISM: Artificial Sequence
<220> FEATURE:
```

<223> OTHER INFORMATION: Recombinant Sequence

<400> SEQUENCE: 52

Asn Ser Asp Tyr
1

<210> SEQ ID NO 53
<211> LENGTH: 4
<212> TYPE: PRT
<213> ORGANISM: Artificial Sequence
<220> FEATURE:
<223> OTHER INFORMATION: Recombinant Sequence

<400> SEQUENCE: 53

Asn Ser Gly Tyr
1

<210> SEQ ID NO 54
<211> LENGTH: 4
<212> TYPE: PRT
<213> ORGANISM: Artificial Sequence
<220> FEATURE:
<223> OTHER INFORMATION: Recombinant Sequence

<400> SEQUENCE: 54

Asn Thr Asp Trp
1

<210> SEQ ID NO 55
<211> LENGTH: 4
<212> TYPE: PRT
<213> ORGANISM: Artificial Sequence
<220> FEATURE:
<223> OTHER INFORMATION: Recombinant Sequence

<400> SEQUENCE: 55

Asn Thr Asp Tyr
1

<210> SEQ ID NO 56
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 56

Arg Ala Ser Lys Gly Val Ser Thr Ser Gly Tyr Ser Phe Leu His
1               5                   10                  15

<210> SEQ ID NO 57
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 57

Arg Ala Ser Lys Gly Val Ser Thr Ser Gly Tyr Ser Trp Leu His
1               5                   10                  15

<210> SEQ ID NO 58
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 58

Arg Ala Ser Lys Gly Val Ser Thr Ser Gly Tyr Ser Tyr Leu Tyr
1               5                   10                  15

<210> SEQ ID NO 59
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 59

Arg Ala Ser Lys Gly Val Ser Thr Ser Gly Tyr Ser Tyr Ile Tyr
1               5                   10                  15

<210> SEQ ID NO 60
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 60

Arg Ala Ser Lys Gly Val Ser Thr Ser Gly Tyr Ser Phe Leu Tyr
1               5                   10                  15

<210> SEQ ID NO 61
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 61

Arg Ala Ser Lys Gly Val Ser Thr Ser Gly Tyr Thr Tyr Leu Tyr
1               5                   10                  15

<210> SEQ ID NO 62
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 62

Arg Ala Ser Lys Asn Val Ser Thr Ser Gly Tyr Ser Tyr Leu Tyr
1               5                   10                  15

<210> SEQ ID NO 63
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 63

Arg Ala Ser Glu Gly Val Ser Thr Ser Gly Tyr Ser Tyr Leu His
1               5                   10                  15

<210> SEQ ID NO 64
<211> LENGTH: 15
<212> TYPE: PRT
<213> ORGANISM: Artificial Sequence
<220> FEATURE:
<223> OTHER INFORMATION: Recombinant Sequence

```
<400> SEQUENCE: 64

Arg Ala Ser Glu Gly Val Ser Thr Ser Gly Phe Ser Tyr Ile His
1               5                   10                  15

<210> SEQ ID NO 65
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 65

Arg Ala Ser Lys Asn Val Ser Thr Thr Gly Phe Ser Tyr Leu His
1               5                   10                  15

<210> SEQ ID NO 66
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 66

Arg Ala Ser Lys Asn Val Ser Ser Ser Tyr Ser Tyr Leu His
1               5                   10                  15

<210> SEQ ID NO 67
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 67

Arg Ala Ser Lys Asn Val Ser Ser Ser Phe Ser Tyr Leu Tyr
1               5                   10                  15

<210> SEQ ID NO 68
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 68

Arg Ala Ser Lys Gly Val Ser Ser Thr Ser Phe Ser Tyr Ile His
1               5                   10                  15

<210> SEQ ID NO 69
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 69

Arg Ala Ser Arg Gly Ile Ser Thr Ser Gly Tyr Ser Tyr Ile His
1               5                   10                  15

<210> SEQ ID NO 70
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 70
```

Arg Ala Ser Glu Gly Ile Ser Thr Ser Gly Tyr Ser Tyr Ile His
1               5                   10                  15

<210> SEQ ID NO 71
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 71

Arg Ala Ser Glu Gly Leu Asp Thr Ser Gly Tyr Ser Tyr Ile His
1               5                   10                  15

<210> SEQ ID NO 72
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 72

Arg Ala Ser Glu Gly Leu Glu Thr Ser Gly Tyr Ser Tyr Ile His
1               5                   10                  15

<210> SEQ ID NO 73
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 73

Arg Ala Ser Glu Gly Ile Ser Thr Ser Gly Tyr Ser Tyr Val His
1               5                   10                  15

<210> SEQ ID NO 74
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 74

Arg Ala Ser Lys Gly Ile Ser Thr Asp Gly Tyr Ser Tyr Met His
1               5                   10                  15

<210> SEQ ID NO 75
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 75

Arg Ala Ser Lys Gly Ile Ser Thr Glu Gly Tyr Ser Tyr Met His
1               5                   10                  15

<210> SEQ ID NO 76
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 76

Arg Ala Asp Lys Gly Val Ser Thr Ser Gly Tyr Ser Tyr Met His
1               5                   10                  15

<210> SEQ ID NO 77
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 77

Arg Ala Ser Lys Gly Val Ser Thr Ser Gly Tyr Ser Tyr Leu His
1               5                   10                  15

<210> SEQ ID NO 78
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 78

Arg Ala Ser Lys Ser Val Ser Thr Ser Gly Phe Ser Tyr Leu His
1               5                   10                  15

<210> SEQ ID NO 79
<211> LENGTH: 11
<212> TYPE: PRT
<213> ORGANISM: Artificial Sequence
<220> FEATURE:
<223> OTHER INFORMATION: Recombinant Sequence

<400> SEQUENCE: 79

Arg Ala Ser Gln Ser Val Ser Ser Tyr Leu Ala
1               5                   10

<210> SEQ ID NO 80
<211> LENGTH: 15
<212> TYPE: PRT
<213> ORGANISM: Artificial Sequence
<220> FEATURE:
<223> OTHER INFORMATION: Recombinant Sequence

<400> SEQUENCE: 80

Arg Gly Ser Lys Gly Val Ser Ser Gly Ile Tyr Ser Tyr Leu His
1               5                   10                  15

<210> SEQ ID NO 81
<211> LENGTH: 6
<212> TYPE: PRT
<213> ORGANISM: Artificial Sequence
<220> FEATURE:
<223> OTHER INFORMATION: Recombinant Sequence

<400> SEQUENCE: 81

Gln Ser Val Ser Ser Tyr
1               5

<210> SEQ ID NO 82
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 82

Ile Ala Ser Tyr Leu Glu Ser

```
<210> SEQ ID NO 83
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 83

Met Ala Ser Tyr Leu Glu Ser
1               5

<210> SEQ ID NO 84
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 84

Val Ala Ser Tyr Leu Glu Ser
1               5

<210> SEQ ID NO 85
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 85

Phe Ala Ser Tyr Leu Glu Ser
1               5

<210> SEQ ID NO 86
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 86

Ala Ala Ser Tyr Leu Glu Ser
1               5

<210> SEQ ID NO 87
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 87

Ile Ala Ser Phe Leu Glu Ser
1               5

<210> SEQ ID NO 88
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 88

Ile Ala Ser Trp Leu Glu Ser
1               5
```

```
<210> SEQ ID NO 89
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 89

Ile Ala Ser His Leu Glu Ser
1               5

<210> SEQ ID NO 90
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 90

Met Ala Ser Phe Leu Glu Ser
1               5

<210> SEQ ID NO 91
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 91

Met Ala Ser Trp Leu Glu Ser
1               5

<210> SEQ ID NO 92
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 92

Leu Ala Ser Tyr Leu Gln Ser
1               5

<210> SEQ ID NO 93
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 93

Ile Ala Ser Tyr Leu Gln Ser
1               5

<210> SEQ ID NO 94
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 94

Ile Ala Ser Phe Leu Gln Ser
1               5
```

```
<210> SEQ ID NO 95
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 95

Leu Ala Ser Phe Leu Gln Ser
1               5

<210> SEQ ID NO 96
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 96

Leu Ala Ser Trp Leu Gln Ser
1               5

<210> SEQ ID NO 97
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 97

Ile Ala Ser Trp Leu Gln Ser
1               5

<210> SEQ ID NO 98
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 98

Val Ala Ser Trp Leu Gln Ser
1               5

<210> SEQ ID NO 99
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 99

Ala Ala Ser Phe Leu Glu Ser
1               5

<210> SEQ ID NO 100
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 100

Leu Ala Asp Tyr Leu Glu Ser
1               5
```

```
<210> SEQ ID NO 101
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 101

Leu Ala Asp Tyr Ile Glu Ser
1               5

<210> SEQ ID NO 102
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 102

Leu Ala Asp Tyr Val Glu Ser
1               5

<210> SEQ ID NO 103
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 103

Leu Ala Glu Tyr Met Glu Ser
1               5

<210> SEQ ID NO 104
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 104

Leu Ala Glu Tyr Val Glu Ser
1               5

<210> SEQ ID NO 105
<211> LENGTH: 8
<212> TYPE: PRT
<213> ORGANISM: Artificial Sequence
<220> FEATURE:
<223> OTHER INFORMATION: Recombinant Sequence

<400> SEQUENCE: 105

Leu Ala Asp Tyr Leu Glu Asp Tyr
1               5

<210> SEQ ID NO 106
<211> LENGTH: 8
<212> TYPE: PRT
<213> ORGANISM: Artificial Sequence
<220> FEATURE:
<223> OTHER INFORMATION: Recombinant Sequence

<400> SEQUENCE: 106

Leu Ala Asp Tyr Ile Glu Asp Tyr
1               5

<210> SEQ ID NO 107
```

```
<211> LENGTH: 8
<212> TYPE: PRT
<213> ORGANISM: Artificial Sequence
<220> FEATURE:
<223> OTHER INFORMATION: Recombinant Sequence

<400> SEQUENCE: 107

Leu Ala Glu Tyr Leu Glu Asp Tyr
1               5

<210> SEQ ID NO 108
<211> LENGTH: 7
<212> TYPE: PRT
<213> ORGANISM: Artificial Sequence
<220> FEATURE:
<223> OTHER INFORMATION: LASYLES

<400> SEQUENCE: 108

Leu Ala Ser Tyr Leu Glu Ser
1               5

<210> SEQ ID NO 109
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 109

Leu Ala Ser Asn Leu Glu Ser
1               5

<210> SEQ ID NO 110
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 110

Asp Ala Ser Asn Arg Ala Thr
1               5

<210> SEQ ID NO 111
<211> LENGTH: 7
<212> TYPE: PRT
<213> ORGANISM: Artificial Sequence
<220> FEATURE:
<223> OTHER INFORMATION: Recombinant Sequence

<400> SEQUENCE: 111

Lys Ala Ser Ser Leu Glu Ser
1               5

<210> SEQ ID NO 112
<211> LENGTH: 3
<212> TYPE: PRT
<213> ORGANISM: Artificial Sequence
<220> FEATURE:
<223> OTHER INFORMATION: Recombinant Sequence

<400> SEQUENCE: 112

Asp Ala Ser
1

<210> SEQ ID NO 113
<211> LENGTH: 9
```

```
<212> TYPE: PRT
<213> ORGANISM: Artificial Sequence
<220> FEATURE:
<223> OTHER INFORMATION: Recombinant Sequence

<400> SEQUENCE: 113

Gln His Ser Arg Glu Leu Pro Leu Thr
1               5

<210> SEQ ID NO 114
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 114

Gln His Ser Arg Asn Leu Pro Leu Thr
1               5

<210> SEQ ID NO 115
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 115

Gln His Ser Arg Glu Ile Pro Leu Thr
1               5

<210> SEQ ID NO 116
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 116

Gln His Ser Arg Asn Ile Pro Leu Thr
1               5

<210> SEQ ID NO 117
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 117

Gln His Ser Arg Asp Ile Pro Leu Thr
1               5

<210> SEQ ID NO 118
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 118

Gln His Ser Arg Asp Phe Pro Leu Thr
1               5

<210> SEQ ID NO 119
<211> LENGTH: 9
<212> TYPE: PRT
```

```
<213> ORGANISM: Artificial Sequence
<220> FEATURE:
<223> OTHER INFORMATION: Recombinant Sequence

<400> SEQUENCE: 119

Gln His Ser Arg Asn Phe Pro Leu Thr
1               5

<210> SEQ ID NO 120
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 120

Gln His Ser Arg Asp Ile Pro Ile Thr
1               5

<210> SEQ ID NO 121
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 121

Gln His Ser Arg Asp Phe Pro Ile Thr
1               5

<210> SEQ ID NO 122
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 122

Gln Arg Ser Arg Asp Leu Pro Leu Thr
1               5

<210> SEQ ID NO 123
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 123

Gln Lys Ser Arg Asp Leu Pro Leu Thr
1               5

<210> SEQ ID NO 124
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 124

Gln Tyr Ser Arg Asp Leu Pro Ile Thr
1               5

<210> SEQ ID NO 125
<211> LENGTH: 9
<212> TYPE: PRT
<213> ORGANISM: Artificial Sequence
```

```
<220> FEATURE:
<223> OTHER INFORMATION: Recombinant Sequence

<400> SEQUENCE: 125

Gln Arg Ser Arg Asp Ile Pro Leu Thr
1               5

<210> SEQ ID NO 126
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 126

Gln Lys Ser Arg Asp Ile Pro Leu Thr
1               5

<210> SEQ ID NO 127
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 127

Gln Tyr Ser Arg Asp Ile Pro Leu Thr
1               5

<210> SEQ ID NO 128
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 128

Gln His Glu Arg Asp Leu Pro Leu Thr
1               5

<210> SEQ ID NO 129
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 129

Gln His Glu Arg Asp Ile Pro Leu Thr
1               5

<210> SEQ ID NO 130
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 130

Gln His Arg Arg Asp Ile Pro Val Thr
1               5

<210> SEQ ID NO 131
<211> LENGTH: 9
<212> TYPE: PRT
<213> ORGANISM: Artificial Sequence
<220> FEATURE:
```

<223> OTHER INFORMATION: Recombinant Sequence

<400> SEQUENCE: 131

Gln His Asp Arg Asp Leu Pro Met Thr
1               5

<210> SEQ ID NO 132
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 132

Gln His Ser Arg Asp Leu Pro Leu Thr
1               5

<210> SEQ ID NO 133
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 133

Gln His Ser Trp Glu Leu Pro Leu Thr
1               5

<210> SEQ ID NO 134
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 134

Gln His Tyr Ser Asn Tyr Pro Leu Thr
1               5

<210> SEQ ID NO 135
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 135

Gln His Ser Arg Asp Ala Pro Leu Thr
1               5

<210> SEQ ID NO 136
<211> LENGTH: 9
<212> TYPE: PRT
<213> ORGANISM: Artificial Sequence
<220> FEATURE:
<223> OTHER INFORMATION: Recombinant Sequence

<400> SEQUENCE: 136

Gln Gln Ser Ser Asn Trp Pro Arg Thr
1               5

<210> SEQ ID NO 137
<211> LENGTH: 120
<212> TYPE: PRT
<213> ORGANISM: Artificial Sequence
<220> FEATURE:
<223> OTHER INFORMATION: Recombinant Sequence

<400> SEQUENCE: 137

Gln Val Gln Leu Val Gln Ser Gly Val Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Tyr Ile Tyr Trp Val Arg Gln Ala Pro Gly Gln Gly Leu Glu Trp Met
        35                  40                  45

Gly Gly Val Asn Pro Ser Asn Gly Gly Thr Asn Tyr Asn Glu Asn Tyr
    50                  55                  60

Lys Asn Arg Val Thr Leu Thr Thr Asp Ser Ser Thr Thr Thr Ala Tyr
65                  70                  75                  80

Met Glu Leu Lys Ser Leu Gln Phe Asp Asp Thr Ala Val Tyr Tyr Cys
                85                  90                  95

Ala Arg Arg Asp Tyr Arg Tyr Asp Met Gly Phe Asp Tyr Trp Gly Gln
            100                 105                 110

Gly Thr Thr Val Thr Val Ser Ser
        115                 120

<210> SEQ ID NO 138
<211> LENGTH: 120
<212> TYPE: PRT
<213> ORGANISM: Artificial Sequence
<220> FEATURE:
<223> OTHER INFORMATION: Recombinant Sequence

<400> SEQUENCE: 138

Gln Val Gln Leu Val Gln Ser Gly Val Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Tyr Ile Tyr Trp Val Arg Gln Ala Pro Gly Gln Gly Leu Glu Trp Met
        35                  40                  45

Gly Gly Val Asn Pro Ser Asn Gly Gly Thr Asn Tyr Asn Glu Asn Tyr
    50                  55                  60

Lys Asn Arg Val Thr Leu Thr Thr Asp Ser Ser Thr Thr Thr Ala Tyr
65                  70                  75                  80

Met Glu Leu Lys Ser Leu Gln Phe Asp Asp Thr Ala Val Tyr Tyr Cys
                85                  90                  95

Ala Arg Arg Asp Tyr Arg Tyr Asp Met Gly Tyr Asp Tyr Trp Gly Gln
            100                 105                 110

Gly Thr Thr Val Thr Val Ser Ser
        115                 120

<210> SEQ ID NO 139
<211> LENGTH: 120
<212> TYPE: PRT
<213> ORGANISM: Artificial Sequence
<220> FEATURE:
<223> OTHER INFORMATION: Recombinant Sequence

<400> SEQUENCE: 139

Gln Val Gln Leu Val Gln Ser Gly Val Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Tyr Ile Tyr Trp Val Arg Gln Ala Pro Gly Gln Gly Leu Glu Trp Met
        35                  40                  45

```
Gly Gly Val Asn Pro Ser Asn Gly Gly Thr Asn Tyr Asn Glu Asn Tyr
         50                  55                  60

Lys Asn Arg Val Thr Leu Thr Thr Asp Ser Ser Thr Thr Thr Ala Tyr
 65                  70                  75                  80

Met Glu Leu Lys Ser Leu Gln Phe Asp Asp Thr Ala Val Tyr Tyr Cys
                 85                  90                  95

Ala Arg Arg Asp Tyr Arg Tyr Asp Met Gly His Asp Tyr Trp Gly Gln
                100                 105                 110

Gly Thr Thr Val Thr Val Ser Ser
            115                 120

<210> SEQ ID NO 140
<211> LENGTH: 120
<212> TYPE: PRT
<213> ORGANISM: Artificial Sequence
<220> FEATURE:
<223> OTHER INFORMATION: Recombinant Sequence

<400> SEQUENCE: 140

Gln Val Gln Leu Val Gln Ser Gly Val Glu Val Lys Lys Pro Gly Ala
 1               5                  10                  15

Ser Val Lys Val Ser Cys Lys Ala Ser Gly Tyr Thr Phe Thr Thr Tyr
                 20                  25                  30

Tyr Ile Tyr Trp Val Arg Gln Ala Pro Gly Gln Gly Leu Glu Trp Met
                 35                  40                  45

Gly Gly Val Asn Pro Ser Asn Ser Gly Thr Asn Tyr Asn Glu Asn Tyr
         50                  55                  60

Lys Asn Arg Val Thr Leu Thr Thr Asp Ser Ser Thr Thr Thr Ala Tyr
 65                  70                  75                  80

Met Glu Leu Lys Ser Leu Gln Phe Asp Asp Thr Ala Val Tyr Tyr Cys
                 85                  90                  95

Ala Arg Arg Asp Tyr Arg Tyr Asp Met Gly Phe Asp Tyr Trp Gly Gln
                100                 105                 110

Gly Thr Thr Val Thr Val Ser Ser
            115                 120

<210> SEQ ID NO 141
<211> LENGTH: 120
<212> TYPE: PRT
<213> ORGANISM: Artificial Sequence
<220> FEATURE:
<223> OTHER INFORMATION: Recombinant Sequence

<400> SEQUENCE: 141

Gln Val Gln Leu Val Gln Ser Gly Val Glu Val Lys Lys Pro Gly Ala
 1               5                  10                  15

Ser Val Lys Val Ser Cys Lys Ala Ser Gly Tyr Thr Phe Thr Thr Tyr
                 20                  25                  30

Tyr Ile Tyr Trp Val Arg Gln Ala Pro Gly Gln Gly Leu Glu Trp Met
                 35                  40                  45

Gly Gly Val Asn Pro Ser Asn Ser Gly Thr Asn Tyr Asn Glu Asn Tyr
         50                  55                  60

Lys Asn Arg Val Thr Leu Thr Thr Asp Ser Ser Thr Thr Thr Ala Tyr
 65                  70                  75                  80

Met Glu Leu Lys Ser Leu Gln Phe Asp Asp Thr Ala Val Tyr Tyr Cys
                 85                  90                  95

Ala Arg Arg Asp Tyr Arg Tyr Asp Met Gly Tyr Asp Tyr Trp Gly Gln
```

```
                100             105             110
Gly Thr Thr Val Thr Val Ser Ser
        115                 120

<210> SEQ ID NO 142
<211> LENGTH: 120
<212> TYPE: PRT
<213> ORGANISM: Artificial Sequence
<220> FEATURE:
<223> OTHER INFORMATION: Recombinant Sequence

<400> SEQUENCE: 142

Gln Val Gln Leu Val Gln Ser Gly Val Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Tyr Ile Tyr Trp Val Arg Gln Ala Pro Gly Gln Gly Leu Glu Trp Met
        35                  40                  45

Gly Gly Val Asn Pro Ser Asn Ser Gly Thr Asn Tyr Asn Glu Asn Tyr
    50                  55                  60

Lys Asn Arg Val Thr Leu Thr Thr Asp Ser Ser Thr Thr Thr Ala Tyr
65                  70                  75                  80

Met Glu Leu Lys Ser Leu Gln Phe Asp Thr Ala Val Tyr Tyr Cys
                85                  90                  95

Ala Arg Arg Asp Tyr Arg Tyr Asp Met Gly His Asp Tyr Trp Gly Gln
            100                 105                 110

Gly Thr Thr Val Thr Val Ser Ser
        115                 120

<210> SEQ ID NO 143
<211> LENGTH: 120
<212> TYPE: PRT
<213> ORGANISM: Artificial Sequence
<220> FEATURE:
<223> OTHER INFORMATION: Recombinant Sequence

<400> SEQUENCE: 143

Gln Val Gln Leu Val Gln Ser Gly Val Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Tyr Ile Tyr Trp Val Arg Gln Ala Pro Gly Gln Gly Leu Glu Trp Met
        35                  40                  45

Gly Gly Val Asn Pro Ser Asn Gly Gly Thr Asn Tyr Asn Gln Asn Tyr
    50                  55                  60

Lys Asn Arg Val Thr Leu Thr Thr Asp Ser Ser Thr Thr Thr Ala Tyr
65                  70                  75                  80

Met Glu Leu Lys Ser Leu Gln Phe Asp Thr Ala Val Tyr Tyr Cys
                85                  90                  95

Ala Arg Arg Asp Tyr Arg Tyr Asp Met Gly Phe Asp Tyr Trp Gly Gln
            100                 105                 110

Gly Thr Thr Val Thr Val Ser Ser
        115                 120

<210> SEQ ID NO 144
<211> LENGTH: 120
<212> TYPE: PRT
<213> ORGANISM: Artificial Sequence
<220> FEATURE:
```

<223> OTHER INFORMATION: Recombinant Sequence

<400> SEQUENCE: 144

Gln Val Gln Leu Val Gln Ser Gly Val Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Tyr Ile Tyr Trp Val Arg Gln Ala Pro Gly Gln Gly Leu Glu Trp Met
        35                  40                  45

Gly Gly Val Asn Pro Ser Asn Gly Gly Thr Asn Tyr Asn Gln Asn Tyr
    50                  55                  60

Lys Asn Arg Val Thr Leu Thr Thr Asp Ser Ser Thr Thr Thr Ala Tyr
65                  70                  75                  80

Met Glu Leu Lys Ser Leu Gln Phe Asp Asp Thr Ala Val Tyr Tyr Cys
                85                  90                  95

Ala Arg Arg Asp Tyr Arg Tyr Asp Met Gly Tyr Asp Tyr Trp Gly Gln
                100                 105                 110

Gly Thr Thr Val Thr Val Ser Ser
            115                 120

<210> SEQ ID NO 145
<211> LENGTH: 120
<212> TYPE: PRT
<213> ORGANISM: Artificial Sequence
<220> FEATURE:
<223> OTHER INFORMATION: Recombinant Sequence

<400> SEQUENCE: 145

Gln Val Gln Leu Val Gln Ser Gly Val Glu Val Lys Lys Pro Gly Ala
1               5                   10                  15

Ser Val Lys Val Ser Cys Lys Ala Ser Gly Tyr Thr Phe Thr Thr Tyr
            20                  25                  30

Tyr Ile Tyr Trp Val Arg Gln Ala Pro Gly Gln Gly Leu Glu Trp Met
        35                  40                  45

Gly Gly Val Asn Pro Ser Asn Gly Gly Thr Asn Tyr Asn Gln Asn Tyr
    50                  55                  60

Lys Asn Arg Val Thr Leu Thr Thr Asp Ser Ser Thr Thr Thr Ala Tyr
65                  70                  75                  80

Met Glu Leu Lys Ser Leu Gln Phe Asp Asp Thr Ala Val Tyr Tyr Cys
                85                  90                  95

Ala Arg Arg Asp Tyr Arg Tyr Asp Met Gly His Asp Tyr Trp Gly Gln
                100                 105                 110

Gly Thr Thr Val Thr Val Ser Ser
            115                 120

<210> SEQ ID NO 146
<211> LENGTH: 118
<212> TYPE: PRT
<213> ORGANISM: Artificial Sequence
<220> FEATURE:
<223> OTHER INFORMATION: Recombinant Sequence

<400> SEQUENCE: 146

Gln Val Gln Leu Val Glu Ser Gly Gly Gly Val Val Gln Pro Gly Arg
1               5                   10                  15

Ser Leu Arg Leu Asp Cys Lys Ala Ser Gly Ile Thr Phe Ser Asn Ser
            20                  25                  30

Gly Met His Trp Val Arg Gln Ala Pro Gly Lys Gly Leu Glu Trp Val

```
                    35                  40                  45
Ala Val Ile Trp Tyr Asp Gly Ser Lys Arg Tyr Tyr Ala Asp Ser Val
 50                  55                  60
Lys Gly Arg Phe Thr Ile Ser Arg Asp Asn Ser Lys Asn Thr Leu Phe
 65                  70                  75                  80
Leu Gln Met Asn Ser Leu Arg Ala Glu Asp Thr Ala Val Tyr Tyr Cys
                     85                  90                  95
Ala Thr Asn Ser Asp Phe Trp Gly Gln Gly Thr Leu Val Thr Val Ser
                    100                 105                 110
Ser Ala Ser Thr Lys Gly
             115

<210> SEQ ID NO 147
<211> LENGTH: 118
<212> TYPE: PRT
<213> ORGANISM: Artificial Sequence
<220> FEATURE:
<223> OTHER INFORMATION: Recombinant Sequence

<400> SEQUENCE: 147

Gln Val Gln Leu Val Glu Ser Gly Gly Gly Val Val Gln Pro Gly Arg
  1               5                  10                  15
Ser Leu Arg Leu Asp Cys Lys Ala Ser Gly Ile Thr Phe Ser Asn Ser
                 20                  25                  30
Gly Met His Trp Val Arg Gln Ala Pro Gly Lys Gly Leu Glu Trp Val
             35                  40                  45
Ala Val Ile Trp Tyr Asp Gly Ser Lys Arg Tyr Tyr Ala Asp Ser Val
 50                  55                  60
Lys Gly Arg Phe Thr Ile Ser Arg Asp Asn Ser Lys Asn Thr Leu Phe
 65                  70                  75                  80
Leu Gln Met Asn Ser Leu Arg Ala Glu Asp Thr Ala Val Tyr Tyr Cys
                     85                  90                  95
Ala Thr Asn Ser Asp His Trp Gly Gln Gly Thr Leu Val Thr Val Ser
                    100                 105                 110
Ser Ala Ser Thr Lys Gly
             115

<210> SEQ ID NO 148
<211> LENGTH: 118
<212> TYPE: PRT
<213> ORGANISM: Artificial Sequence
<220> FEATURE:
<223> OTHER INFORMATION: Recombinant Sequence

<400> SEQUENCE: 148

Gln Val Gln Leu Val Glu Ser Gly Gly Gly Val Val Gln Pro Gly Arg
  1               5                  10                  15
Ser Leu Arg Leu Asp Cys Lys Ala Ser Gly Ile Thr Phe Ser Asn Ser
                 20                  25                  30
Gly Met His Trp Val Arg Gln Ala Pro Gly Lys Gly Leu Glu Trp Val
             35                  40                  45
Ala Val Ile Trp Tyr Asp Gly Ser Lys Arg Tyr Tyr Ala Asp Ser Val
 50                  55                  60
Lys Gly Arg Phe Thr Ile Ser Arg Asp Asn Ser Lys Asn Thr Leu Phe
 65                  70                  75                  80
Leu Gln Met Asn Ser Leu Arg Ala Glu Asp Thr Ala Val Tyr Tyr Cys
                     85                  90                  95
```

Ala Thr Asn Ser Asp Tyr Trp Gly Gln Gly Thr Leu Val Thr Val Ser
            100                 105                 110

Ser Ala Ser Thr Lys Gly
        115

<210> SEQ ID NO 149
<211> LENGTH: 118
<212> TYPE: PRT
<213> ORGANISM: Artificial Sequence
<220> FEATURE:
<223> OTHER INFORMATION: Recombinant Sequence

<400> SEQUENCE: 149

Gln Val Gln Leu Val Glu Ser Gly Gly Gly Val Val Gln Pro Gly Arg
1               5                   10                  15

Ser Leu Arg Leu Asp Cys Lys Ala Ser Gly Ile Thr Phe Ser Asn Ser
            20                  25                  30

Gly Met His Trp Val Arg Gln Ala Pro Gly Lys Gly Leu Glu Trp Val
        35                  40                  45

Ala Val Ile Trp Tyr Asp Gly Ser Lys Arg Tyr Tyr Ala Asp Ser Val
    50                  55                  60

Lys Gly Arg Phe Thr Ile Ser Arg Asp Asn Ser Lys Asn Thr Leu Phe
65                  70                  75                  80

Leu Gln Met Asn Ser Leu Arg Ala Glu Asp Thr Ala Val Tyr Tyr Cys
                85                  90                  95

Ala Thr Asn Thr Asp Trp Trp Gly Gln Gly Thr Leu Val Thr Val Ser
            100                 105                 110

Ser Ala Ser Thr Lys Gly
        115

<210> SEQ ID NO 150
<211> LENGTH: 118
<212> TYPE: PRT
<213> ORGANISM: Artificial Sequence
<220> FEATURE:
<223> OTHER INFORMATION: Recombinant Sequence

<400> SEQUENCE: 150

Gln Val Gln Leu Val Glu Ser Gly Gly Gly Val Val Gln Pro Gly Arg
1               5                   10                  15

Ser Leu Arg Leu Asp Cys Lys Ala Ser Gly Ile Thr Phe Ser Asn Ser
            20                  25                  30

Gly Met His Trp Val Arg Gln Ala Pro Gly Lys Gly Leu Glu Trp Val
        35                  40                  45

Ala Val Ile Trp Tyr Asp Gly Ser Lys Arg Tyr Tyr Ala Asp Ser Val
    50                  55                  60

Lys Gly Arg Phe Thr Ile Ser Arg Asp Asn Ser Lys Asn Thr Leu Phe
65                  70                  75                  80

Leu Gln Met Asn Ser Leu Arg Ala Glu Asp Thr Ala Val Tyr Tyr Cys
                85                  90                  95

Ala Thr Asn Thr Asp Tyr Trp Gly Gln Gly Thr Leu Val Thr Val Ser
            100                 105                 110

Ser Ala Ser Thr Lys Gly
        115

<210> SEQ ID NO 151
<211> LENGTH: 111
<212> TYPE: PRT
<213> ORGANISM: Artificial Sequence
<220> FEATURE:
<223> OTHER INFORMATION: Recombinant Sequence

<400> SEQUENCE: 151

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Lys Gly Val Ser Thr Ser
            20                  25                  30

Gly Tyr Ser Tyr Leu His Trp Tyr Gln Gln Lys Pro Gly Gln Ala Pro
        35                  40                  45

Arg Leu Leu Ile Tyr Leu Ala Ser Tyr Leu Glu Ser Gly Val Pro Ala
    50                  55                  60

Arg Phe Ser Gly Ser Gly Ser Gly Thr Asp Phe Thr Leu Thr Ile Ser
65                  70                  75                  80

Ser Leu Glu Pro Glu Asp Phe Ala Val Tyr Tyr Cys Gln His Ser Arg
                85                  90                  95

Asp Leu Pro Leu Thr Phe Gly Gly Gly Thr Lys Val Glu Ile Lys
            100                 105                 110

<210> SEQ ID NO 152
<211> LENGTH: 107
<212> TYPE: PRT
<213> ORGANISM: Artificial Sequence
<220> FEATURE:
<223> OTHER INFORMATION: Recombinant Sequence

<400> SEQUENCE: 152

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln Gln Lys Pro Gly Gln Ala Pro Arg Leu Leu Ile
        35                  40                  45

Tyr Asp Ala Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Ser Ser Asn Trp Pro Arg
                85                  90                  95

Thr Phe Gly Gln Gly Thr Lys Val Glu Ile Lys
            100                 105

<210> SEQ ID NO 153
<211> LENGTH: 327
<212> TYPE: PRT
<213> ORGANISM: Artificial Sequence
<220> FEATURE:
<223> OTHER INFORMATION: Recombinant Sequence

<400> SEQUENCE: 153

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

```
Leu Ser Ser Val Val Thr Val Pro Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Pro Cys Pro Ala Pro
            100                 105                 110

Glu Phe Leu Gly Gly Pro Ser Val Phe Leu Phe Pro Pro Lys Pro Lys
            115                 120                 125

Asp Thr Leu Met Ile Ser Arg Thr Pro Glu Val Thr Cys Val Val Val
            130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
                180                 185                 190

Trp Leu Asn Gly Lys Glu Tyr Lys Cys Lys Val Ser Asn Lys Gly Leu
            195                 200                 205

Pro Ser Ser Ile Glu Lys Thr Ile Ser Lys Ala Lys Gly Gln Pro Arg
210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
            275                 280                 285

Arg Leu Thr Val Asp Lys Ser Arg Trp Gln Glu Gly Asn Val Phe Ser
            290                 295                 300

Cys Ser Val Met His Glu Ala Leu His Asn His Tyr Thr Gln Lys Ser
305                 310                 315                 320

Leu Ser Leu Ser Leu Gly Lys
                325

<210> SEQ ID NO 154
<211> LENGTH: 330
<212> TYPE: PRT
<213> ORGANISM: Artificial Sequence
<220> FEATURE:
<223> OTHER INFORMATION: Recombinant Sequence

<400> SEQUENCE: 154

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Leu Gly Thr Gln Thr
65                  70                  75                  80

Tyr Ile Cys Asn Val Asn His Lys Pro Ser Asn Thr Lys Val Asp Lys
                85                  90                  95
```

```
Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
            115                 120                 125

Lys Pro Lys Asp Thr Leu Met Ile Ser Arg Thr Pro Glu Val Thr Cys
            130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
            195                 200                 205

Lys Ala Leu Pro Ala Pro Ile Glu Lys Thr Ile Ser Lys Ala Lys Gly
            210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
            275                 280                 285

Leu Tyr Ser Lys Leu Thr Val Asp Lys Ser Arg Trp Gln Gln Gly Asn
290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 155
<211> LENGTH: 107
<212> TYPE: PRT
<213> ORGANISM: Artificial Sequence
<220> FEATURE:
<223> OTHER INFORMATION: Recombinant Sequence

<400> SEQUENCE: 155

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 156
<211> LENGTH: 987
```

```
<212> TYPE: PRT
<213> ORGANISM: Artificial Sequence
<220> FEATURE:
<223> OTHER INFORMATION: Recombinant Sequence

<400> SEQUENCE: 156

Gly Cys Cys Thr Cys Cys Ala Cys Cys Ala Ala Gly Gly Cys Cys
1               5                   10                  15

Cys Cys Thr Cys Cys Gly Thr Gly Thr Thr Cys Cys Cys Thr Cys Thr
            20                  25                  30

Gly Gly Cys Cys Cys Cys Thr Thr Gly Cys Thr Cys Cys Gly Gly
            35                  40                  45

Thr Cys Cys Ala Cys Cys Thr Cys Cys Gly Ala Gly Thr Cys Thr Ala
50                  55                  60

Cys Cys Gly Cys Gly Cys Thr Cys Thr Gly Gly Gly Cys Thr Gly
65                  70                  75                  80

Cys Cys Thr Gly Gly Thr Gly Ala Ala Ala Gly Ala Cys Thr Ala Cys
            85                  90                  95

Thr Thr Cys Cys Cys Cys Gly Ala Gly Cys Cys Cys Gly Thr Gly Ala
                100                 105                 110

Cys Cys Gly Thr Gly Thr Cys Cys Thr Gly Gly Ala Ala Cys Thr Cys
            115                 120                 125

Thr Gly Gly Cys Gly Cys Cys Cys Thr Gly Ala Cys Cys Ala Gly Cys
130                 135                 140

Gly Gly Cys Gly Thr Gly Cys Ala Cys Ala Cys Cys Thr Thr Cys Cys
145                 150                 155                 160

Cys Thr Gly Cys Cys Gly Thr Gly Cys Thr Gly Cys Ala Gly Thr Cys
            165                 170                 175

Cys Thr Cys Cys Gly Gly Cys Cys Thr Gly Thr Ala Cys Thr Cys Cys
            180                 185                 190

Cys Thr Gly Thr Cys Cys Thr Cys Cys Gly Thr Gly Gly Thr Gly Ala
            195                 200                 205

Cys Cys Gly Thr Gly Cys Cys Cys Thr Cys Cys Thr Cys Cys Ala Gly
            210                 215                 220

Cys Cys Thr Gly Gly Gly Cys Ala Cys Cys Ala Ala Gly Ala Cys Cys
225                 230                 235                 240

Thr Ala Cys Ala Cys Cys Thr Gly Thr Ala Ala Cys Gly Thr Gly Gly
            245                 250                 255

Ala Cys Cys Ala Cys Ala Ala Gly Cys Cys Cys Thr Cys Cys Ala Ala
            260                 265                 270

Cys Ala Cys Cys Ala Ala Gly Gly Thr Gly Gly Ala Cys Ala Ala Gly
            275                 280                 285

Cys Gly Gly Gly Thr Gly Gly Ala Ala Thr Cys Thr Ala Ala Gly Thr
            290                 295                 300

Ala Cys Gly Gly Cys Cys Cys Thr Cys Cys Cys Thr Gly Cys Cys Cys
305                 310                 315                 320

Cys Cys Cys Cys Thr Gly Cys Cys Cys Thr Gly Cys Cys Cys Cys Thr
                325                 330                 335

Gly Ala Ala Thr Thr Thr Cys Thr Gly Gly Gly Cys Gly Gly Ala Cys
            340                 345                 350

Cys Thr Thr Cys Cys Gly Thr Gly Thr Thr Cys Cys Thr Gly Thr Thr
            355                 360                 365

Cys Cys Cys Cys Cys Cys Ala Ala Ala Gly Cys Cys Cys Ala Ala Gly
            370                 375                 380
```

-continued

```
Gly Ala Cys Ala Cys Cys Thr Gly Ala Thr Gly Ala Thr Cys Thr
385                 390                 395                 400

Cys Cys Cys Gly Gly Ala Cys Cys Cys Cys Gly Ala Ala Gly Thr
                405                 410                 415

Gly Ala Cys Cys Thr Gly Cys Gly Thr Gly Thr Gly Gly Thr Gly
                420                 425                 430

Gly Ala Cys Gly Thr Gly Thr Cys Cys Ala Gly Gly Ala Ala Gly
                435                 440                 445

Ala Thr Cys Cys Cys Gly Ala Gly Gly Thr Gly Cys Ala Gly Thr Thr
450                 455                 460

Cys Ala Ala Thr Thr Gly Gly Thr Ala Cys Gly Thr Gly Gly Ala Cys
465                 470                 475                 480

Gly Gly Cys Gly Thr Gly Gly Ala Ala Gly Thr Gly Cys Ala Cys Ala
                485                 490                 495

Ala Cys Gly Cys Cys Ala Ala Gly Ala Cys Ala Ala Gly Cys Cys
                500                 505                 510

Cys Ala Gly Ala Gly Ala Gly Gly Ala Ala Cys Ala Gly Thr Thr Cys
                515                 520                 525

Ala Ala Cys Thr Cys Cys Ala Cys Cys Thr Ala Cys Cys Gly Gly Gly
530                 535                 540

Thr Gly Gly Thr Gly Thr Cys Thr Gly Thr Gly Cys Thr Gly Ala Cys
545                 550                 555                 560

Cys Gly Thr Gly Cys Thr Gly Cys Ala Cys Ala Gly Gly Ala Cys
                565                 570                 575

Thr Gly Gly Cys Thr Gly Ala Ala Cys Gly Gly Cys Ala Ala Ala Gly
                580                 585                 590

Ala Gly Thr Ala Cys Ala Ala Gly Thr Gly Cys Ala Ala Gly Gly Thr
                595                 600                 605

Gly Thr Cys Cys Ala Ala Cys Ala Ala Gly Gly Cys Cys Thr Gly
                610                 615                 620

Cys Cys Cys Thr Cys Cys Ala Gly Cys Ala Thr Cys Gly Ala Ala Ala
625                 630                 635                 640

Ala Gly Ala Cys Cys Ala Thr Cys Thr Cys Cys Ala Ala Gly Gly Cys
                645                 650                 655

Cys Ala Ala Gly Gly Gly Cys Cys Ala Gly Cys Cys Cys Cys Gly Cys
                660                 665                 670

Gly Ala Gly Cys Cys Cys Cys Ala Gly Gly Thr Gly Thr Ala Cys Ala
                675                 680                 685

Cys Cys Cys Thr Gly Cys Cys Cys Cys Cys Thr Ala Gly Cys Cys Ala
                690                 695                 700

Gly Gly Ala Ala Gly Ala Gly Ala Thr Gly Ala Cys Cys Ala Ala Gly
705                 710                 715                 720

Ala Ala Cys Cys Ala Gly Gly Thr Gly Thr Cys Cys Thr Gly Ala
                725                 730                 735

Cys Cys Thr Gly Thr Cys Thr Gly Gly Thr Gly Ala Ala Ala Gly Gly
                740                 745                 750

Cys Thr Thr Cys Thr Ala Cys Cys Cys Thr Cys Cys Gly Ala Thr
                755                 760                 765

Ala Thr Cys Gly Cys Cys Gly Thr Gly Gly Ala Ala Thr Gly Gly Gly
                770                 775                 780

Ala Gly Thr Cys Cys Ala Ala Cys Gly Gly Cys Cys Ala Gly Cys Cys
                785                 790                 795                 800

Cys Gly Ala Gly Ala Ala Cys Ala Ala Cys Thr Ala Cys Ala Ala Gly
```

Ala Cys Cys Ala Cys Cys Cys Cys Cys Cys Thr Gly Thr Gly Cys
            820                 825                 830

Thr Gly Gly Ala Cys Thr Cys Cys Gly Ala Cys Gly Gly Cys Thr Cys
            835                 840                 845

Cys Thr Thr Cys Thr Thr Cys Cys Thr Gly Thr Ala Cys Thr Cys Thr
            850                 855                 860

Cys Gly Gly Cys Thr Gly Ala Cys Cys Gly Thr Gly Gly Ala Cys Ala
865                 870                 875                 880

Ala Gly Thr Cys Cys Gly Gly Thr Gly Gly Cys Ala Gly Gly Ala
            885                 890                 895

Ala Gly Gly Cys Ala Ala Cys Gly Thr Gly Thr Thr Cys Thr Cys Cys
            900                 905                 910

Thr Gly Cys Thr Cys Cys Gly Thr Gly Ala Thr Gly Cys Ala Cys Gly
            915                 920                 925

Ala Gly Gly Cys Cys Thr Gly Cys Ala Cys Ala Ala Cys Cys Ala
            930                 935                 940

Cys Thr Ala Cys Ala Cys Cys Cys Ala Gly Ala Ala Gly Thr Cys Cys
945                 950                 955                 960

Cys Thr Gly Thr Cys Cys Cys Thr Gly Ala Gly Cys Cys Thr Gly Gly
            965                 970                 975

Gly Thr Ala Ala Gly Thr Gly Ala Thr Gly Ala
            980                 985

<210> SEQ ID NO 157
<211> LENGTH: 993
<212> TYPE: PRT
<213> ORGANISM: Artificial Sequence
<220> FEATURE:
<223> OTHER INFORMATION: Recombinant Sequence

<400> SEQUENCE: 157

Gly Cys Thr Ala Gly Cys Ala Cys Cys Ala Ala Gly Gly Gly Cys Cys
1               5                   10                  15

Cys Ala Thr Cys Gly Gly Thr Cys Thr Thr Cys Cys Cys Cys Cys Thr
            20                  25                  30

Gly Gly Cys Ala Cys Cys Cys Thr Cys Cys Thr Cys Cys Ala Ala Gly
            35                  40                  45

Ala Gly Cys Ala Cys Cys Thr Cys Thr Gly Gly Gly Gly Gly Cys Ala
            50                  55                  60

Cys Ala Gly Cys Gly Gly Cys Cys Cys Thr Gly Gly Gly Cys Thr Gly
65                  70                  75                  80

Cys Cys Thr Gly Gly Thr Cys Ala Ala Gly Gly Ala Cys Thr Ala Cys
            85                  90                  95

Thr Thr Cys Cys Cys Cys Gly Ala Ala Cys Cys Gly Gly Thr Gly Ala
            100                 105                 110

Cys Gly Gly Thr Gly Thr Cys Gly Thr Gly Gly Ala Ala Cys Thr Cys
            115                 120                 125

Ala Gly Gly Cys Gly Cys Cys Cys Thr Gly Ala Cys Cys Ala Gly Cys
            130                 135                 140

Gly Gly Cys Gly Thr Gly Cys Ala Cys Ala Cys Cys Thr Thr Cys Cys
145                 150                 155                 160

Cys Gly Gly Cys Thr Gly Thr Cys Cys Thr Ala Cys Ala Gly Thr Cys
            165                 170                 175

Cys Thr Cys Ala Gly Gly Ala Cys Thr Cys Thr Ala Cys Thr Cys Cys

```
                180                 185                 190
Cys Thr Cys Ala Gly Cys Ala Gly Cys Gly Thr Gly Thr Gly Ala
            195                 200                 205
Cys Cys Gly Thr Gly Cys Cys Thr Cys Cys Ala Gly Cys Ala Gly
            210                 215                 220
Cys Thr Thr Gly Gly Gly Cys Ala Cys Cys Ala Gly Ala Cys Cys
225                 230                 235                 240
Thr Ala Cys Ala Thr Cys Thr Gly Cys Ala Ala Cys Gly Thr Gly
            245                 250                 255
Ala Thr Cys Ala Cys Ala Ala Gly Cys Cys Ala Gly Cys Ala Ala
            260                 265                 270
Cys Ala Cys Cys Ala Ala Gly Gly Thr Gly Ala Cys Ala Ala Gly
            275                 280                 285
Ala Ala Ala Gly Thr Thr Gly Ala Gly Cys Cys Ala Ala Ala Thr
            290                 295                 300
Cys Thr Thr Gly Thr Gly Ala Cys Ala Ala Ala Cys Thr Cys Ala
305                 310                 315                 320
Cys Ala Cys Ala Thr Gly Cys Cys Cys Ala Cys Cys Gly Thr Gly
            325                 330                 335
Cys Cys Ala Gly Cys Ala Cys Cys Thr Gly Ala Ala Cys Thr Cys
            340                 345                 350
Thr Gly Gly Gly Gly Gly Ala Cys Cys Gly Thr Cys Ala Gly Thr
            355                 360                 365
Cys Thr Thr Cys Cys Thr Cys Thr Thr Cys Cys Cys Cys Cys Ala
            370                 375                 380
Ala Ala Ala Cys Cys Cys Ala Ala Gly Gly Ala Cys Ala Cys Cys Cys
385                 390                 395                 400
Thr Cys Ala Thr Gly Ala Thr Cys Thr Cys Cys Cys Gly Gly Ala Cys
            405                 410                 415
Cys Cys Cys Thr Gly Ala Gly Gly Thr Cys Ala Cys Ala Thr Gly Cys
            420                 425                 430
Gly Thr Gly Gly Thr Gly Gly Thr Gly Gly Ala Cys Gly Thr Gly Ala
            435                 440                 445
Gly Cys Cys Ala Cys Gly Ala Ala Gly Ala Cys Cys Cys Thr Gly Ala
            450                 455                 460
Gly Gly Thr Cys Ala Ala Gly Thr Thr Cys Ala Ala Cys Thr Gly Gly
465                 470                 475                 480
Thr Ala Cys Gly Thr Gly Gly Ala Cys Gly Gly Cys Gly Thr Gly Gly
            485                 490                 495
Ala Gly Gly Thr Gly Cys Ala Thr Ala Ala Thr Gly Cys Cys Ala Ala
            500                 505                 510
Gly Ala Cys Ala Ala Ala Gly Cys Cys Gly Cys Gly Gly Gly Ala Gly
            515                 520                 525
Gly Ala Gly Cys Ala Gly Thr Ala Cys Ala Ala Cys Ala Gly Cys Ala
            530                 535                 540
Cys Gly Thr Ala Cys Cys Gly Thr Gly Thr Gly Gly Thr Cys Ala Gly
545                 550                 555                 560
Cys Gly Thr Cys Cys Thr Cys Ala Cys Cys Gly Thr Cys Cys Thr Gly
            565                 570                 575
Cys Ala Cys Cys Ala Gly Gly Ala Cys Thr Gly Gly Cys Thr Gly Ala
            580                 585                 590
Ala Thr Gly Gly Cys Ala Ala Gly Gly Ala Gly Thr Ala Cys Ala Ala
            595                 600                 605
```

-continued

Gly Thr Gly Cys Ala Gly Gly Thr Cys Thr Cys Cys Ala Ala Cys
            610                 615                 620

Ala Ala Ala Gly Cys Cys Thr Cys Cys Ala Gly Cys Cys Cys
625                 630                 635                 640

Cys Cys Ala Thr Cys Gly Ala Gly Ala Ala Ala Cys Cys Ala Thr
                645                 650                 655

Cys Thr Cys Cys Ala Ala Gly Cys Cys Ala Ala Gly Gly Gly
            660                 665                 670

Cys Ala Gly Cys Cys Cys Gly Ala Gly Ala Cys Cys Ala Cys
        675                 680                 685

Ala Gly Gly Thr Gly Thr Ala Cys Ala Cys Cys Thr Gly Cys Cys
690                 695                 700

Cys Cys Cys Ala Thr Cys Cys Gly Gly Ala Gly Gly Ala Gly
705                 710                 715                 720

Ala Thr Gly Ala Cys Cys Ala Gly Ala Ala Cys Cys Ala Gly Gly
                725                 730                 735

Thr Cys Ala Gly Cys Cys Thr Gly Ala Cys Cys Thr Gly Cys Cys
            740                 745                 750

Gly Gly Thr Cys Ala Ala Ala Gly Gly Cys Thr Thr Cys Thr Ala Thr
            755                 760                 765

Cys Cys Cys Ala Gly Cys Gly Ala Cys Ala Thr Cys Gly Cys Cys Gly
770                 775                 780

Thr Gly Gly Ala Gly Thr Gly Gly Gly Ala Gly Ala Gly Cys Ala Ala
785                 790                 795                 800

Thr Gly Gly Gly Cys Ala Gly Cys Cys Gly Gly Ala Gly Ala Ala Cys
            805                 810                 815

Ala Ala Cys Thr Ala Cys Ala Ala Gly Ala Cys Cys Ala Cys Gly Cys
            820                 825                 830

Cys Thr Cys Cys Cys Gly Thr Gly Cys Thr Gly Gly Ala Cys Thr Cys
        835                 840                 845

Cys Gly Ala Cys Gly Gly Cys Thr Cys Cys Thr Thr Cys Thr Thr Cys
850                 855                 860

Cys Thr Cys Thr Ala Cys Ala Gly Cys Ala Ala Gly Cys Thr Cys Ala
865                 870                 875                 880

Cys Cys Gly Thr Gly Gly Ala Cys Ala Ala Gly Ala Gly Cys Ala Gly
            885                 890                 895

Gly Thr Gly Gly Cys Ala Gly Cys Ala Gly Gly Gly Ala Ala Cys
            900                 905                 910

Gly Thr Cys Thr Thr Cys Thr Cys Ala Thr Gly Cys Thr Cys Cys Gly
        915                 920                 925

Thr Gly Ala Thr Gly Cys Ala Thr Gly Ala Gly Gly Cys Thr Cys Thr
930                 935                 940

Gly Cys Ala Cys Ala Ala Cys Cys Ala Cys Thr Ala Cys Ala Cys Gly
945                 950                 955                 960

Cys Ala Gly Ala Ala Gly Ala Gly Cys Cys Thr Cys Thr Cys Cys Cys
            965                 970                 975

Thr Gly Thr Cys Thr Cys Cys Gly Gly Gly Thr Ala Ala Ala Thr Gly
            980                 985                 990

Ala

<210> SEQ ID NO 158
<211> LENGTH: 360
<212> TYPE: PRT

<213> ORGANISM: Artificial Sequence
<220> FEATURE:
<223> OTHER INFORMATION: Recombinant Sequence

<400> SEQUENCE: 158

```
Cys Ala Gly Gly Thr Gly Cys Ala Gly Cys Thr Gly Thr Gly Cys
1               5                   10                  15

Ala Gly Thr Cys Cys Gly Gly Cys Gly Thr Gly Gly Ala Ala Gly Thr
                20                  25                  30

Gly Ala Ala Gly Ala Ala Cys Cys Thr Gly Cys Gly Cys Cys
            35                  40                  45

Thr Cys Cys Gly Thr Gly Ala Ala Gly Gly Thr Gly Thr Cys Cys Thr
            50                  55                  60

Gly Cys Ala Ala Gly Gly Cys Cys Thr Cys Cys Gly Gly Cys Thr Ala
65                  70                  75                  80

Cys Ala Cys Cys Thr Thr Cys Ala Cys Cys Ala Cys Cys Thr Ala Cys
                85                  90                  95

Thr Ala Cys Ala Thr Cys Thr Ala Cys Thr Gly Gly Gly Thr Cys Cys
                100                 105                 110

Gly Ala Cys Ala Gly Gly Cys Cys Cys Ala Gly Gly Cys Cys Ala
            115                 120                 125

Gly Gly Gly Cys Cys Thr Gly Gly Ala Ala Thr Gly Gly Ala Thr Gly
            130                 135                 140

Gly Gly Cys Gly Gly Cys Gly Thr Gly Ala Ala Cys Cys Cys Thr Thr
145                 150                 155                 160

Cys Cys Ala Ala Cys Gly Gly Cys Gly Gly Cys Ala Cys Cys Ala Ala
                165                 170                 175

Cys Thr Ala Cys Ala Ala Cys Gly Ala Gly Ala Ala Cys Thr Ala Cys
                180                 185                 190

Ala Ala Gly Ala Ala Cys Ala Gly Ala Thr Gly Ala Cys Cys Cys
            195                 200                 205

Thr Gly Ala Cys Cys Ala Cys Cys Gly Ala Cys Thr Cys Cys Thr Cys
210                 215                 220

Cys Ala Cys Cys Ala Cys Cys Ala Cys Cys Gly Cys Cys Thr Ala Cys
225                 230                 235                 240

Ala Thr Gly Gly Ala Ala Cys Thr Gly Ala Ala Gly Thr Cys Cys Cys
                245                 250                 255

Thr Gly Cys Ala Gly Thr Th

<213> ORGANISM: Artificial Sequence
<220> FEATURE:
<223> OTHER INFORMATION: Recombinant Sequence

<400> SEQUENCE: 159

```
Cys Ala Gly Gly Thr Thr Cys Ala Ala Thr Thr Gly Gly Thr Gly Cys
1               5                   10                  15

Ala Gly Thr Cys Cys Gly Gly Cys Gly Thr Gly Gly Ala Ala Gly Thr
                20                  25                  30

Gly Ala Ala Gly Ala Ala Cys Cys Thr Gly Cys Gly Cys Thr
            35                  40                  45

Thr Cys Thr Gly Thr Gly Ala Ala Gly Gly Thr Gly Thr Cys Cys Thr
    50                  55                  60

Gly Cys Ala Ala Gly Gly Cys Cys Thr Cys Thr Gly Gly Cys Thr Ala
65                  70                  75                  80

Cys Ala Cys Cys Thr Thr Thr Ala Cys Cys Ala Cys Cys Thr Ala Cys
                85                  90                  95

Thr Ala Cys Ala Thr Cys Thr Ala Cys Thr Gly Gly Gly Thr Cys Cys
                100                 105                 110

Gly Ala Cys Ala Gly Gly Cys Thr Cys Cys Thr Gly Gly Ala Cys Ala
            115                 120                 125

Gly Gly Gly Ala Cys Thr Thr Gly Ala Ala Thr Gly Gly Ala Thr Gly
    130                 135                 140

Gly Gly Cys Gly Gly Cys Gly Thr Gly Ala Ala Cys Cys Cys Thr Thr
145                 150                 155                 160

Cys Thr Ala Ala Cys Gly Gly Cys Gly Gly Cys Ala Cys Cys Ala Ala
            165                 170                 175

Cys Thr Ala Cys Ala Ala Cys Gly Ala Gly Ala Ala Cys Thr Ala Cys
            180                 185                 190

Ala Ala Gly Ala Ala Cys Ala Gly Ala Gly Thr Gly Ala Cys Cys Cys
        195                 200                 205

Thr Gly Ala Cys Cys Ala Cys Cys Gly

<213> ORGANISM: Artificial Sequence
<220> FEATURE:
<223> OTHER INFORMATION: Recombinant Sequence

<400> SEQUENCE: 160

Cys Ala Gly Gly Thr Gly Cys Ala Gly Cys Thr Gly Thr Gly Cys
1               5                   10                  15

Ala Gly Thr Cys Cys Gly Gly Cys Gly Thr Gly Gly Ala Ala Gly Thr
            20                  25                  30

Gly Ala Ala Gly Ala Ala Cys Cys Thr Gly Cys Gly Cys Cys
            35                  40                  45

Thr Cys Cys Gly Thr Gly Ala Ala Gly Gly Thr Gly Thr Cys Cys Thr
50                              55                  60

Gly Cys Ala Ala Gly Gly Cys Cys Thr Cys Gly Gly Cys Thr Ala
65                  70                  75                  80

Cys Ala Cys Cys Thr Thr Cys Ala Cys Cys Ala Cys Thr Ala Cys
                85                  90                  95

Thr Ala Cys Ala Thr Cys Thr Ala Cys Thr Gly Gly Thr Cys Cys
                100                 105                 110

Gly Ala Cys Ala Gly Gly Cys Cys Cys Ala Gly Gly Cys Cys Ala
                115                 120                 125

Gly Gly Gly Cys Cys Thr Gly Gly Ala Ala Thr Gly Gly Ala Thr Gly
130                 135                 140

Gly Gly Cys Gly Gly Cys Gly Thr Gly Ala Ala Cys Cys Thr Thr
145                 150                 155                 160

Cys Cys Ala Ala Cys Gly Gly Cys Gly Gly Cys Ala Cys Cys Ala Ala
                165                 170                 175

Cys Thr Ala Cys Ala Ala Cys Gly Ala Gly Ala Ala Cys Thr Thr Cys
                180                 185                 190

Ala Ala Gly Ala Ala Cys Ala Gly Ala Gly Thr Gly Ala Cys Cys Cys
                195                 200                 205

Thr Gly Ala Cys Cys Ala Cys Cys Gly Ala Cys Thr Cys Cys
                210                 215                 220

Cys Ala Cys Cys Ala Cys Cys Ala Cys Cys Gly Cys Cys Thr Ala Cys
225                 230                 235                 240

Ala Thr Gly Gly Ala Ala Cys Thr Gly Ala Ala Gly Thr Cys Cys Cys
                245                 250                 255

Thr Gly Cys Ala Gly Thr Thr Cys Gly Ala Cys Ala Cys Ala Cys
                260                 265                 270

Cys Gly Cys Cys Gly Thr Gly Thr Ala Cys Thr Ala Cys Thr Gly Cys
                275                 280                 285

Gly Cys Cys Ala Gly Ala Cys Gly Gly Ala Cys Thr Ala Cys Ala
                290                 295                 300

Gly Ala Thr Ala Cys Gly Ala Cys Ala Thr Gly Gly Gly Cys Cys Ala
305                 310                 315                 320

Thr Gly Ala Cys Thr Ala Cys Thr Gly Gly Gly Gly Cys Cys Ala Gly
                325                 330                 335

Gly Gly Cys Ala Cys Cys Ala Cys Cys Gly Thr Gly Ala Cys Cys Gly
                340                 345                 350

Thr Gly Thr Cys Cys Thr Cys Thr Gly Cys Cys Thr Cys Cys Ala Cys
                355                 360                 365

Cys Ala Ala Gly Gly Gly Cys Cys Cys
                370                 375

```
<210> SEQ ID NO 161
<211> LENGTH: 360
<212> TYPE: PRT
<213> ORGANISM: Artificial Sequence
<220> FEATURE:
<223> OTHER INFORMATION: Recombinant Sequence

<400> SEQUENCE: 161
```

Cys Ala Gly Gly Thr Cys Ala Ala Thr Thr Gly Thr Gly Cys
1               5                   10                  15

Ala Gly Thr Cys Cys Gly Gly Cys Gly Thr Gly Gly Ala Gly Thr
            20                  25                  30

Gly Ala Ala Gly Ala Ala Ala Cys Cys Thr Gly Cys Gly Cys Thr
            35                  40                  45

Thr Cys Thr Gly Thr Gly Ala Ala Gly Gly Thr Gly Thr Cys Cys Thr
50                  55                  60

Gly Cys Ala Ala Gly Gly Cys Cys Thr Cys Thr Gly Gly Cys Thr Ala
65                  70                  75                  80

Cys Ala Cys Cys Thr Thr Thr Ala Cys Cys Ala Cys Cys Thr Ala Cys
                85                  90                  95

Thr Ala Cys Ala Thr Cys Thr Ala Cys Thr Gly Gly Gly Thr Cys Cys
                100                 105                 110

Gly Ala Cys Ala Gly Gly Cys Thr Cys Cys Thr Gly Gly Ala Cys Ala
                115                 120                 125

Gly Gly Gly Ala Cys Thr Thr Gly Ala Ala Thr Gly Gly Ala Thr Gly
                130                 135                 140

Gly Gly Cys Gly Gly Cys Gly Thr Gly Ala Ala Cys Cys Cys Thr Thr
145                 150                 155                 160

Cys Cys Ala Ala Cys Thr Cys Thr Gly Gly Cys Ala Cys Cys Ala Ala
                165                 170                 175

Cys Thr Ala Cys Ala Ala Cys Gly Ala Gly Ala Ala Cys Thr Ala Cys
                180                 185                 190

Ala Ala Gly Ala Ala Cys Ala Gly Ala Gly Thr Gly Ala Cys Cys Cys
                195                 200                 205

Thr Gly Ala Cys Cys Ala Cys Cys Gly Ala Cys Thr Cys Cys Thr Cys
                210                 215                 220

Thr Ala Cys Cys Ala Cys Cys Ala Cys Cys Gly Cys Cys Thr Ala Cys
225                 230                 235                 240

Ala Thr Gly Gly Ala Ala Cys Thr Gly Ala Gly Thr Cys Cys Cys
                245                 250                 255

Thr Gly Cys Ala Gly Thr Thr Cys Gly Ala Cys Gly Ala Cys Ala Cys
                260                 265                 270

Cys Gly Cys Cys Gly Thr Gly Thr Ala Cys Thr Ala Cys Thr Gly Cys
                275                 280                 285

Gly Cys Cys Ala Gly Ala Ala Gly Ala Gly Cys Thr Ala Cys Ala
                290                 295                 300

Gly Ala Thr Ala Cys Gly Ala Cys Ala Thr Gly Gly Gly Cys Thr Thr
305                 310                 315                 320

Cys Gly Ala Cys Thr Ala Cys Thr Gly Gly Gly Gly Cys Cys Ala Gly
                325                 330                 335

Gly Gly Cys Ala Cys Ala Ala Cys Ala Gly Thr Gly Ala Cys Cys Gly
                340                 345                 350

Thr Gly Thr Cys Cys Thr Cys Thr
                355                 360

<210> SEQ ID NO 162
<211> LENGTH: 360
<212> TYPE: PRT
<213> ORGANISM: Artificial Sequence
<220> FEATURE:
<223> OTHER INFORMATION: Recombinant Sequence

<400> SEQUENCE: 162

```
Cys Ala Gly Gly Thr Cys Ala Ala Thr Thr Gly Thr Gly Cys
1               5                   10                  15

Ala Gly Thr Cys Cys Gly Gly Cys Gly Thr Gly Ala Ala Gly Thr
                20                  25                  30

Gly Ala Ala Gly Ala Ala Ala Cys Cys Thr Gly Cys Gly Cys Thr
            35                  40                  45

Thr Cys Thr Gly Thr Gly Ala Ala Gly Thr Gly Thr Cys Cys Thr
        50                  55                  60

Gly Cys Ala Ala Gly Gly Cys Cys Thr Cys Thr Gly Gly Cys Thr Ala
65                  70                  75                  80

Cys Ala Cys Cys Thr Thr Thr Ala Cys Cys Ala Cys Cys Thr Ala Cys
                85                  90                  95

Thr Ala Cys Ala Thr Cys Thr Ala Cys Thr Gly Gly Gly Thr Cys Cys
                100                 105                 110

Gly Ala Cys Ala Gly Gly Cys Thr Cys Cys Thr Gly Gly Ala Cys Ala
            115                 120                 125

Gly Gly Gly Ala Cys Thr Thr Gly Ala Ala Thr Gly Gly Ala Thr Gly
            130                 135                 140

Gly Gly Cys Gly Gly Cys Gly Thr Gly Ala Ala Cys Cys Thr Gly Thr
145                 150                 155                 160

Cys Thr Ala Ala Cys Gly Gly Cys Gly Gly Cys Ala Cys Cys Ala Ala
                165                 170                 175

Cys Thr Ala Cys Ala Ala Cys Ala Gly Ala Ala Cys Thr Ala Cys
                180                 185                 190

Ala Ala Gly Ala Ala Cys Ala Gly Ala Gly Thr Gly Ala Cys Cys Cys
            195                 200                 205

Thr Gly Ala Cys Cys Ala Cys Cys Gly Ala Cys Thr Cys Cys Thr Cys
        210                 215                 220

Thr Ala Cys

<210> SEQ ID NO 163
<211> LENGTH: 666
<212> TYPE: PRT
<213> ORGANISM: Artificial Sequence
<220> FEATURE:
<223> OTHER INFORMATION: Recombinant Sequence

<400> SEQUENCE: 163

```
Gly Ala Gly Ala Thr Cys Gly Thr Gly Cys Thr Gly Ala Cys Cys Cys
1               5                   10                  15

Ala Gly Thr Cys Cys Cys Cys Cys Gly Cys Cys Ala Cys Cys Cys Thr
            20                  25                  30

Gly Thr Cys Thr Cys Thr Gly Thr Cys Thr Cys Cys Cys Gly Gly Cys
        35                  40                  45

Gly Ala Gly Ala Gly Ala Gly Cys Cys Ala Cys Cys Cys Thr Gly Ala
    50                  55                  60

Gly Cys Thr Gly Cys Ala Gly Ala Gly Cys Cys Thr Cys Cys Ala Ala
65                  70                  75                  80

Gly Gly Gly Cys Gly Thr Gly Thr Cys Cys Ala Cys Cys Thr Cys Cys
                85                  90                  95

Gly Gly Cys Thr Ala Cys Thr Cys Cys Thr Ala Cys Cys Thr Gly Cys
            100                 105                 110

Ala Cys Thr Gly Gly Thr Ala Thr Cys Ala Gly Cys Ala Gly Ala Ala
        115                 120                 125

Gly Cys Cys Cys Gly Gly Cys Cys Ala Gly Gly Cys Cys Cys Cys Thr
    130                 135                 140

Cys Gly Gly Cys Thr Gly Cys Thr Gly Ala Thr Cys Thr Ala Cys Cys
145                 150                 155                 160

Thr Gly Gly Cys Cys Thr Cys Cys Thr Ala Cys Cys Thr Gly Gly Ala
                165                 170                 175

Ala Thr Cys Cys Gly Gly Cys Gly Thr Gly Cys Cys Cys Gly Cys Cys
            180                 185                 190

Ala Gly Ala Thr Thr Cys Thr Cys Cys Gly Gly Cys Thr Cys Thr Gly
        195                 200                 205

Gly Cys Thr Cys Thr Gly Gly Cys Ala Cys Cys Gly Ala Cys Thr Thr
    210                 215                 220

Cys Ala Cys Cys Cys Thr Gly Ala Cys Cys Ala Thr Cys Thr Cys Cys
225                 230                 235                 240

Ala Gly Cys Cys Thr Gly Gly Ala Ala Cys Cys Cys Gly Ala Gly Gly
                245                 250                 255

Ala Cys Thr Thr Cys Gly Cys Cys Gly Thr Gly Thr Ala Cys Thr Ala
            260                 265                 270

Cys Thr Gly Cys Cys Ala Gly Cys Ala Cys Thr Cys Cys Cys Gly Gly
        275                 280                 285

Gly Ala Cys Cys Thr Gly Cys Cys Cys Cys Thr Gly Ala Cys Cys Thr
    290                 295                 300

Thr Thr Gly Gly Cys Gly Gly Ala Gly Gly Cys Ala Cys Cys Ala Ala
305                 310                 315                 320

Gly Gly Thr Gly Gly Ala Ala Ala Thr Cys Ala Ala Gly Cys Gly Gly
                325                 330                 335

Ala Cys Cys Gly Thr Gly Gly Cys Cys Gly Cys Thr Cys Cys Cys Thr
            340                 345                 350

Cys Cys Gly Thr Gly Thr Thr Cys Ala Thr Cys Thr Thr Cys Cys Cys
        355                 360                 365

Ala Cys Cys Cys Thr Cys Cys Gly Ala Cys Gly Ala Gly Cys Ala Gly
```

```
                    370             375             380
Cys Thr Gly Ala Ala Gly Thr Cys Gly Gly Cys Ala Cys Gly
385                     390             395             400

Cys Cys Thr Cys Cys Gly Thr Cys Gly Thr Gly Thr Cys Thr
                405             410             415

Gly Cys Thr Gly Ala Ala Cys Ala Ala Cys Thr Thr Cys Thr Ala Cys
            420             425             430

Cys Cys Cys Cys Gly Cys Gly Ala Gly Cys Ala Ala Gly Gly
        435             440             445

Thr Gly Cys Ala Gly Thr Gly Ala Ala Gly Gly Thr Gly Gly Ala
        450             455             460

Cys Ala Ala Thr Gly Cys Cys Thr Gly Cys Ala Gly Thr Cys Cys
465             470             475             480

Gly Gly Cys Ala Ala Cys Thr Cys Cys Ala Gly Gly Ala Ala Thr
            485             490             495

Cys Cys Gly Thr Cys Ala Cys Cys Gly Ala Gly Cys Ala Gly Gly Ala
            500             505             510

Cys Thr Cys Cys Ala Ala Gly Gly Ala Cys Ala Gly Cys Ala Cys Cys
            515             520             525

Thr Ala Cys Thr Cys Cys Cys Thr Gly Thr Cys Cys Thr Cys Cys Ala
530             535             540

Cys Cys Cys Thr Gly Ala Cys Cys Thr Gly Thr Cys Cys Ala Ala
545             550             555             560

Gly Gly Cys Cys Gly Ala Cys Thr Ala Cys Gly Ala Gly Ala Ala Gly
            565             570             575

Cys Ala Cys Ala Ala Gly Gly Thr Gly Thr Ala Cys Gly Cys Cys Thr
            580             585             590

Gly Cys Gly Ala Ala Gly Thr Gly Ala Cys Cys Ala Cys Cys Ala
            595             600             605

Gly Gly Gly Cys Cys Thr Gly Thr Cys Cys Ala Gly Cys Cys Cys
            610             615             620

Gly Thr Gly Ala Cys Cys Ala Ala Gly Thr Cys Cys Thr Thr Cys Ala
625             630             635             640

Ala Cys Cys Gly Gly Gly Gly Cys Gly Ala Gly Thr Gly Cys Thr Ala
                645             650             655

Ala Thr Gly Ala Gly Gly Thr Ala Cys Cys
            660             665

<210> SEQ ID NO 164
<211> LENGTH: 1678
<212> TYPE: PRT
<213> ORGANISM: Artificial Sequence
<220> FEATURE:
<223> OTHER INFORMATION: Recombinant Sequence

<400> SEQUENCE: 164

Gly Gly Ala Thr Ala Ala Cys Ala Thr Thr Thr Cys Ala Cys Ala
1               5              10              15

Cys Ala Gly Ala Ala Thr Thr Cys Ala Thr Ala Ala Ala Gly Ala
            20              25              30

Gly Gly Ala Gly Ala Ala Ala Thr Ala Ala Cys Cys Ala Thr Gly
        35              40              45

Ala Ala Ala Ala Ala Gly Ala Ala Thr Ala Cys Gly Cys Ala Thr
    50              55              60

Thr Thr Cys Thr Thr Cys Thr Thr Gly Cys Ala Thr Cys Thr Ala Thr
```

```
65                  70                  75                  80

Gly Thr Thr Cys Gly Thr Thr Thr Thr Thr Thr Cys Thr Ala Thr Thr
                85                  90                  95

Gly Cys Thr Ala Cys Ala Ala Ala Thr Gly Cys Cys Thr Ala Thr Gly
            100                 105                 110

Cys Ala Thr Cys Cys Gly Ala Ala Ala Thr Cys Gly Thr Gly Cys Thr
        115                 120                 125

Gly Ala Cys Cys Cys Ala Gly Thr Cys Gly Cys Cys Cys Gly Cys Thr
    130                 135                 140

Ala Cys Ala Thr Thr Ala Thr Cys Gly Thr Thr Gly Thr Cys Ala Cys
145                 150                 155                 160

Cys Gly Gly Gly Gly Gly Ala Ala Cys Gly Cys Gly Cys Gly Ala Cys
                165                 170                 175
Ala Thr Thr Gly Thr Cys Cys Thr Gly Thr Cys Gly Cys Gly Cys Ala
            180                 185                 190

Thr Cys Ala Cys Ala Gly Ala Gly Cys Gly Thr Ala Thr Cys Thr Thr
        195                 200                 205

Cys Gly Thr Ala Thr Thr Thr Gly Gly Cys Cys Thr Gly Gly Thr Ala
    210                 215                 220

Thr Cys Ala Gly Cys Ala Ala Ala Ala Gly Cys Cys Ala Gly Gly Cys
225                 230                 235                 240

Cys Ala Ala Gly Cys Cys Cys Cys Cys Cys Gly Thr Cys Thr Thr Thr
                245                 250                 255
Thr Ala Ala Thr Thr Thr Ala Thr Gly Ala Cys Gly Cys Cys Thr Cys
            260                 265                 270

Thr Ala Ala Thr Cys Gly Cys Gly Cys Ala Ala Cys Cys Gly Gly Cys
        275                 280                 285

Ala Thr Thr Cys Cys Thr Gly Cys Ala Cys Gly Cys Thr Thr Thr Thr
    290                 295                 300

Cys Cys Gly Gly Cys Thr Cys Ala Gly Gly Gly Ala Gly Thr Gly Gly
305                 310                 315                 320

Cys Ala Cys Gly Gly Ala Thr Thr Thr Cys Ala Cys Thr Thr Thr Gly
                325                 330                 335

Ala Cys Gly Ala Thr Cys Ala Gly Thr Ala Gly Thr Cys Thr Thr Gly
            340                 345                 350

Ala Ala Cys Cys Ala Gly Ala Ala Gly Ala Cys Thr Thr Cys Gly Cys
        355                 360                 365

Gly Gly Thr Thr Thr Ala Cys Thr Ala Cys Thr Gly Cys Cys Ala Ala
    370                 375                 380

Cys Ala Ala Thr Cys Cys Thr Cys Gly Ala Ala Cys Thr Gly Gly Cys
385                 390                 395                 400

Cys Thr Cys Gly Thr Ala Cys Ala Thr Thr Thr Gly Gly Thr Cys Ala
                405                 410                 415

Ala Gly Gly Thr Ala Cys Cys Ala Ala Gly Gly Thr Gly Gly Ala Ala
            420                 425                 430

Ala Thr Cys Ala Ala Ala Cys Gly Cys Ala Cys Cys Gly Thr Ala Gly
        435                 440                 445

Cys Cys Gly Cys Ala Cys Cys Gly Thr Cys Ala Gly Thr Cys Thr Thr
    450                 455                 460

Cys Ala Thr Cys Thr Thr Cys Cys Cys Thr Cys Cys Cys Thr Cys Thr
465                 470                 475                 480

Gly Ala Cys Gly Ala Ala Cys Ala Ala Thr Thr Ala Ala Ala Ala Thr
                485                 490                 495
```
Cys Thr Gly Gly Cys Ala Cys Ala Gly Cys Thr Thr Cys Cys Gly Thr
500 505 510

Thr Gly Thr Ala Thr Gly Cys Cys Thr Thr Cys Thr Thr Ala Ala Cys
515 520 525

Ala Ala Cys Thr Thr Thr Thr Ala Thr Cys Cys Ala Cys Gly Thr Gly
530 535 540

Ala Ala Gly Cys Gly Ala Ala Ala Gly Thr Cys Cys Ala Ala Thr Gly
545 550 555 560

Gly Ala Ala Ala Gly Thr Thr Gly Ala Thr Ala Ala Thr Gly Cys Ala
565 570 575

Cys Thr Thr Cys Ala Gly Thr Cys Thr Gly Gly Gly Ala Ala Cys Thr
580 585 590

Cys Ala Cys Ala Gly Gly Ala Gly Thr Cys Cys Gly Thr Ala Ala Cys
595 600 605

Gly Gly Ala Ala Cys Ala Gly Gly Ala Cys Thr Cys Thr Ala Ala Gly
610 615 620

Gly Ala Cys Thr Cys Ala Ala Cys Cys Thr Ala Thr Ala Gly Cys Thr
625 630 635 640

Thr Ala Thr Cys Thr Thr Cys Ala Ala Cys Ala Thr Thr Gly Ala Cys
645 650 655

Ala Thr Thr Gly Thr Cys Ala Ala Ala Gly Gly Cys Ala Gly Ala Cys
660 665 670

Thr Ala Thr Gly Ala Gly Ala Ala Gly Cys Ala Cys Ala Ala Ala Gly
675 680 685

Thr Gly Thr Ala Cys Gly Cys Thr Thr Gly Thr Gly Ala Ala Gly Thr
690 695 700

Cys Ala Cys Cys Cys Ala Thr Cys Ala Gly Gly Gly Cys Thr Thr Gly
705 710 715 720

Thr Cys Thr Thr Cys Thr Cys Cys Ala Gly Thr Ala Ala Cys Cys Ala
725 730 735

Ala Ala Ala Gly Thr Thr Thr Cys Ala Ala Thr Cys Gly Cys Gly Gly
740 745 750

Gly Gly Ala Gly Thr Gly Thr Gly Gly Thr Gly Gly Thr Thr Cys Thr
755 760 765

Gly Ala Thr Thr Ala Cys Ala Ala Ala Gly Ala Thr Gly Ala Cys Gly
770 775 780

Ala Thr Gly Ala Cys Ala Ala Ala Thr Ala Ala Thr Thr Ala Ala Cys
785 790 795 800

Thr Cys Gly Ala Gly Gly Cys Thr Gly Ala Gly Cys Ala Ala Ala Gly
805 810 815

Cys Ala Gly Ala Cys Thr Ala Cys Thr Ala Ala Thr Ala Ala Cys Ala
820 825 830

Thr Ala Ala Ala Gly Thr Cys Thr Ala Cys Gly Cys Cys Gly Gly Ala
835 840 845

Cys Gly Cys Ala Thr Cys Gly Thr Gly Gly Cys Cys Cys Thr Ala Gly
850 855 860

Thr Ala Cys Gly Cys Ala Ala Gly Thr Thr Cys Ala Cys Gly Thr Ala
865 870 875 880

Ala Ala Ala Ala Gly Gly Gly Thr Ala Ala Cys Thr Ala Gly Ala Gly
885 890 895

Gly Thr Thr Gly Ala Gly Gly Thr Gly Ala Thr Thr Thr Thr Ala Thr
900 905 910

-continued

Gly Ala Ala Ala Ala Gly Ala Ala Thr Ala Thr Cys Gly Cys Ala
            915                 920                 925

Thr Thr Thr Cys Thr Thr Cys Thr Thr Gly Cys Ala Thr Cys Thr Ala
    930                 935                 940

Thr Gly Thr Thr Cys Gly Thr Thr Thr Thr Thr Thr Cys Thr Ala Thr
945                 950                 955                 960

Thr Gly Cys Thr Ala Cys Ala Ala Cys Gly Cys Gly Thr Ala Cys
                965                 970                 975

Gly Cys Thr Gly Ala Gly Ala Thr Cys Thr Cys Cys Ala Ala Gly
                980                 985                 990

Thr Cys Cys Ala Gly Cys Thr Gly  Gly Thr Thr Gly Ala  Ala Thr Cys
                995                 1000                1005

Ala Gly Gly Thr Gly Gly Gly Gly Ala Gly Thr  Thr Gly Thr
    1010                1015                1020

Thr Cys Ala Ala Cys Cys Gly Gly Gly Cys Gly  Thr Thr Cys
    1025                1030                1035

Cys Cys Thr Gly Cys Gly Thr Cys Thr Gly Ala  Cys Thr Gly
    1040                1045                1050

Cys Ala Ala Ala Gly Cys Cys  Thr Cys Ala Gly Gly  Ala Ala Thr
    1055                1060                1065

Thr Ala Cys Thr Thr Thr Thr  Thr Cys Ala Ala Ala  Cys Thr Cys
    1070                1075                1080

Cys Gly Gly Gly Ala Thr Gly  Cys Ala Cys Thr Gly  Gly Gly Thr
    1085                1090                1095

Thr Cys Gly Thr Cys Ala Ala  Gly Cys Cys Cys  Cys Gly Gly
    1100                1105                1110

Ala Ala Ala Ala Gly Gly Gly  Thr Thr Gly Gly Ala  Gly Thr Gly
    1115                1120                1125

Gly Gly Thr Ala Gly Cys Ala  Gly Thr Gly Ala Thr  Cys Thr Gly
    1130                1135                1140

Gly Thr Ala Thr Gly Ala Thr  Gly Gly Cys Thr Cys  Ala Ala Ala
    1145                1150                1155

Ala Cys Gly Thr Thr Ala Cys  Thr Ala Cys Gly Cys  Gly Gly Ala
    1160                1165                1170

Cys Thr Cys Gly Gly Thr Thr  Ala Ala Gly Gly  Thr Cys Gly
    1175                1180                1185

Cys Thr Thr Thr Ala Cys Thr  Ala Thr Thr Cys  Ala Cys Gly
    1190                1195                1200

Cys Gly Ala Cys Ala Ala Cys  Thr Cys Gly Ala Ala  Ala Ala Ala
    1205                1210                1215

Thr Ala Cys Thr Thr Thr Gly  Thr Thr Cys Thr  Ala Cys Ala
    1220                1225                1230

Gly Ala Thr Gly Ala Ala Cys  Thr Cys Thr Cys Thr  Thr Cys Gly
    1235                1240                1245

Cys Gly Cys Cys Gly Ala Ala  Gly Ala Thr Ala Cys  Gly Gly Cys
    1250                1255                1260

Ala Gly Thr Gly Thr Ala Cys  Thr Ala Thr Thr Gly  Cys Gly Cys
    1265                1270                1275

Cys Ala Cys Ala Ala Ala Thr  Gly Ala Thr Gly Ala  Thr Thr Ala
    1280                1285                1290

Thr Thr Gly Gly Gly Gly Thr  Cys Ala Ala Gly Gly  Thr Ala Cys
    1295                1300                1305

Ala Thr Thr Ala Gly Thr Gly  Ala Cys Cys Gly Thr  Cys Ala Gly

```
    1310                1315                1320

Thr Ala  Gly Cys Gly Cys Gly  Ala Gly Thr Ala Cys  Gly Ala Ala
    1325                1330                1335

Gly Gly  Gly Ala Cys Cys Thr  Ala Gly Cys Gly Thr  Gly Thr Thr
    1340                1345                1350

Thr Cys  Cys Cys Thr Thr Ala  Gly Cys Ala Cys Cys  Ala Thr Gly
    1355                1360                1365

Thr Ala  Gly Thr Cys Gly Thr  Thr Cys Gly Ala Cys  Ala Ala Gly
    1370                1375                1380

Cys Gly  Ala Ala Thr Cys Cys  Ala Cys Ala Gly Cys  Gly Gly Cys
    1385                1390                1395

Cys Thr  Thr Ala Gly Gly Gly  Thr Gly Cys Thr Thr  Ala Gly Thr
    1400                1405                1410

Gly Ala  Ala Gly Gly Ala Thr  Thr Ala Thr Thr Thr  Thr Cys Cys
    1415                1420                1425

Cys Gly  Ala Gly Cys Cys Ala  Gly Thr Ala Ala Cys  Ala Gly Thr
    1430                1435                1440

Ala Thr  Cys Gly Thr Gly Gly  Ala Ala Thr Ala Gly  Cys Gly Gly
    1445                1450                1455

Cys Gly  Cys Ala Thr Thr Ala  Ala Cys Thr Thr Cys  Cys Gly Gly
    1460                1465                1470

Cys Gly  Thr Thr Cys Ala Thr  Ala Cys Cys Thr Thr  Cys Cys Cys
    1475                1480                1485

Thr Gly  Cys Cys Gly Thr Thr  Thr Thr Ala Cys Ala  Gly Thr Cys
    1490                1495                1500

Ala Thr  Cys Cys Gly Gly Thr  Thr Thr Gly Thr Ala  Thr Thr Cys
    1505                1510                1515

Thr Cys  Thr Thr Thr Cys Gly  Thr Cys Ala Gly Thr  Ala Gly Thr
    1520                1525                1530

Ala Ala  Cys Ala Gly Thr Gly  Cys Cys Thr Thr Cys  Cys Thr Cys
    1535                1540                1545

Cys Thr  Cys Gly Cys Thr Gly  Gly Gly Gly Ala Cys  Cys Ala Ala
    1550                1555                1560

Gly Ala  Cys Cys Thr Ala Thr  Ala Cys Cys Thr Gly  Cys Ala Ala
    1565                1570                1575

Thr Gly  Thr Gly Gly Ala Cys  Cys Ala Thr Ala Ala  Gly Cys Cys
    1580                1585                1590

Thr Thr  Cys Ala Ala Ala Cys  Ala Cys Ala Ala Ala  Ala Gly Thr
    1595                1600                1605

Ala Gly  Ala Cys Ala Ala Ala  Cys Gly Thr Gly Thr  Thr Gly Ala
    1610                1615                1620

Ala Thr  Cys Ala Ala Ala Gly  Thr Ala Cys Gly Gly  Cys Cys Cys
    1625                1630                1635

Gly Cys  Cys Thr Thr Gly Thr  Cys Cys Gly Cys Cys  Cys Thr Gly
    1640                1645                1650

Cys Gly  Gly Ala Thr Cys Cys  Ala Ala Ala Gly Ala  Thr Ala Thr
    1655                1660                1665

Cys Ala  Gly Ala Thr Cys Thr  Gly Gly Thr
    1670                1675
```

<210> SEQ ID NO 165
<211> LENGTH: 222
<212> TYPE: PRT
<213> ORGANISM: Artificial Sequence
<220> FEATURE:
<223> OTHER INFORMATION: Recombinant Sequence

<400> SEQUENCE: 165

```
Gln Val Gln Leu Val Glu Ser Gly Gly Gly Val Val Gln Pro Gly Arg
 1               5                  10                  15

Ser Leu Arg Leu Asp Cys Lys Ala Ser Gly Ile Thr Phe Ser Asn Ser
            20                  25                  30

Gly Met His Trp Val Arg Gln Ala Pro Gly Lys Gly Leu Glu Trp Val
        35                  40                  45

Ala Val Ile Trp Tyr Asp Gly Ser Lys Arg Tyr Tyr Ala Asp Ser Val
    50                  55                  60

Lys Gly Arg Phe Thr Ile Ser Arg Asp Asn Ser Lys Asn Thr Leu Phe
65                  70                  75                  80

Leu Gln Met Asn Ser Leu Arg Ala Glu Asp Thr Ala Val Tyr Tyr Cys
                85                  90                  95

Ala Thr Asn Asp Asp Tyr Trp Gly Gln Gly Thr Leu Val Thr Val Ser
            100                 105                 110

Ser Ala Ser Thr Lys Gly Pro Ser Val Phe Pro Leu Ala Pro Cys Ser
        115                 120                 125

Arg Ser Thr Ser Glu Ser Thr Ala Ala Leu Gly Cys Leu Val Lys Asp
    130                 135                 140

Tyr Phe Pro Glu Pro Val Thr Val Ser Trp Asn Ser Gly Ala Leu Thr
145                 150                 155                 160

Ser Gly Val His Thr Phe Pro Ala Val Leu Gln Ser Ser Gly Leu Tyr
                165                 170                 175

Ser Leu Ser Ser Val Val Thr Val Pro Ser Ser Ser Leu Gly Thr Lys
            180                 185                 190

Thr Tyr Thr Cys Asn Val Asp His Lys Pro Ser Asn Thr Lys Val Asp
        195                 200                 205

Lys Arg Val Glu Ser Lys Tyr Gly Pro Pro Cys Pro Pro Cys
    210                 215                 220
```

<210> SEQ ID NO 166
<211> LENGTH: 214
<212> TYPE: PRT
<213> ORGANISM: Artificial Sequence
<220> FEATURE:
<223> OTHER INFORMATION: Recombinant Sequence

<400> SEQUENCE: 166

```
Glu Ile Val Leu Thr Gln Ser Pro Ala Thr Leu Ser Leu Ser Pro Gly
 1               5                  10                  15

Glu Arg Ala Thr Leu Ser Cys Arg Ala Ser Gln Ser Val Ser Ser Tyr
            20                  25                  30

Leu Ala Trp Tyr Gln Gln Lys Pro Gly Gln Ala Pro Arg Leu Leu Ile
        35                  40                  45

Tyr Asp Ala Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Ser Ser Asn Trp Pro Arg
                85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
```

```
                    115                 120                 125
Thr Ala Ser Val Val Cys Leu Leu Asn Asn Phe Tyr Pro Arg Glu Ala
            130                 135                 140
Lys Val Gln Trp Lys Val Asp Asn Ala Leu Gln Ser Gly Asn Ser Gln
145                 150                 155                 160
Glu Ser Val Thr Glu Gln Asp Ser Lys Asp Ser Thr Tyr Ser Leu Ser
                165                 170                 175
Ser Thr Leu Thr Leu Ser Lys Ala Asp Tyr Glu Lys His Lys Val Tyr
            180                 185                 190
Ala Cys Glu Val Thr His Gln Gly Leu Ser Ser Pro Val Thr Lys Ser
                195                 200                 205
Phe Asn Arg Gly Glu Cys
    210

<210> SEQ ID NO 167
<211> LENGTH: 214
<212> TYPE: PRT
<213> ORGANISM: Artificial Sequence
<220> FEATURE:
<223> OTHER INFORMATION: Recombinant Sequence

<400> SEQUENCE: 167

Glu Ile Val Leu Thr Gln Ser Pro Ala Thr Leu Ser Leu Ser Pro Gly
1               5                   10                  15
Glu Arg Ala Thr Leu Ser Cys Arg Ala Ser Gln Ser Val Ser Ser Tyr
            20                  25                  30
Leu Ala Trp Tyr Gln Gln Lys Pro Gly Gln Ala Pro Arg Leu Leu Ile
        35                  40                  45
Tyr Asp Ala Ser Asn Arg Ala Thr Gly Ile Pro Ala Arg Phe Ser Gly
    50                  55                  60
Ser Gly Ser Gly Thr Asp Phe Thr Leu Thr Ile Ser Ser Leu Glu Pro
65                  70                  75                  80
Glu Asp Phe Ala Val Tyr Tyr Cys Gln Gln Ser Ser Asn Trp Pro Arg
                85                  90                  95
Thr Phe Gly Gln Gly Thr Lys Val Glu Ile Lys Arg Thr Val Ala Ala
            100                 105                 110
Pro Ser Val Phe Ile Phe Pro Pro Ser Asp Glu Gln Leu Lys Ser Gly
        115                 120                 125
Thr Ala Ser Val Val Cys Leu Leu Asn Asn Phe Tyr Pro Arg Glu Ala
    130                 135                 140
Lys Val Gln Trp Lys Val Asp Asn Ala Leu Gln Ser Gly Asn Ser Gln
145                 150                 155                 160
Glu Ser Val Thr Glu Gln Asp Ser Lys Asp Ser Thr Tyr Ser Leu Ser
                165                 170                 175
Ser Thr Leu Thr Leu Ser Lys Ala Asp Tyr Glu Lys His Lys Val Tyr
            180                 185                 190
Ala Cys Glu Val Thr His Gln Gly Leu Ser Ser Pro Val Thr Lys Ser
                195                 200                 205
Phe Asn Arg Gly Glu Cys
    210

<210> SEQ ID NO 168
<211> LENGTH: 322
<212> TYPE: PRT
<213> ORGANISM: Artificial Sequence
<220> FEATURE:
<223> OTHER INFORMATION: Recombinant Sequence
```

<400> SEQUENCE: 168

```
Pro Ser Val Phe Pro Leu Ala Pro Cys Ser Arg Ser Thr Ser Glu Ser
1               5                   10                  15

Thr Ala Ala Leu Gly Cys Leu Val Lys Asp Tyr Phe Pro Glu Pro Val
            20                  25                  30

Thr Val Ser Trp Asn Ser Gly Ala Leu Thr Ser Gly Val His Thr Phe
        35                  40                  45

Pro Ala Val Leu Gln Ser Ser Gly Leu Tyr Ser Leu Ser Ser Val Val
    50                  55                  60

Thr Val Pro Ser Ser Ser Leu Gly Thr Lys Thr Tyr Thr Cys Asn Val
65                  70                  75                  80

Asp His Lys Pro Ser Asn Thr Lys Val Asp Lys Arg Val Glu Ser Lys
                85                  90                  95

Tyr Gly Pro Pro Cys Pro Pro Cys Pro Ala Pro Glu Phe Leu Gly Gly
            100                 105                 110

Pro Ser Val Phe Leu Phe Pro Pro Lys Pro Lys Asp Thr Leu Met Ile
        115                 120                 125

Ser Arg Thr Pro Glu Val Thr Cys Val Val Asp Val Ser Gln Glu
130                 135                 140

Asp Pro Glu Val Gln Phe Asn Trp Tyr Val Asp Gly Val Glu Val His
145                 150                 155                 160

Asn Ala Lys Thr Lys Pro Arg Glu Glu Gln Phe Asn Ser Thr Tyr Arg
                165                 170                 175

Val Val Ser Val Leu Thr Val Leu His Gln Asp Trp Leu Asn Gly Lys
            180                 185                 190

Glu Tyr Lys Cys Lys Val Ser Asn Lys Gly Leu Pro Ser Ser Ile Glu
        195                 200                 205

Lys Thr Ile Ser Lys Ala Lys Gly Gln Pro Arg Glu Pro Gln Val Tyr
    210                 215                 220

Thr Leu Pro Pro Ser Gln Glu Glu Met Thr Lys Asn Gln Val Ser Leu
225                 230                 235                 240

Thr Cys Leu Val Lys Gly Phe Tyr Pro Ser Asp Ile Ala Val Glu Trp
                245                 250                 255

Glu Ser Asn Gly Gln Pro Glu Asn Asn Tyr Lys Thr Thr Pro Pro Val
            260                 265                 270

Leu Asp Ser Asp Gly Ser Phe Phe Leu Tyr Ser Arg Leu Thr Val Asp
        275                 280                 285

Lys Ser Arg Trp Gln Glu Gly Asn Val Phe Ser Cys Ser Val Met His
    290                 295                 300

Glu Ala Leu His Asn His Tyr Thr Gln Lys Ser Leu Ser Leu Ser Leu
305                 310                 315                 320

Gly Lys
```

<210> SEQ ID NO 169
<211> LENGTH: 356
<212> TYPE: PRT
<213> ORGANISM: Artificial Sequence
<220> FEATURE:
<223> OTHER INFORMATION: Recombinant Sequence

<400> SEQUENCE: 169

```
Cys Ala Gly Gly Thr Thr Cys Ala Ala Thr Thr Gly Gly Thr Thr Gly
1               5                   10                  15

Ala Ala Thr Cys Thr Gly Gly Cys Gly Gly Cys Gly Gly Ala Gly Thr
```

```
                    20                  25                  30
Gly Gly Thr Gly Cys Ala Gly Cys Cys Thr Gly Gly Ala Ala Gly Ala
                35                  40                  45
Ala Gly Thr Cys Thr Gly Ala Gly Ala Cys Thr Gly Gly Ala Thr Thr
            50                  55                  60
Gly Cys Ala Ala Gly Gly Cys Cys Thr Cys Cys Gly Gly Cys Ala Thr
65                  70                  75                  80
Cys Ala Cys Cys Thr Cys Thr Cys Cys Ala Ala Cys Thr Cys Thr
                85                  90                  95
Gly Gly Cys Ala Thr Gly Cys Ala Cys Thr Gly Gly Thr Cys Cys
                100                 105                 110
Gly Ala Cys Ala Gly Gly Cys Cys Cys Thr Gly Gly Ala Ala Ala
            115                 120                 125
Ala Gly Gly Ala Cys Thr Gly Gly Ala Ala Thr Gly Gly Th

```
            20                  25                  30
Gly Gly Thr Gly Cys Ala Gly Cys Cys Thr Gly Gly Ala Ala Gly Ala
            35                  40                  45

Ala Gly Thr Cys Thr Gly Ala Gly Ala Cys Thr Gly Gly Ala Thr Thr
        50                  55                  60

Gly Cys Ala Ala Gly Gly Cys Cys Thr Cys Cys Gly Gly Cys Ala Thr
65                  70                  75                  80

Cys Ala Cys Cys Thr Cys Thr Cys Cys Ala Ala Cys Thr Cys Thr
                85                  90                  95

Gly Gly Cys Ala Thr Gly Cys Ala Cys Thr Gly Gly Thr Cys Cys
            100                 105                 110

Gly Ala Cys Ala Gly Gly Cys Cys Cys Thr Gly Gly Ala Ala Ala
        115                 120                 125

Ala Gly Gly Ala Cys Thr Gly Gly Ala Ala Thr Gly Gly Thr Cys
    130                 135                 140

Gly Cys Cys Gly Thr Gly Ala Thr Thr Thr Gly Gly Thr Ala Cys Gly
145                 150                 155                 160

Ala Cys Gly Gly Cys Thr Cys Thr Ala Ala Gly Cys Gly Gly Thr Ala
            165                 170                 175

Cys Thr Ala Cys Gly Cys Cys Gly Ala Cys Thr Cys Cys Gly Thr Gly
        180                 185                 190

Ala Ala Gly Gly Gly Cys Ala Gly Ala Thr Thr Cys Ala Cys Cys Ala
    195                 200                 205

Th

```
                 20                  25                  30
Gly Gly Thr Gly Cys Ala Gly Cys Cys Thr Gly Gly Ala Ala Gly Ala
             35                  40                  45
Ala Gly Thr Cys Thr Gly Ala Gly Ala Cys Thr Gly Gly Ala Thr Thr
         50                  55                  60
Gly Cys Ala Ala Gly Gly Cys Cys Thr Cys Cys Gly Gly Cys Ala Thr
 65                  70                  75                  80
Cys Ala Cys Cys Thr Cys Thr Cys Cys Ala Ala Cys Thr Cys Thr
                 85                  90                  95
Gly Gly Cys Ala Thr Gly Cys Ala Cys Thr Gly Gly Gly Thr Cys Cys
                100                 105                 110
Gly Ala Cys Ala Gly Gly Cys Cys Cys Thr Gly Gly Ala Ala Ala
            115                 120                 125
Ala Gly Gly Ala Cys Thr Gly Gly Ala Ala Thr Gly Gly Thr Cys
        130                 135                 140
Gly Cys Cys Gly Thr Gly Ala Thr Thr Thr Gly Gly

```
            20                  25                  30
Gly Gly Thr Gly Cys Ala Gly Cys Cys Thr Gly Gly Ala Ala Gly Ala
            35                  40                  45

Ala Gly Thr Cys Thr Gly Ala Gly Ala Cys Thr Gly Gly Ala Thr Thr
        50                  55                  60

Gly Cys Ala Ala Gly Gly Cys Cys Thr Cys Cys Gly Gly Cys Ala Thr
65                  70                  75                  80

Cys Ala Cys Cys Thr Thr Cys Thr Cys Cys Ala Ala Cys Thr Cys Thr
                85                  90                  95

Gly Gly Cys Ala Thr Gly Cys Ala Cys Thr Gly Gly Gly Thr Cys Cys
                100                 105                 110

Gly Ala Cys Ala Gly Gly Cys Cys Cys Thr Gly Gly Ala Ala Ala Ala
            115                 120                 125

Ala Gly Gly Ala Cys Thr Gly Gly Ala Ala Thr Gly Gly Gly Thr Cys
        130                 135                 140

Gly Cys Cys Gly Thr Gly Ala Thr

```
            20                  25                  30
Gly Gly Thr Gly Cys Ala Gly Cys Cys Thr Gly Gly Ala Ala Gly Ala
            35                  40                  45

Ala Gly Thr Cys Thr Gly Ala Gly Ala Cys Thr Gly Gly Ala Thr Thr
            50                  55                  60

Gly Cys Ala Ala Gly Gly Cys Cys Thr Cys Cys Gly Gly Cys Ala Thr
 65                 70                  75                  80

Cys Ala Cys Cys Thr Thr Cys Thr Cys Ala Ala Cys Thr Cys Thr
                85                  90                  95

Gly Gly Cys Ala Thr Gly Cys Ala Cys Thr Gly Gly Gly Thr Cys Cys
            100                 105                 110

Gly Ala Cys Ala Gly Gly Cys Cys Cys Thr Gly Gly Ala Ala Ala
            115                 120                 125

```
            20                  25                  30

Gly Thr Cys Thr Cys Thr Gly Ala Gly Cys Cys Cys Thr Gly Gly Cys
        35                  40                  45

Gly Ala Gly Ala Gly Ala Gly Cys Cys Ala Cys Cys Cys Thr Gly Ala
    50                  55                  60

Gly Cys Thr Gly Cys Ala Gly Ala Gly Cys Cys Thr Cys Cys Cys Ala
65                  70                  75                  80

Gly Thr Cys Cys Gly Thr Gly Thr Cys Cys Thr Cys Cys Thr Ala Cys
                85                  90                  95

Cys Thr Gly Gly Cys Cys Thr Gly Gly Thr Ala Thr Cys Ala Gly Cys
            100                 105                 110

Ala Gly Ala Ala Gly Cys Cys Cys Gly Gly Cys Cys Ala Gly Gly Cys
        115                 120                 125

Cys Cys Cys Thr Cys Gly Gly Cys Thr Gly Cys Thr Gly Ala Thr Cys
    130                 135                 140

Thr Ala Cys Gly Ala Cys Gly Cys Cys Thr Cys Cys Ala Ala Cys Cys
145                 150                 155                 160

Gly Gly Gly Cys Cys Ala Cys Cys Gly Gly Cys Ala Thr Cys Cys Cys
                165                 170                 175

Thr Gly Cys Cys Ala Gly Ala Thr Thr Cys Thr Cys Cys Gly Gly Cys
            180                 185                 190

Thr Cys Thr Gly Gly Cys Thr Cys Cys Gly Gly Cys Ala Cys Cys Gly
        195                 200                 205

Ala Cys Thr Thr Cys Ala Cys Cys Cys Thr Gly Ala Cys Cys Ala Thr
    210                 215                 220

Cys Thr Cys Cys Ala Gly Cys Cys Thr Gly Gly Ala Ala Cys Cys Cys
225                 230                 235                 240

Gly Ala Gly Gly Ala Cys Thr Thr Cys Gly Cys Cys Gly Thr Gly Thr
                245                 250                 255

Ala Cys Thr Ala Cys Thr Gly Cys Cys Ala Gly Cys Ala Gly Thr Cys
            260                 265                 270

Cys Thr Cys Cys Ala Ala Cys Thr Gly Gly Cys Cys Cys Cys Gly Gly
        275                 280                 285

Ala Cys Cys Thr Thr Cys Gly Gly Cys Cys Ala Gly Gly Gly Cys Ala
    290                 295                 300

Cys Cys Ala Ala Gly Gly Thr Gly Gly Ala Ala Ala Thr Cys Ala Ala
305                 310                 315                 320

Gly Cys Gly Gly Ala Cys Cys Gly Thr Gly Gly Cys Cys Gly Cys Thr
                325                 330                 335

Cys Cys Cys Thr Cys Cys Gly Thr Gly Thr Thr Cys Ala Thr Cys Thr
            340                 345                 350

Thr Cys Cys Cys Ala Cys Cys Cys Thr Cys Cys Gly Ala Cys Gly Ala
        355                 360                 365

Gly Cys Ala Gly Cys Thr Gly Ala Ala Gly Thr Cys Cys Gly Gly Cys
    370                 375                 380

Ala Cys Cys Gly Cys Cys Thr Cys Cys Gly Thr Gly Gly Thr Cys Thr
385                 390                 395                 400

Gly Cys Cys Thr Gly Cys Thr Gly Ala Ala Cys Ala Ala Cys Thr Thr
                405                 410                 415

Cys Thr Ala Cys Cys Cys Cys Cys Gly Cys Gly Ala Gly Gly Cys Cys
            420                 425                 430

Ala Ala Gly Gly Thr Gly Cys Ala Gly Thr Gly Gly Ala Ala Gly Gly
        435                 440                 445
```

```
Thr Gly Gly Ala Cys Ala Ala Cys Gly Cys Cys Cys Thr Gly Cys Ala
    450                 455                 460

Gly Thr Cys Cys Gly Gly Cys Ala Ala Cys Thr Cys Cys Cys Ala Gly
465                 470                 475                 480

Gly Ala Ala Thr Cys Cys Gly Thr Gly Ala Cys Cys Gly Ala Gly Cys
                485                 490                 495

Ala Gly Gly Ala Cys Thr Cys Cys Ala Ala Gly Gly Ala Cys Ala Gly
            500                 505                 510

Cys Ala Cys Cys Thr Ala Cys Thr Cys Cys Cys Thr Gly Thr Cys Cys
        515                 520                 525

Thr Cys Cys Ala Cys Cys Cys Thr Gly Ala Cys Cys Cys Thr Gly Thr
    530                 535                 540

Cys Cys Ala Ala Gly Gly Cys Cys Gly Ala Cys Thr Ala Cys Gly Ala
545                 550                 555                 560

Gly Ala Ala Gly Cys Ala Cys Ala Ala Gly Gly Thr Gly Thr Ala Cys
                565                 570                 575

Gly Cys Cys Thr Gly Cys Gly Ala Ala Gly Thr Gly Ala Cys Cys Cys
            580                 585                 590

Ala Cys Cys Ala Gly Gly Gly Cys Cys Thr Gly Thr Cys Cys Ala Gly
        595                 600                 605

Cys Cys Cys Cys Gly Thr Gly Ala Cys Cys Ala Ala Gly Thr Cys Cys
    610                 615                 620

Thr Thr Cys Ala Ala Cys Cys Gly Gly Gly Gly Cys Gly Ala Gly Thr
625                 630                 635                 640

Gly Cys Thr Gly Ala Thr Gly Ala
                645
```

<210> SEQ ID NO 175
<211> LENGTH: 976
<212> TYPE: PRT
<213> ORGANISM: Artificial Sequence
<220> FEATURE:
<223> OTHER INFORMATION: Recombinant Sequence

<400> SEQUENCE: 175

```
Gly Gly Gly Cys Cys Cys Cys Thr Cys Cys Gly Thr Gly Thr Thr Cys
1               5                   10                  15

Cys Cys Thr Cys Thr Gly Gly Cys Cys Cys Cys Thr Thr Gly Cys Thr
            20                  25                  30

Cys Cys Cys Gly Gly Thr Cys Cys Ala Cys Cys Thr Cys Cys Gly Ala
        35                  40                  45

Gly Thr Cys Thr Ala Cys Cys Gly Cys Cys Gly Cys Thr Cys Thr Gly
    50                  55                  60

Gly Gly Cys Thr Gly Cys Cys Thr Gly Gly Thr Gly Ala Ala Ala Gly
65                  70                  75                  80

Ala Cys Thr Ala Cys Thr Thr Cys Cys Cys Cys Gly Ala Gly Cys Cys
                85                  90                  95

Cys Gly Thr Gly Ala Cys Cys Gly Thr Gly Thr Cys Cys Thr Gly Gly
            100                 105                 110

Ala Ala Cys Thr Cys Thr Gly Gly Cys Gly Cys Cys Cys Thr Gly Ala
        115                 120                 125

Cys Cys Ala Gly Cys Gly Gly Cys Gly Thr Gly Cys Ala Cys Ala Cys
    130                 135                 140

Cys Thr Thr Cys Cys Cys Thr Gly Cys Cys Gly Thr Gly Cys Thr Gly
145                 150                 155                 160
```

-continued

```
Cys Ala Gly Thr Cys Cys Thr Cys Cys Gly Cys Thr Gly Thr
                165                 170                 175

Ala Cys Thr Cys Cys Thr Gly Thr Cys Cys Thr Cys Cys Gly Thr
                180                 185                 190

Gly Gly Thr Gly Ala Cys Cys Gly Thr Gly Cys Cys Thr Cys Cys
                195                 200                 205

Thr Cys Cys Ala Gly Cys Cys Thr Gly Gly Cys Ala Cys Cys Ala
            210                 215                 220

Ala Gly Ala Cys Cys Thr Ala Cys Ala Cys Cys Thr Gly Thr Ala Ala
225                 230                 235                 240

Cys Gly Thr Gly Gly Ala Cys Cys Ala Cys Ala Ala Gly Cys Cys Cys
                245                 250                 255

Thr Cys Cys Ala Ala Cys Ala Cys Cys Ala Ala Gly Gly Thr Gly Gly
            260                 265                 270

Ala Cys Ala Ala Gly Cys Gly Gly Gly Thr Gly Gly Ala Ala Thr Cys
            275                 280                 285

Thr Ala Ala Gly Thr Ala Cys Gly Gly Cys Cys Cys Thr Cys Cys Cys
        290                 295                 300

Thr Gly Cys Cys Cys Cys Cys Cys Thr Gly Cys Cys Cys Thr Gly
305                 310                 315                 320

Cys Cys Cys Cys Thr Gly Ala Ala Thr Thr Thr Cys Thr Gly Gly Gly
                325                 330                 335

Cys Gly Gly Ala Cys Cys Thr Cys Cys Gly Thr Gly Thr Thr Cys
            340                 345                 350

Cys Thr Gly Thr Thr Cys Cys Cys Cys Cys Ala Ala Gly Cys
        355                 360                 365

Cys Cys Ala Ala Gly Gly Ala Cys Ala Cys Cys Thr Gly Ala Thr
    370                 375                 380

Gly Ala Thr Cys Thr Cys Cys Cys Gly Gly Ala Cys Cys Cys Cys
385                 390                 395                 400

Gly Ala Ala Gly Thr Gly Ala Cys Cys Thr Gly Cys Gly Thr Gly Gly
                405                 410                 415

Thr Gly Gly Thr Gly Gly Ala Cys Gly Thr Gly Thr Cys Cys Cys Ala
            420                 425                 430

Gly Gly Ala Ala Gly Ala Thr Cys Cys Cys Gly Ala Gly Gly Thr Gly
                435                 440                 445

Cys Ala Gly Thr Thr Cys Ala Ala Thr Thr Gly Gly Thr Ala Cys Gly
    450                 455                 460

Thr Gly Gly Ala Cys Gly Gly Cys Gly Thr Gly Gly Ala Ala Gly Thr
465                 470                 475                 480

Gly Cys Ala Cys Ala Ala Cys Gly Cys Cys Ala Ala Gly Ala Cys Cys
                485                 490                 495

Ala Ala Gly Cys Cys Cys Ala Gly Ala Gly Ala Gly Gly Ala Ala Cys
                500                 505                 510

Ala Gly Thr Thr Cys Ala Ala Cys Cys Ala Cys Cys Thr Ala
        515                 520                 525

Cys Cys Gly Gly Gly Thr Gly Gly Thr Gly Thr Cys Thr Gly Thr Gly
        530                 535                 540

Cys Thr Gly Ala Cys Cys Gly Thr Gly Cys Thr Gly Cys Ala Cys Cys
545                 550                 555                 560

Ala Gly Gly Ala Cys Thr Gly Gly Cys Thr Gly Ala Ala Cys Gly Gly
                565                 570                 575
```

Cys Ala Ala Ala Gly Ala Gly Thr Ala Cys Ala Gly Thr Gly Cys
        580             585             590
Ala Ala Gly Gly Thr Gly Thr Cys Cys Ala Ala Cys Ala Ala Gly Gly
    595             600             605
Gly Cys Cys Thr Gly Cys Cys Thr Cys Ala Gly Cys Ala Thr
610             615             620
Cys Gly Ala Ala Ala Gly Ala Cys Ala Thr Cys Thr Cys Cys
625             630             635             640
Ala Ala Gly Gly Cys Cys Ala Ala Gly Gly Cys Cys Ala Gly Cys
            645             650             655
Cys Cys Cys Gly Cys Gly Ala Gly Cys Cys Cys Ala Gly Gly Thr
        660             665             670
Gly Thr Ala Cys Ala Cys Cys Thr Gly Cys Cys Cys Cys Thr
        675             680             685
Ala Gly Cys Cys Ala Gly Gly Ala Ala Gly Ala Thr Gly Ala
        690             695             700
Cys Cys Ala Ala Gly Ala Ala Cys Cys Ala Gly Gly Thr Gly Thr Cys
705             710             715             720
Cys Cys Thr Gly Ala Cys Cys Thr Gly Thr Cys Thr Gly Gly Thr Gly
            725             730             735
Ala Ala Ala Gly Gly Cys Thr Thr Cys Thr Ala Cys Cys Cys Thr
            740             745             750
Cys Cys Gly Ala Thr Ala Thr Cys Gly Cys Cys Gly Thr Gly Gly Ala
            755             760             765
Ala Thr Gly Gly Gly Ala Gly Thr Cys Cys Ala Ala Cys Gly Gly Cys
770             775             780
Cys Ala Gly Cys Cys Gly Gly Ala Gly Ala Ala Cys Ala Ala Cys Thr
785             790             795             800
Ala Cys Ala Ala Gly Ala Cys Cys Ala Cys Cys Cys Cys Cys Cys
            805             810             815
Thr Gly Thr Gly Cys Thr Gly Gly Ala Cys Thr Cys Cys Gly Ala Cys
        820             825             830
Gly Gly Cys Thr Cys Cys Thr Thr Cys Thr Thr Cys Cys Thr Gly Thr
        835             840             845
Ala Cys Thr Cys Thr Cys Gly Gly Cys Thr Gly Ala Cys Cys Gly Thr
        850             855             860
Gly Gly Ala Cys Ala Ala Gly Thr Cys Cys Gly Gly Thr Gly Gly
865             870             875             880
Cys Ala Gly Gly Ala Ala Gly Gly Cys Ala Ala Cys Gly Thr Gly Thr
            885             890             895
Thr Cys Thr Cys Cys Thr Gly Cys Thr Cys Cys Gly Thr Gly Ala Thr
        900             905             910
Gly Cys Ala Cys Gly Ala Gly Gly Cys Cys Cys Thr Gly Cys Ala Cys
            915             920             925
Ala Ala Cys Cys Ala Cys Thr Ala Cys Ala Cys Cys Ala Gly Ala
930             935             940
Ala Gly Thr Cys Cys Cys Thr Gly Thr Cys Cys Cys Thr Gly Ala Gly
945             950             955             960
Cys Cys Thr Gly Gly Gly Cys Ala Ala Gly Thr Gly Ala Thr Gly Ala
            965             970             975

<210> SEQ ID NO 176
<211> LENGTH: 54
<212> TYPE: DNA

```
<213> ORGANISM: Artificial Sequence
<220> FEATURE:
<223> OTHER INFORMATION: NI-CDRH1F
<220> FEATURE:
<221> NAME/KEY: misc_feature
<222> LOCATION: (19)..(20)
<223> OTHER INFORMATION: n is a, c, g, or t
<220> FEATURE:
<221> NAME/KEY: misc_feature
<222> LOCATION: (22)..(23)
<223> OTHER INFORMATION: n is a, c, g, or t
<220> FEATURE:
<221> NAME/KEY: misc_feature
<222> LOCATION: (25)..(26)
<223> OTHER INFORMATION: n is a, c, g, or t
<220> FEATURE:
<221> NAME/KEY: misc_feature
<222> LOCATION: (28)..(29)
<223> OTHER INFORMATION: n is a, c, g, or t
<220> FEATURE:
<221> NAME/KEY: misc_feature
<222> LOCATION: (31)..(32)
<223> OTHER INFORMATION: n is a, c, g, or t

<400> SEQUENCE: 176
actatcgtta gctcttctnn snnsnnsnns nnscactggg ttcgtcaagc cccc      54

<210> SEQ ID NO 177
<211> LENGTH: 52
<212> TYPE: DNA
<213> ORGANISM: Artificial Sequence
<220> FEATURE:
<223> OTHER INFORMATION: NI-CDRH1R
<220> FEATURE:
<221> NAME/KEY: misc_feature
<222> LOCATION: (20)..(21)
<223> OTHER INFORMATION: n is a, c, g, or t

<400> SEQUENCE: 177
actatcgtta gctcttctsn nagtaattcc tgaggctttg cagtccagac gc        52

<210> SEQ ID NO 178
<211> LENGTH: 69
<212> TYPE: DNA
<213> ORGANISM: Artificial Sequence
<220> FEATURE:
<223> OTHER INFORMATION: NI-CDRH2.1
<220> FEATURE:
<221> NAME/KEY: misc_feature
<222> LOCATION: (26)..(27)
<223> OTHER INFORMATION: n is a, c, g, or t
<220> FEATURE:
<221> NAME/KEY: misc_feature
<222> LOCATION: (29)..(30)
<223> OTHER INFORMATION: n is a, c, g, or t
<220> FEATURE:
<221> NAME/KEY: misc_feature
<222> LOCATION: (32)..(33)
<223> OTHER INFORMATION: n is a, c, g, or t
<220> FEATURE:
<221> NAME/KEY: misc_feature
<222> LOCATION: (35)..(36)
<223> OTHER INFORMATION: n is a, c, g, or t
<220> FEATURE:
<221> NAME/KEY: misc_feature
<222> LOCATION: (38)..(39)
<223> OTHER INFORMATION: n is a, c, g, or t
<220> FEATURE:
<221> NAME/KEY: misc_feature
<222> LOCATION: (41)..(42)
<223> OTHER INFORMATION: n is a, c, g, or t
<220> FEATURE:
<221> NAME/KEY: misc_feature
<222> LOCATION: (44)..(45)
<223> OTHER INFORMATION: n is a, c, g, or t
```

-continued

<400> SEQUENCE: 178
aaccgagtcc gcgtagtaac gtttsnnsnn snnsnnsnns nnsnntgcta cccactccaa    60
cccttttcc                                                            69

<210> SEQ ID NO 179
<211> LENGTH: 69
<212> TYPE: DNA
<213> ORGANISM: Artificial Sequence
<220> FEATURE:
<223> OTHER INFORMATION: NI-CDRH2.2
<220> FEATURE:
<221> NAME/KEY: misc_feature
<222> LOCATION: (26)..(27)
<223> OTHER INFORMATION: n is a, c, g, or t
<220> FEATURE:
<221> NAME/KEY: misc_feature
<222> LOCATION: (29)..(30)
<223> OTHER INFORMATION: n is a, c, g, or t
<220> FEATURE:
<221> NAME/KEY: misc_feature
<222> LOCATION: (32)..(33)
<223> OTHER INFORMATION: n is a, c, g, or t
<220> FEATURE:
<221> NAME/KEY: misc_feature
<222> LOCATION: (35)..(36)
<223> OTHER INFORMATION: n is a, c, g, or t
<220> FEATURE:
<221> NAME/KEY: misc_feature
<222> LOCATION: (38)..(39)
<223> OTHER INFORMATION: n is a, c, g, or t
<220> FEATURE:
<221> NAME/KEY: misc_feature
<222> LOCATION: (41)..(42)
<223> OTHER INFORMATION: n is a, c, g, or t
<220> FEATURE:
<221> NAME/KEY: misc_feature
<222> LOCATION: (44)..(45)
<223> OTHER INFORMATION: n is a, c, g, or t

<400> SEQUENCE: 179
gcgaccttta accgagtccg cgtasnnsnn snnsnnsnns nnsnnccaga tcactgctac    60
ccactccaa                                                            69

<210> SEQ ID NO 180
<211> LENGTH: 69
<212> TYPE: DNA
<213> ORGANISM: Artificial Sequence
<220> FEATURE:
<223> OTHER INFORMATION: NI-CDRH2.3
<220> FEATURE:
<221> NAME/KEY: misc_feature
<222> LOCATION: (26)..(27)
<223> OTHER INFORMATION: n is a, c, g, or t
<220> FEATURE:
<221> NAME/KEY: misc_feature
<222> LOCATION: (29)..(30)
<223> OTHER INFORMATION: n is a, c, g, or t
<220> FEATURE:
<221> NAME/KEY: misc_feature
<222> LOCATION: (32)..(33)
<223> OTHER INFORMATION: n is a, c, g, or t
<220> FEATURE:
<221> NAME/KEY: misc_feature
<222> LOCATION: (35)..(36)
<223> OTHER INFORMATION: n is a, c, g, or t
<220> FEATURE:
<221> NAME/KEY: misc_feature
<222> LOCATION: (38)..(39)
<223> OTHER INFORMATION: n is a, c, g, or t
<220> FEATURE:
<221> NAME/KEY: misc_feature
<222> LOCATION: (41)..(42)

<223> OTHER INFORMATION: n is a, c, g, or t
<220> FEATURE:
<221> NAME/KEY: misc_feature
<222> LOCATION: (44)..(45)
<223> OTHER INFORMATION: n is a, c, g, or t

<400> SEQUENCE: 180
aatagtaaag cgacctttaa ccgasnnsnn snnsnnsnns nnsnngccat cataccagat    60
cactgctac                                                           69

<210> SEQ ID NO 181
<211> LENGTH: 75
<212> TYPE: DNA
<213> ORGANISM: Artificial Sequence
<220> FEATURE:
<223> OTHER INFORMATION: NI-CDRL3.01
<220> FEATURE:
<221> NAME/KEY: misc_feature
<222> LOCATION: (35)..(36)
<223> OTHER INFORMATION: n is a, c, g, or t
<220> FEATURE:
<221> NAME/KEY: misc_feature
<222> LOCATION: (38)..(39)
<223> OTHER INFORMATION: n is a, c, g, or t
<220> FEATURE:
<221> NAME/KEY: misc_feature
<222> LOCATION: (41)..(42)
<223> OTHER INFORMATION: n is a, c, g, or t
<220> FEATURE:
<221> NAME/KEY: misc_feature
<222> LOCATION: (44)..(45)
<223> OTHER INFORMATION: n is a, c, g, or t
<220> FEATURE:
<221> NAME/KEY: misc_feature
<222> LOCATION: (47)..(48)
<223> OTHER INFORMATION: n is a, c, g, or t
<220> FEATURE:
<221> NAME/KEY: misc_feature
<222> LOCATION: (50)..(51)
<223> OTHER INFORMATION: n is a, c, g, or t

<400> SEQUENCE: 181
ttccaccttg gtaccttgac caaatgtacg aggsnnsnns nnsnnsnnsn ngcagtagta    60
aaccgcgaag tcttc                                                    75

<210> SEQ ID NO 182
<211> LENGTH: 75
<212> TYPE: DNA
<213> ORGANISM: Artificial Sequence
<220> FEATURE:
<223> OTHER INFORMATION: NI-CDRL3.02
<220> FEATURE:
<221> NAME/KEY: misc_feature
<222> LOCATION: (32)..(33)
<223> OTHER INFORMATION: n is a, c, g, or t
<220> FEATURE:
<221> NAME/KEY: misc_feature
<222> LOCATION: (35)..(36)
<223> OTHER INFORMATION: n is a, c, g, or t
<220> FEATURE:
<221> NAME/KEY: misc_feature
<222> LOCATION: (38)..(39)
<223> OTHER INFORMATION: n is a, c, g, or t
<220> FEATURE:
<221> NAME/KEY: misc_feature
<222> LOCATION: (41)..(42)
<223> OTHER INFORMATION: n is a, c, g, or t
<220> FEATURE:
<221> NAME/KEY: misc_feature
<222> LOCATION: (44)..(45)
<223> OTHER INFORMATION: n is a, c, g, or t
<220> FEATURE:
<221> NAME/KEY: misc_feature
<222> LOCATION: (47)..(48)
<223> OTHER INFORMATION: n is a, c, g, or t

<400> SEQUENCE: 182
ttccaccttg gtaccttgac caaatgtacg snnsnnsnns nnsnnsnntt ggcagtagta    60
aaccgcgaag tcttc                                                    75

<210> SEQ ID NO 183
<211> LENGTH: 75
<212> TYPE: DNA
<213> ORGANISM: Artificial Sequence
<220> FEATURE:
<223> OTHER INFORMATION: NI-CDRL3.03
<220> FEATURE:
<221> NAME/KEY: misc_feature
<222> LOCATION: (29)..(30)
<223> OTHER INFORMATION: n is a, c, g, or t
<220> FEATURE:
<221> NAME/KEY: misc_feature
<222> LOCATION: (32)..(33)
<223> OTHER INFORMATION: n is a, c, g, or t
<220> FEATURE:
<221> NAME/KEY: misc_feature
<222> LOCATION: (35)..(36)
<223> OTHER INFORMATION: n is a, c, g, or t
<220> FEATURE:
<221> NAME/KEY: misc_feature
<222> LOCATION: (38)..(39)
<223> OTHER INFORMATION: n is a, c, g, or t
<220> FEATURE:
<221> NAME/KEY: misc_feature
<222> LOCATION: (41)..(42)
<223> OTHER INFORMATION: n is a, c, g, or t
<220> FEATURE:
<221> NAME/KEY: misc_feature
<222> LOCATION: (44)..(45)
<223> OTHER INFORMATION: n is a, c, g, or t

<400> SEQUENCE: 183
ttccaccttg gtaccttgac caaatgtsnn snnsnnsnns nnsnnttgtt ggcagtagta    60
aaccgcgaag tcttc                                                    75

<210> SEQ ID NO 184
<211> LENGTH: 75
<212> TYPE: DNA
<213> ORGANISM: Artificial Sequence
<220> FEATURE:
<223> OTHER INFORMATION: NI-CDRL3.04
<220> FEATURE:
<221> NAME/KEY: misc_feature
<222> LOCATION: (26)..(27)
<223> OTHER INFORMATION: n is a, c, g, or t
<220> FEATURE:
<221> NAME/KEY: misc_feature
<222> LOCATION: (29)..(30)
<223> OTHER INFORMATION: n is a, c, g, or t
<220> FEATURE:
<221> NAME/KEY: misc_feature
<222> LOCATION: (32)..(33)
<223> OTHER INFORMATION: n is a, c, g, or t
<220> FEATURE:
<221> NAME/KEY: misc_feature
<222> LOCATION: (35)..(36)
<223> OTHER INFORMATION: n is a, c, g, or t
<220> FEATURE:
<221> NAME/KEY: misc_feature
<222> LOCATION: (38)..(39)
<223> OTHER INFORMATION: n is a, c, g, or t
<220> FEATURE:
<221> NAME/KEY: misc_feature
<222> LOCATION: (41)..(42)
<223> OTHER INFORMATION: n is a, c, g, or t

<400> SEQUENCE: 184
ttccaccttg gtaccttgac caaasnnsnn snnsnnsnns nnggattgtt ggcagtagta    60
aaccgcgaag tcttc    75

<210> SEQ ID NO 185
<211> LENGTH: 72
<212> TYPE: DNA
<213> ORGANISM: Artificial Sequence
<220> FEATURE:
<223> OTHER INFORMATION: NI-CDRL3.05
<220> FEATURE:
<221> NAME/KEY: misc_feature
<222> LOCATION: (32)..(33)
<223> OTHER INFORMATION: n is a, c, g, or t
<220> FEATURE:
<221> NAME/KEY: misc_feature
<222> LOCATION: (35)..(36)
<223> OTHER INFORMATION: n is a, c, g, or t
<220> FEATURE:
<221> NAME/KEY: misc_feature
<222> LOCATION: (38)..(39)
<223> OTHER INFORMATION: n is a, c, g, or t
<220> FEATURE:
<221> NAME/KEY: misc_feature
<222> LOCATION: (41)..(42)
<223> OTHER INFORMATION: n is a, c, g, or t
<220> FEATURE:
<221> NAME/KEY: misc_feature
<222> LOCATION: (44)..(45)
<223> OTHER INFORMATION: n is a, c, g, or t
<220> FEATURE:
<221> NAME/KEY: misc_feature
<222> LOCATION: (47)..(48)
<223> OTHER INFORMATION: n is a, c, g, or t

<400> SEQUENCE: 185
ttccaccttg gtaccttgac caaatgtacg snnsnnsnns nnsnnsnngc agtagtaaac    60
cgcgaagtct tc    72

<210> SEQ ID NO 186
<211> LENGTH: 69
<212> TYPE: DNA
<213> ORGANISM: Artificial Sequence
<220> FEATURE:
<223> OTHER INFORMATION: NI-CDRL3.06
<220> FEATURE:
<221> NAME/KEY: misc_feature
<222> LOCATION: (29)..(30)
<223> OTHER INFORMATION: n is a, c, g, or t
<220> FEATURE:
<221> NAME/KEY: misc_feature
<222> LOCATION: (32)..(33)
<223> OTHER INFORMATION: n is a, c, g, or t
<220> FEATURE:
<221> NAME/KEY: misc_feature
<222> LOCATION: (35)..(36)
<223> OTHER INFORMATION: n is a, c, g, or t
<220> FEATURE:
<221> NAME/KEY: misc_feature
<222> LOCATION: (38)..(39)
<223> OTHER INFORMATION: n is a, c, g, or t
<220> FEATURE:
<221> NAME/KEY: misc_feature
<222> LOCATION: (41)..(42)
<223> OTHER INFORMATION: n is a, c, g, or t
<220> FEATURE:
<221> NAME/KEY: misc_feature
<222> LOCATION: (44)..(45)
<223> OTHER INFORMATION: n is a, c, g, or t

<400> SEQUENCE: 186
ttccaccttg gtaccttgac caaatgtsnn snnsnnsnns nnsnngcagt agtaaaccgc    60

```
gaagtcttc                                                              69

<210> SEQ ID NO 187
<211> LENGTH: 66
<212> TYPE: DNA
<213> ORGANISM: Artificial Sequence
<220> FEATURE:
<223> OTHER INFORMATION: NI-CDRL3.07
<220> FEATURE:
<221> NAME/KEY: misc_feature
<222> LOCATION: (26)..(27)
<223> OTHER INFORMATION: n is a, c, g, or t
<220> FEATURE:
<221> NAME/KEY: misc_feature
<222> LOCATION: (29)..(30)
<223> OTHER INFORMATION: n is a, c, g, or t
<220> FEATURE:
<221> NAME/KEY: misc_feature
<222> LOCATION: (32)..(33)
<223> OTHER INFORMATION: n is a, c, g, or t
<220> FEATURE:
<221> NAME/KEY: misc_feature
<222> LOCATION: (35)..(36)
<223> OTHER INFORMATION: n is a, c, g, or t
<220> FEATURE:
<221> NAME/KEY: misc_feature
<222> LOCATION: (38)..(39)
<223> OTHER INFORMATION: n is a, c, g, or t
<220> FEATURE:
<221> NAME/KEY: misc_feature
<222> LOCATION: (41)..(42)
<223> OTHER INFORMATION: n is a, c, g, or t

<400> SEQUENCE: 187
ttccaccttg gtaccttgac caaasnnsnn snnsnnsnns nngcagtagt aaaccgcgaa      60
gtcttc                                                                 66

<210> SEQ ID NO 188
<211> LENGTH: 78
<212> TYPE: DNA
<213> ORGANISM: Artificial Sequence
<220> FEATURE:
<223> OTHER INFORMATION: NI-CDRL3.08
<220> FEATURE:
<221> NAME/KEY: misc_feature
<222> LOCATION: (26)..(27)
<223> OTHER INFORMATION: n is a, c, g, or t
<220> FEATURE:
<221> NAME/KEY: misc_feature
<222> LOCATION: (29)..(30)
<223> OTHER INFORMATION: n is a, c, g, or t
<220> FEATURE:
<221> NAME/KEY: misc_feature
<222> LOCATION: (32)..(33)
<223> OTHER INFORMATION: n is a, c, g, or t
<220> FEATURE:
<221> NAME/KEY: misc_feature
<222> LOCATION: (35)..(36)
<223> OTHER INFORMATION: n is a, c, g, or t
<220> FEATURE:
<221> NAME/KEY: misc_feature
<222> LOCATION: (38)..(39)
<223> OTHER INFORMATION: n is a, c, g, or t
<220> FEATURE:
<221> NAME/KEY: misc_feature
<222> LOCATION: (41)..(42)
<223> OTHER INFORMATION: n is a, c, g, or t

<400> SEQUENCE: 188
ttccaccttg gtaccttgac caaasnnsnn snnsnnsnns nncgaggatt gttggcagta      60
gtaaaccgcg aagtcttc                                                    78
```

```
<210> SEQ ID NO 189
<211> LENGTH: 81
<212> TYPE: DNA
<213> ORGANISM: Artificial Sequence
<220> FEATURE:
<223> OTHER INFORMATION: NI-CDRL3.09
<220> FEATURE:
<221> NAME/KEY: misc_feature
<222> LOCATION: (26)..(27)
<223> OTHER INFORMATION: n is a, c, g, or t
<220> FEATURE:
<221> NAME/KEY: misc_feature
<222> LOCATION: (29)..(30)
<223> OTHER INFORMATION: n is a, c, g, or t
<220> FEATURE:
<221> NAME/KEY: misc_feature
<222> LOCATION: (32)..(33)
<223> OTHER INFORMATION: n is a, c, g, or t
<220> FEATURE:
<221> NAME/KEY: misc_feature
<222> LOCATION: (35)..(36)
<223> OTHER INFORMATION: n is a, c, g, or t
<220> FEATURE:
<221> NAME/KEY: misc_feature
<222> LOCATION: (38)..(39)
<223> OTHER INFORMATION: n is a, c, g, or t
<220> FEATURE:
<221> NAME/KEY: misc_feature
<222> LOCATION: (41)..(42)
<223> OTHER INFORMATION: n is a, c, g, or t

<400> SEQUENCE: 189
ttccaccttg gtaccttgac caaasnnsnn snnsnnsnns nngttcgagg attgttggca    60
gtagtaaacc gcgaagtctt c                                              81

<210> SEQ ID NO 190
<211> LENGTH: 84
<212> TYPE: DNA
<213> ORGANISM: Artificial Sequence
<220> FEATURE:
<223> OTHER INFORMATION: NI-CDRL3.10
<220> FEATURE:
<221> NAME/KEY: misc_feature
<222> LOCATION: (26)..(27)
<223> OTHER INFORMATION: n is a, c, g, or t
<220> FEATURE:
<221> NAME/KEY: misc_feature
<222> LOCATION: (29)..(30)
<223> OTHER INFORMATION: n is a, c, g, or t
<220> FEATURE:
<221> NAME/KEY: misc_feature
<222> LOCATION: (32)..(33)
<223> OTHER INFORMATION: n is a, c, g, or t
<220> FEATURE:
<221> NAME/KEY: misc_feature
<222> LOCATION: (35)..(36)
<223> OTHER INFORMATION: n is a, c, g, or t
<220> FEATURE:
<221> NAME/KEY: misc_feature
<222> LOCATION: (38)..(39)
<223> OTHER INFORMATION: n is a, c, g, or t
<220> FEATURE:
<221> NAME/KEY: misc_feature
<222> LOCATION: (41)..(42)
<223> OTHER INFORMATION: n is a, c, g, or t

<400> SEQUENCE: 190
ttccaccttg gtaccttgac caaasnnsnn snnsnnsnns nnccagttcg aggattgttg    60
gcagtagtaa accgcgaagt cttc                                           84

<210> SEQ ID NO 191
<211> LENGTH: 56
```

```
<212> TYPE: DNA
<213> ORGANISM: Artificial Sequence
<220> FEATURE:
<223> OTHER INFORMATION: NI-CDRH3.00
<220> FEATURE:
<221> NAME/KEY: misc_feature
<222> LOCATION: (24)..(25)
<223> OTHER INFORMATION: n is a, c, g, or t
<220> FEATURE:
<221> NAME/KEY: misc_feature
<222> LOCATION: (27)..(28)
<223> OTHER INFORMATION: n is a, c, g, or t
<220> FEATURE:
<221> NAME/KEY: misc_feature
<222> LOCATION: (30)..(31)
<223> OTHER INFORMATION: n is a, c, g, or t
<220> FEATURE:
<221> NAME/KEY: misc_feature
<222> LOCATION: (33)..(34)
<223> OTHER INFORMATION: n is a, c, g, or t

<400> SEQUENCE: 191
tcactaatgt accttgaccc casnnsnnsn nsnntgtggc gcaatagtac actgcc       56

<210> SEQ ID NO 192
<211> LENGTH: 59
<212> TYPE: DNA
<213> ORGANISM: Artificial Sequence
<220> FEATURE:
<223> OTHER INFORMATION: NI-CDRH3.01
<220> FEATURE:
<221> NAME/KEY: misc_feature
<222> LOCATION: (24)..(25)
<223> OTHER INFORMATION: n is a, c, g, or t
<220> FEATURE:
<221> NAME/KEY: misc_feature
<222> LOCATION: (27)..(28)
<223> OTHER INFORMATION: n is a, c, g, or t
<220> FEATURE:
<221> NAME/KEY: misc_feature
<222> LOCATION: (30)..(31)
<223> OTHER INFORMATION: n is a, c, g, or t
<220> FEATURE:
<221> NAME/KEY: misc_feature
<222> LOCATION: (33)..(34)
<223> OTHER INFORMATION: n is a, c, g, or t
<220> FEATURE:
<221> NAME/KEY: misc_feature
<222> LOCATION: (36)..(37)
<223> OTHER INFORMATION: n is a, c, g, or t

<400> SEQUENCE: 192
tcactaatgt accttgaccc casnnsnnsn nsnnsnntgt ggcgcaatag tacactgcc    59

<210> SEQ ID NO 193
<211> LENGTH: 62
<212> TYPE: DNA
<213> ORGANISM: Artificial Sequence
<220> FEATURE:
<223> OTHER INFORMATION: NI-CDRH3.02
<220> FEATURE:
<221> NAME/KEY: misc_feature
<222> LOCATION: (24)..(25)
<223> OTHER INFORMATION: n is a, c, g, or t
<220> FEATURE:
<221> NAME/KEY: misc_feature
<222> LOCATION: (27)..(28)
<223> OTHER INFORMATION: n is a, c, g, or t
<220> FEATURE:
<221> NAME/KEY: misc_feature
<222> LOCATION: (30)..(31)
<223> OTHER INFORMATION: n is a, c, g, or t
<220> FEATURE:
<221> NAME/KEY: misc_feature
<222> LOCATION: (33)..(34)
```

```
<223> OTHER INFORMATION: n is a, c, g, or t
<220> FEATURE:
<221> NAME/KEY: misc_feature
<222> LOCATION: (36)..(37)
<223> OTHER INFORMATION: n is a, c, g, or t
<220> FEATURE:
<221> NAME/KEY: misc_feature
<222> LOCATION: (39)..(40)
<223> OTHER INFORMATION: n is a, c, g, or t

<400> SEQUENCE: 193
tcactaatgt accttgaccc casnnsnnsn nsnnsnnsnn tgtggcgcaa tagtacactg    60
cc                                                                  62

<210> SEQ ID NO 194
<211> LENGTH: 62
<212> TYPE: DNA
<213> ORGANISM: Artificial Sequence
<220> FEATURE:
<223> OTHER INFORMATION: NI-CDRH3.03
<220> FEATURE:
<221> NAME/KEY: misc_feature
<222> LOCATION: (24)..(25)
<223> OTHER INFORMATION: n is a, c, g, or t
<220> FEATURE:
<221> NAME/KEY: misc_feature
<222> LOCATION: (27)..(28)
<223> OTHER INFORMATION: n is a, c, g, or t
<220> FEATURE:
<221> NAME/KEY: misc_feature
<222> LOCATION: (30)..(31)
<223> OTHER INFORMATION: n is a, c, g, or t
<220> FEATURE:
<221> NAME/KEY: misc_feature
<222> LOCATION: (33)..(34)
<223> OTHER INFORMATION: n is a, c, g, or t
<220> FEATURE:
<221> NAME/KEY: misc_feature
<222> LOCATION: (36)..(37)
<223> OTHER INFORMATION: n is a, c, g, or t
<220> FEATURE:
<221> NAME/KEY: misc_feature
<222> LOCATION: (39)..(40)
<223> OTHER INFORMATION: n is a, c, g, or t

<400> SEQUENCE: 194
tcactaatgt accttgaccc casnnsnnsn nsnnsnnsnn atttgtggcg caatagtaca    60
ct                                                                  62

<210> SEQ ID NO 195
<211> LENGTH: 62
<212> TYPE: DNA
<213> ORGANISM: Artificial Sequence
<220> FEATURE:
<223> OTHER INFORMATION: NI-CDRH3.04
<220> FEATURE:
<221> NAME/KEY: misc_feature
<222> LOCATION: (24)..(25)
<223> OTHER INFORMATION: n is a, c, g, or t
<220> FEATURE:
<221> NAME/KEY: misc_feature
<222> LOCATION: (27)..(28)
<223> OTHER INFORMATION: n is a, c, g, or t
<220> FEATURE:
<221> NAME/KEY: misc_feature
<222> LOCATION: (30)..(31)
<223> OTHER INFORMATION: n is a, c, g, or t
<220> FEATURE:
<221> NAME/KEY: misc_feature
<222> LOCATION: (33)..(34)
<223> OTHER INFORMATION: n is a, c, g, or t
<220> FEATURE:
<221> NAME/KEY: misc_feature
```

```
<222> LOCATION: (36)..(37)
<223> OTHER INFORMATION: n is a, c, g, or t
<220> FEATURE:
<221> NAME/KEY: misc_feature
<222> LOCATION: (39)..(40)
<223> OTHER INFORMATION: n is a, c, g, or t

<400> SEQUENCE: 195
tcactaatgt accttgaccc casnnsnnsn nsnnsnnsnn atcatttgtg gcgcaatagt      60
ac                                                                    62

<210> SEQ ID NO 196
<211> LENGTH: 62
<212> TYPE: DNA
<213> ORGANISM: Artificial Sequence
<220> FEATURE:
<223> OTHER INFORMATION: NI-CDRH3.05
<220> FEATURE:
<221> NAME/KEY: misc_feature
<222> LOCATION: (24)..(25)
<223> OTHER INFORMATION: n is a, c, g, or t
<220> FEATURE:
<221> NAME/KEY: misc_feature
<222> LOCATION: (27)..(28)
<223> OTHER INFORMATION: n is a, c, g, or t
<220> FEATURE:
<221> NAME/KEY: misc_feature
<222> LOCATION: (30)..(31)
<223> OTHER INFORMATION: n is a, c, g, or t
<220> FEATURE:
<221> NAME/KEY: misc_feature
<222> LOCATION: (33)..(34)
<223> OTHER INFORMATION: n is a, c, g, or t
<220> FEATURE:
<221> NAME/KEY: misc_feature
<222> LOCATION: (36)..(37)
<223> OTHER INFORMATION: n is a, c, g, or t
<220> FEATURE:
<221> NAME/KEY: misc_feature
<222> LOCATION: (39)..(40)
<223> OTHER INFORMATION: n is a, c, g, or t

<400> SEQUENCE: 196
tcactaatgt accttgaccc casnnsnnsn nsnnsnnsnn atcatcattt gtggcgcaat      60
ag                                                                    62

<210> SEQ ID NO 197
<211> LENGTH: 62
<212> TYPE: DNA
<213> ORGANISM: Artificial Sequence
<220> FEATURE:
<223> OTHER INFORMATION: NI-CDRH3.06
<220> FEATURE:
<221> NAME/KEY: misc_feature
<222> LOCATION: (24)..(25)
<223> OTHER INFORMATION: n is a, c, g, or t
<220> FEATURE:
<221> NAME/KEY: misc_feature
<222> LOCATION: (27)..(28)
<223> OTHER INFORMATION: n is a, c, g, or t
<220> FEATURE:
<221> NAME/KEY: misc_feature
<222> LOCATION: (30)..(31)
<223> OTHER INFORMATION: n is a, c, g, or t
<220> FEATURE:
<221> NAME/KEY: misc_feature
<222> LOCATION: (33)..(34)
<223> OTHER INFORMATION: n is a, c, g, or t
<220> FEATURE:
<221> NAME/KEY: misc_feature
<222> LOCATION: (36)..(37)
<223> OTHER INFORMATION: n is a, c, g, or t
<220> FEATURE:
```

```
<221> NAME/KEY: misc_feature
<222> LOCATION: (39)..(40)
<223> OTHER INFORMATION: n is a, c, g, or t

<400> SEQUENCE: 197
tcactaatgt accttgaccc casnnsnnsn nsnnsnnsnn ataatcatca tttgtggcgc    60
aa                                                                  62

<210> SEQ ID NO 198
<211> LENGTH: 65
<212> TYPE: DNA
<213> ORGANISM: Artificial Sequence
<220> FEATURE:
<223> OTHER INFORMATION: NI-CDRH3.07
<220> FEATURE:
<221> NAME/KEY: misc_feature
<222> LOCATION: (24)..(25)
<223> OTHER INFORMATION: n is a, c, g, or t
<220> FEATURE:
<221> NAME/KEY: misc_feature
<222> LOCATION: (27)..(28)
<223> OTHER INFORMATION: n is a, c, g, or t
<220> FEATURE:
<221> NAME/KEY: misc_feature
<222> LOCATION: (30)..(31)
<223> OTHER INFORMATION: n is a, c, g, or t
<220> FEATURE:
<221> NAME/KEY: misc_feature
<222> LOCATION: (33)..(34)
<223> OTHER INFORMATION: n is a, c, g, or t
<220> FEATURE:
<221> NAME/KEY: misc_feature
<222> LOCATION: (36)..(37)
<223> OTHER INFORMATION: n is a, c, g, or t
<220> FEATURE:
<221> NAME/KEY: misc_feature
<222> LOCATION: (39)..(40)
<223> OTHER INFORMATION: n is a, c, g, or t
<220> FEATURE:
<221> NAME/KEY: misc_feature
<222> LOCATION: (42)..(43)
<223> OTHER INFORMATION: n is a, c, g, or t

<400> SEQUENCE: 198
tcactaatgt accttgaccc casnnsnnsn nsnnsnnsnn snnataatca tcatttgtgg    60
cgcaa                                                               65
```